United States Patent
Mukasa et al.

(10) Patent No.: US 11,279,321 B2
(45) Date of Patent: Mar. 22, 2022

(54) IMAGING APPARATUS HAVING A REDUCED POWER CONSUMPTION MODE AND MODE THAT GENERATES A CAPTURED IMAGE

(71) Applicant: Sony Semiconductor Solutions Corporation, Kanagawa (JP)

(72) Inventors: Tomoharu Mukasa, Saitama (JP); Akitoshi Isshiki, Chiba (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/615,881

(22) PCT Filed: Jun. 5, 2018

(86) PCT No.: PCT/JP2018/021545
§ 371 (c)(1),
(2) Date: Nov. 22, 2019

(87) PCT Pub. No.: WO2019/003826
PCT Pub. Date: Jan. 3, 2019

(65) Prior Publication Data
US 2020/0139931 A1   May 7, 2020

(30) Foreign Application Priority Data
Jun. 27, 2017   (JP) .............................. JP2017-124837

(51) Int. Cl.
*H04N 5/228*   (2006.01)
*B60R 25/25*   (2013.01)
(Continued)

(52) U.S. Cl.
CPC .......... *B60R 25/25* (2013.01); *G06K 9/00288* (2013.01); *G07C 9/00309* (2013.01);
(Continued)

(58) Field of Classification Search
CPC ................ B60R 25/25; H04N 5/23227; H04N 5/232411
(Continued)

(56) References Cited

U.S. PATENT DOCUMENTS

2013/0258117 A1\* 10/2013 Penov .................. G06K 9/6202
348/207.1
2014/0104630 A1\* 4/2014 Baba .................. H04N 1/00323
358/1.13
(Continued)

FOREIGN PATENT DOCUMENTS

| CN | 105430251 A | 3/2016 |
|---|---|---|
| EP | 3128454 A | 2/2017 |

(Continued)

OTHER PUBLICATIONS

Extended European Search Report dated Jul. 22, 2020 for corresponding European Application No. 18823367.0.
(Continued)

*Primary Examiner* — Usman A Khan
(74) *Attorney, Agent, or Firm* — Michael Best & Friedrich LLP

(57) ABSTRACT

An imaging apparatus of the present disclosure includes an imaging unit having a plurality of operation modes including a first operation mode configured to reduce power consumption and a second operation mode that generates a captured image, and an operation mode setting section that selects one of the plurality of operation modes.

19 Claims, 32 Drawing Sheets

(51) Int. Cl.
*H04N 5/232* (2006.01)
*G06K 9/00* (2022.01)
*G07C 9/00* (2020.01)

(52) U.S. Cl.
CPC ..... *H04N 5/23219* (2013.01); *H04N 5/23227* (2018.08); *H04N 5/232411* (2018.08); *G06K 9/00255* (2013.01); *G07C 2009/00539* (2013.01)

(58) Field of Classification Search
USPC ....................................................... 348/222.1
See application file for complete search history.

(56) References Cited

U.S. PATENT DOCUMENTS

| | | | |
|---|---|---|---|
| 2014/0118592 A1* | 5/2014 | Yoon | H04N 5/23251 348/308 |
| 2015/0186711 A1 | 7/2015 | Baldwin et al. | |
| 2016/0173294 A1* | 6/2016 | Kim | H04L 43/0817 370/245 |
| 2016/0277618 A1* | 9/2016 | Horishita | H04N 1/00251 |

FOREIGN PATENT DOCUMENTS

| | | | | |
|---|---|---|---|---|
| EP | 3606035 A1 | 2/2020 | | |
| GB | 2400911 A | 10/2004 | | |
| GB | 2400999 A | 10/2004 | | |
| JP | 2003-099763 A | 4/2003 | | |
| JP | 2005-036523 A | 2/2005 | | |
| JP | 2005207110 A | 8/2005 | | |
| JP | 2007-060315 A | 3/2007 | | |
| JP | 2008162498 A | 7/2008 | | |
| JP | 2013-242818 A | 12/2013 | | |
| JP | 2013242818 A | * 12/2013 | ............ | G07B 15/00 |
| JP | 2015-228626 A | 12/2015 | | |
| JP | 2016-062148 A | 4/2016 | | |
| JP | 2016-178348 A | 10/2016 | | |
| JP | 2017001615 A | 1/2017 | | |

OTHER PUBLICATIONS

Partial European Search Report dated May 12, 2020 for corresponding European Application No. 18823367.0.
Chinese Office Action dated Dec. 3, 2020 for corresponding Chinese Application No. 2018800337986.
European Patent Office Communication Pursuant to Article 94(3) dated May 28, 2021 for corresponding European Application No. 18823367.0.

* cited by examiner

[ FIG. 1 ]
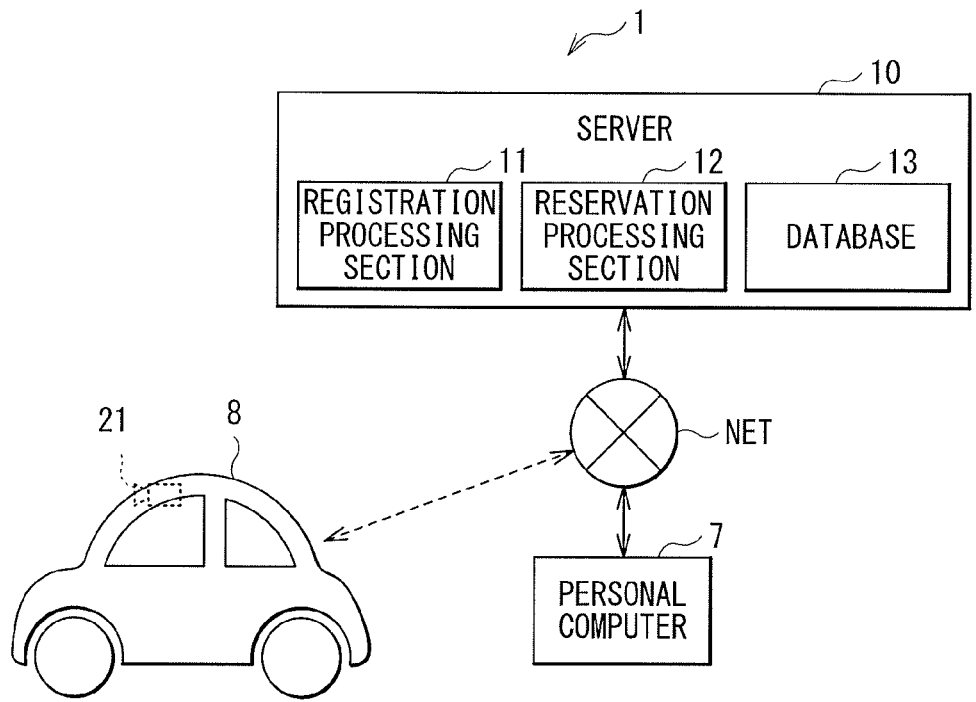
[ FIG. 2 ]
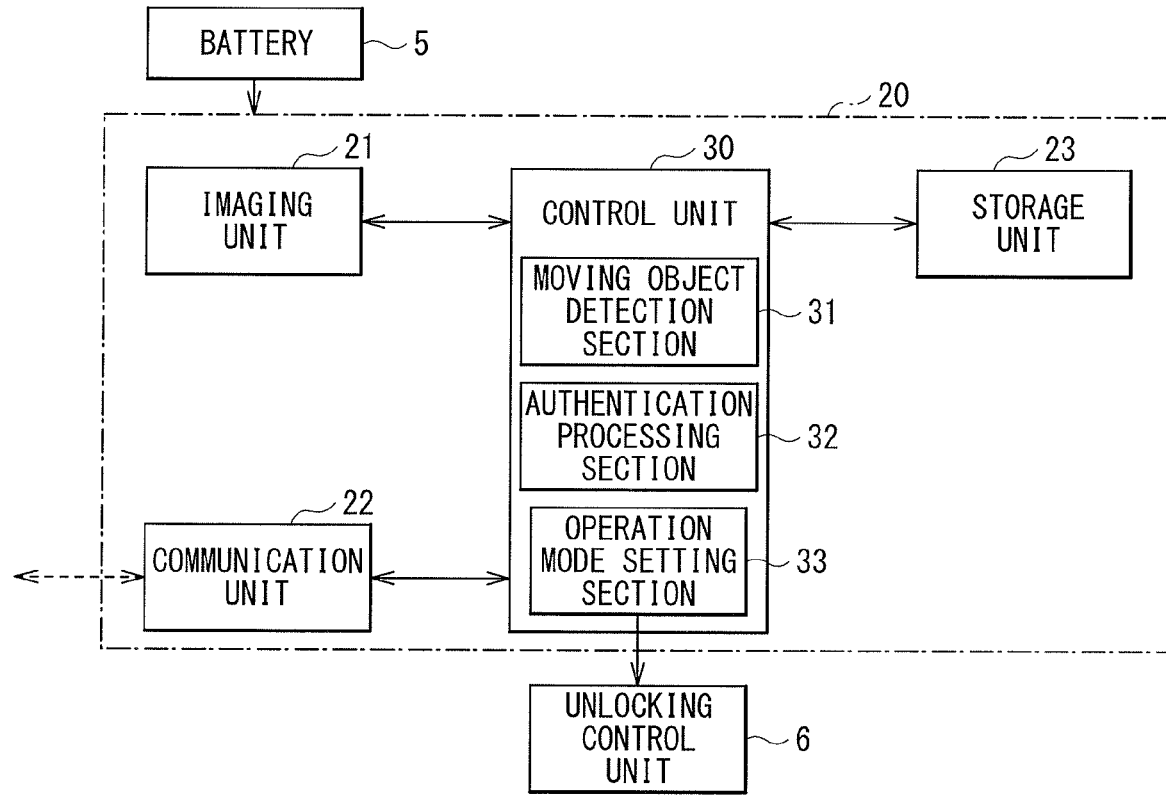

[ FIG. 3 ]
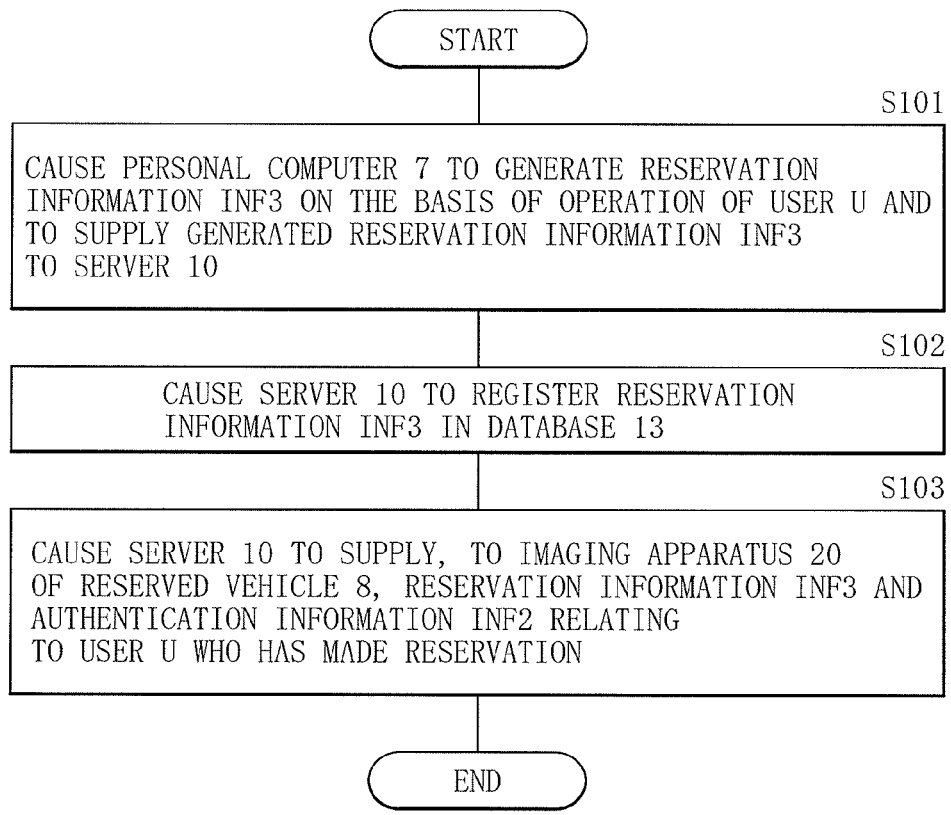

[ FIG. 4 ]
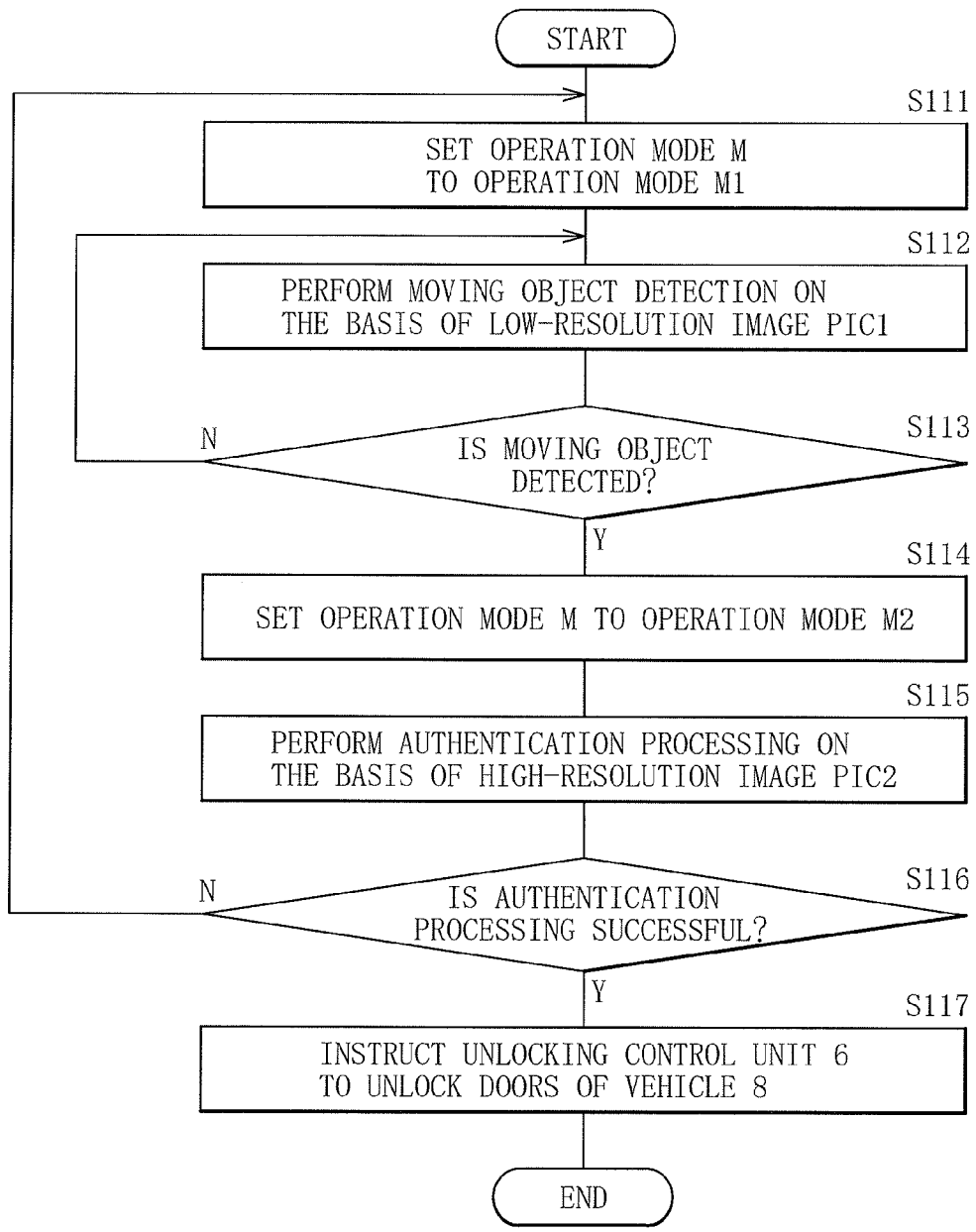

[ FIG. 5 ]
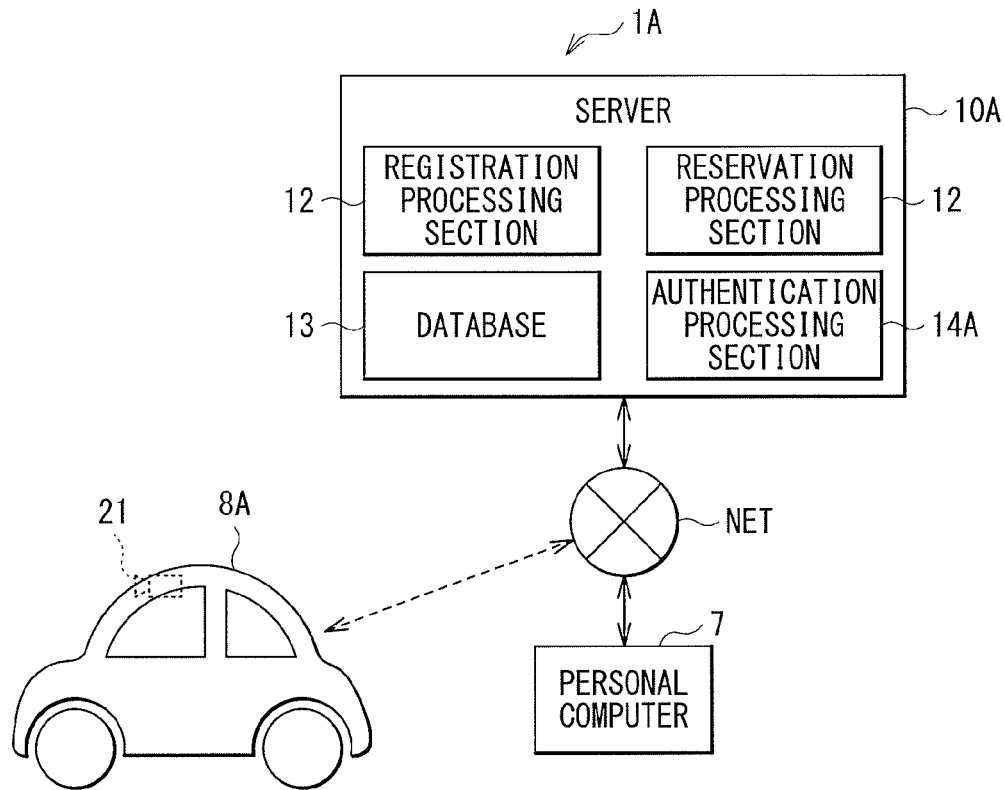
[ FIG. 6 ]
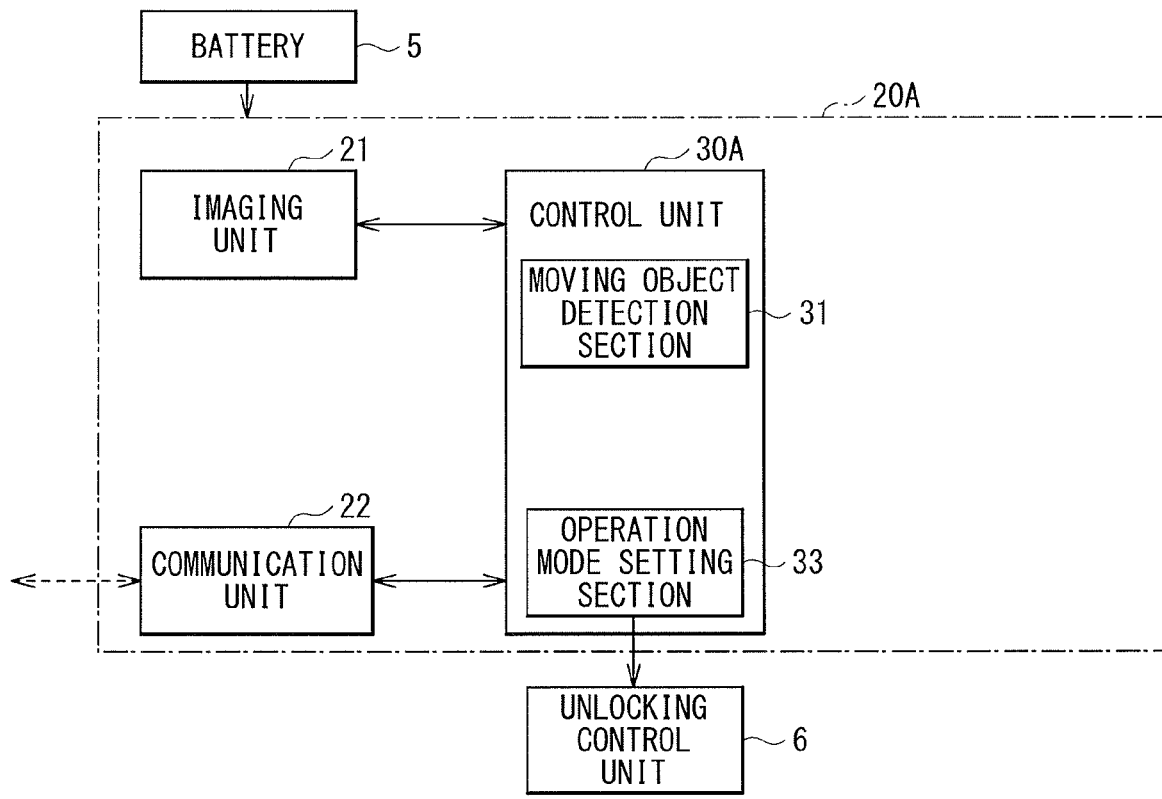

[ FIG. 7 ]
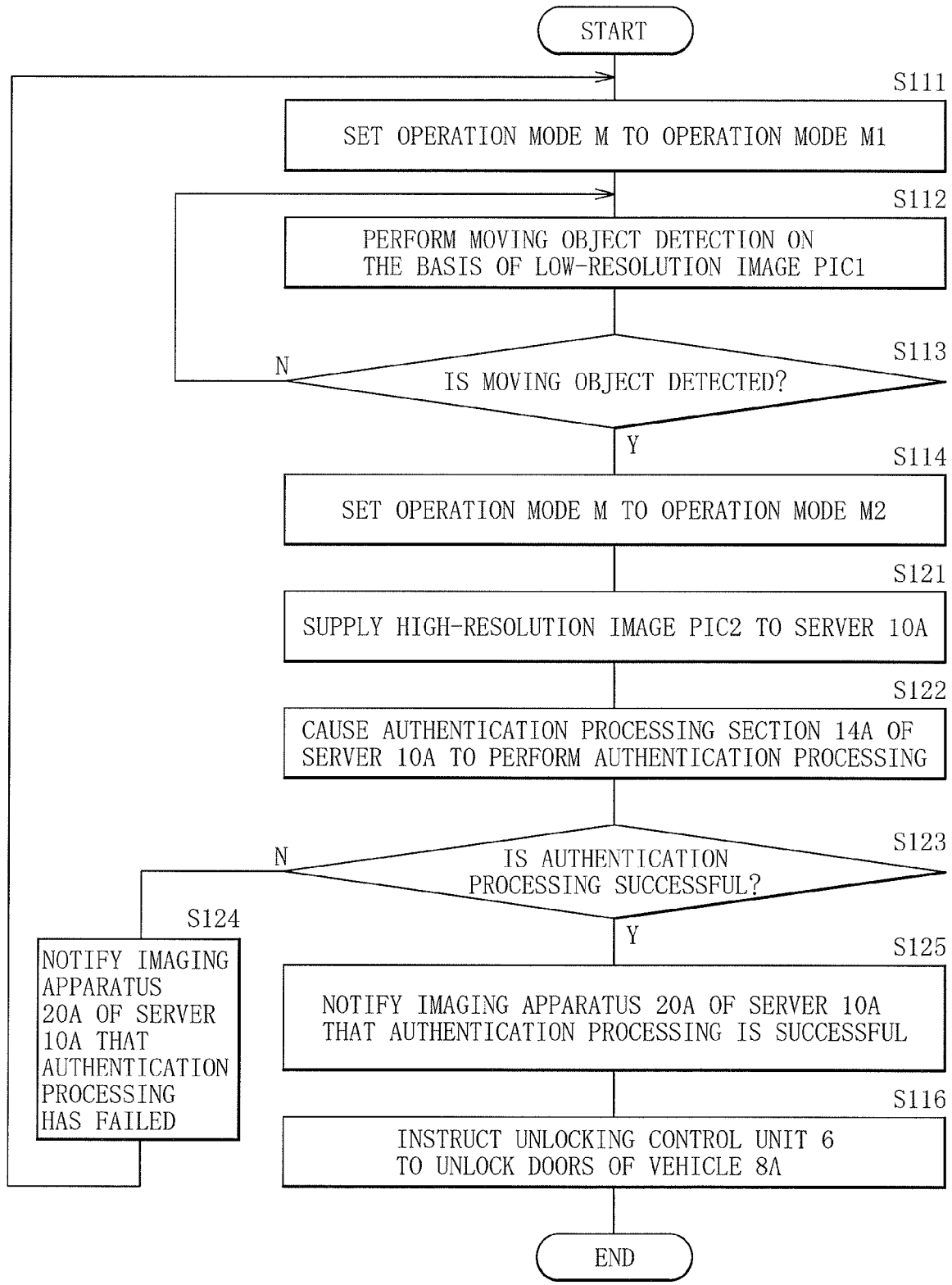

[ FIG. 8 ]
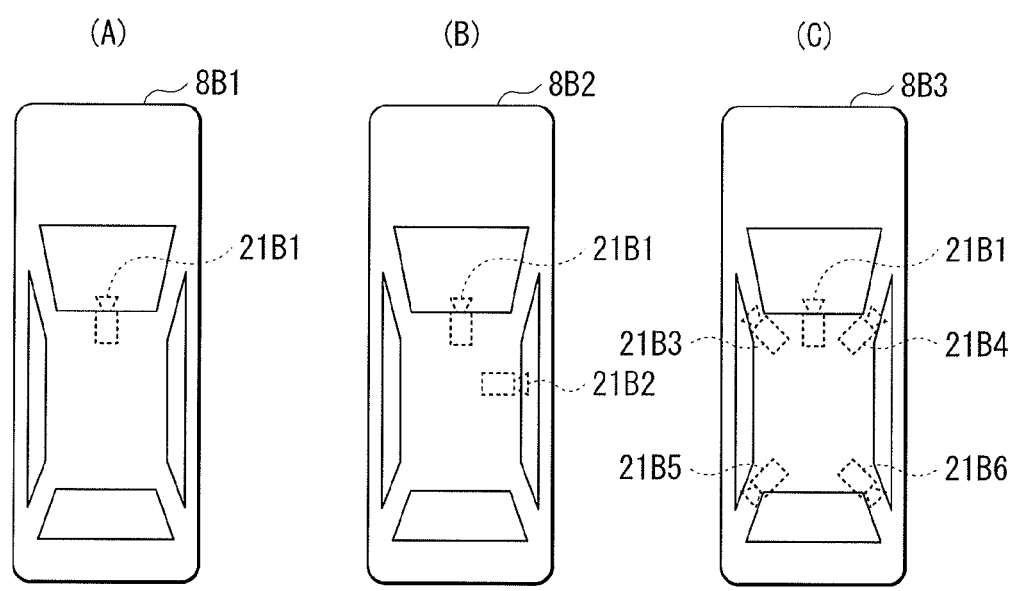
[ FIG. 9 ]
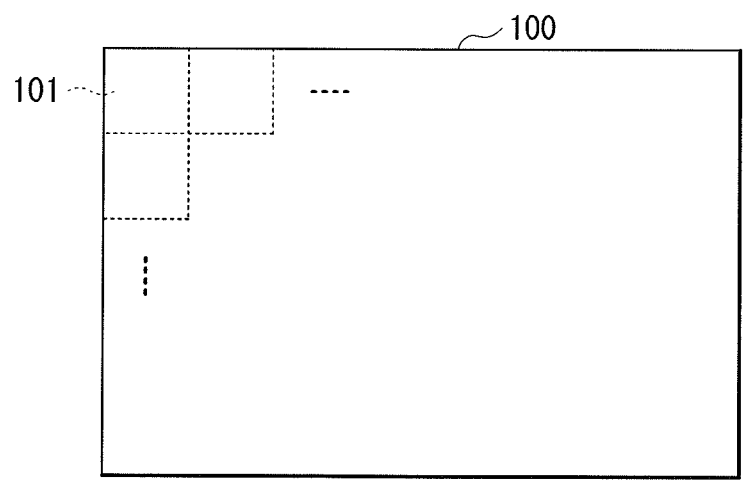

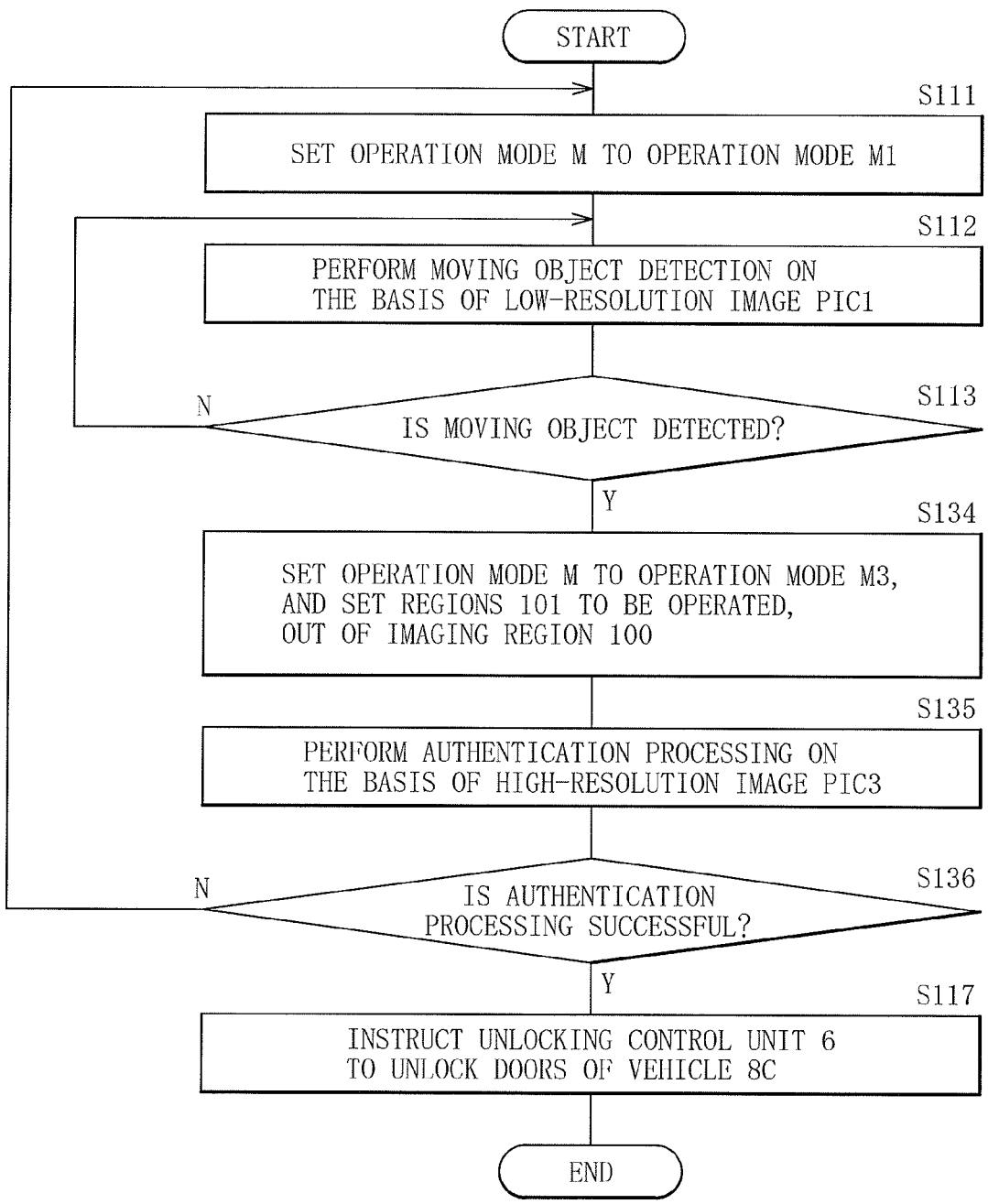
[ FIG. 10 ]

[ FIG. 11 ]
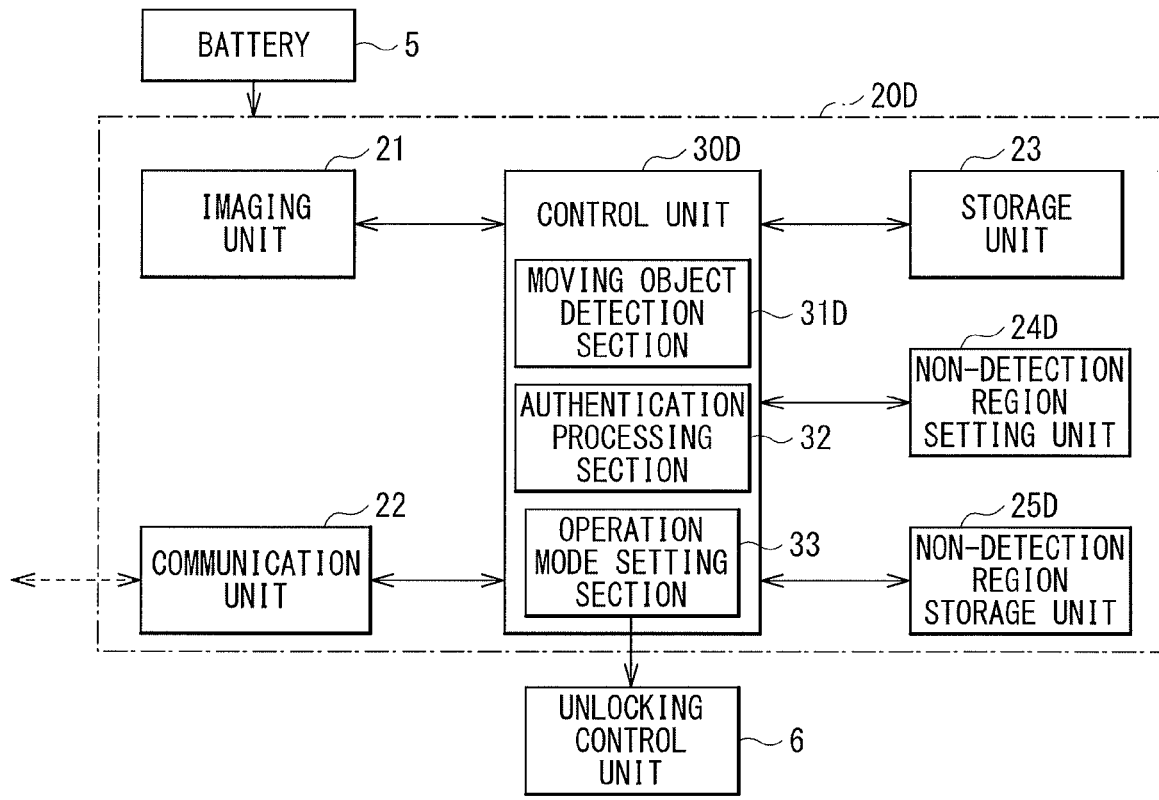
[ FIG. 12 ]
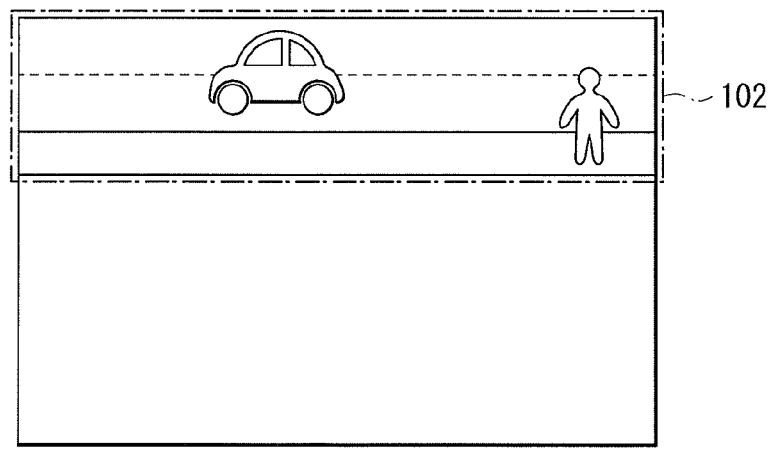

[ FIG. 13 ]
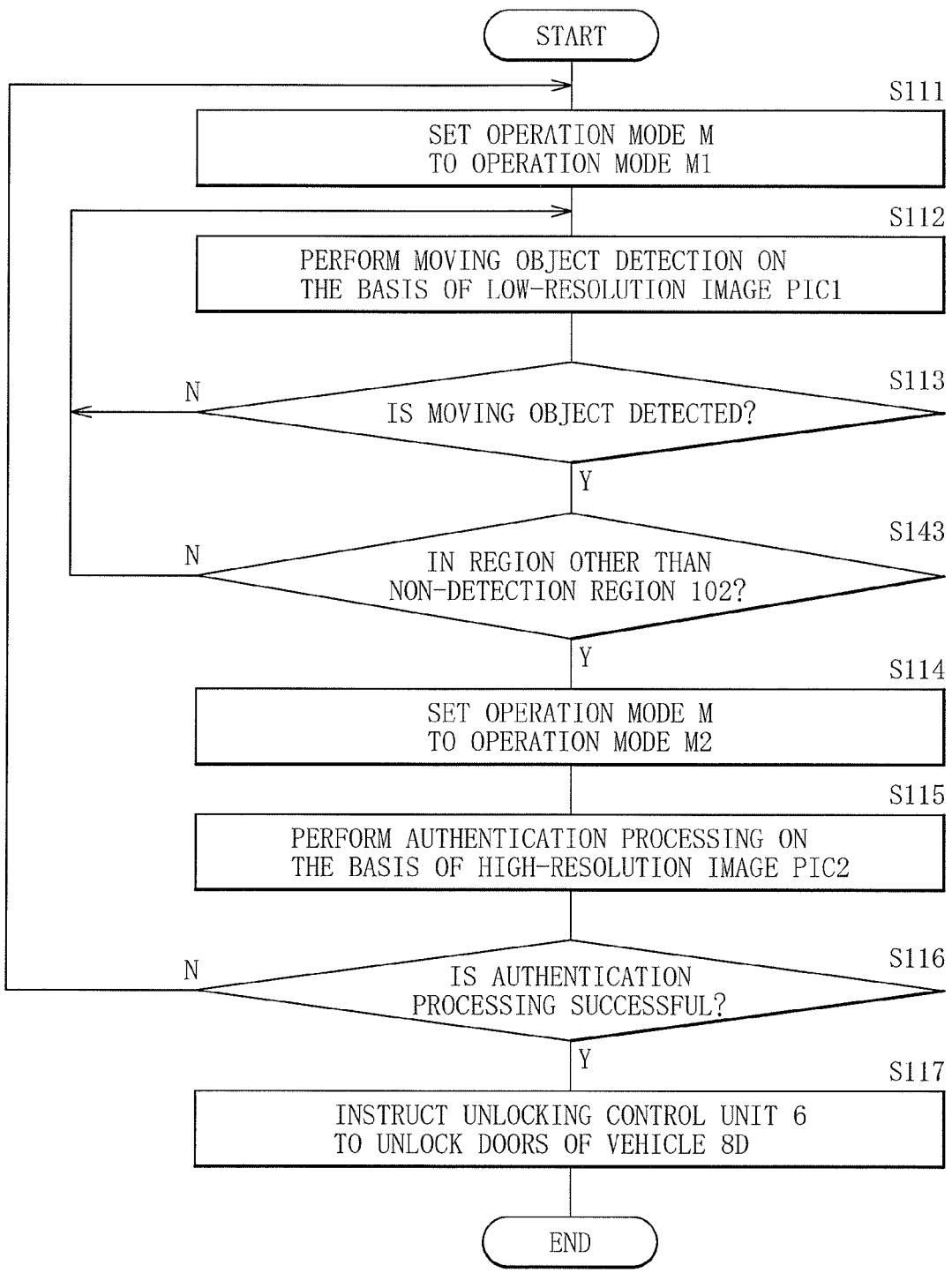

[ FIG. 14 ]
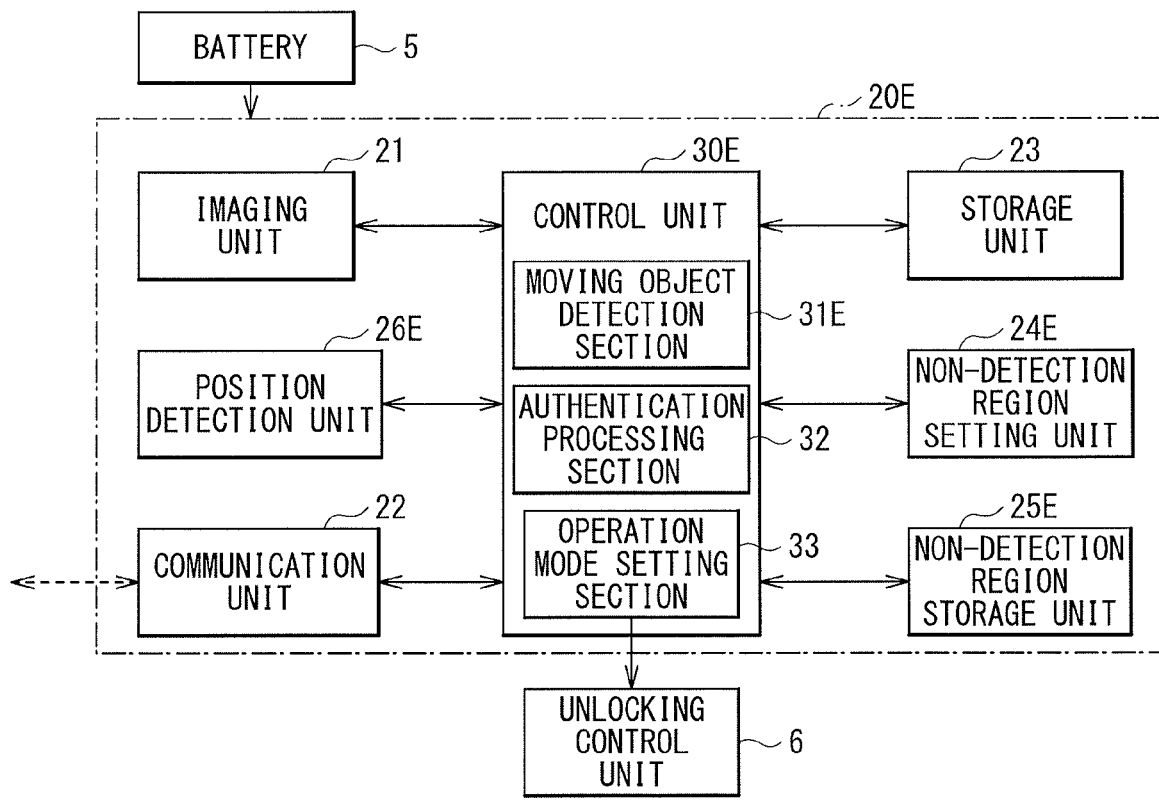
[ FIG. 15 ]
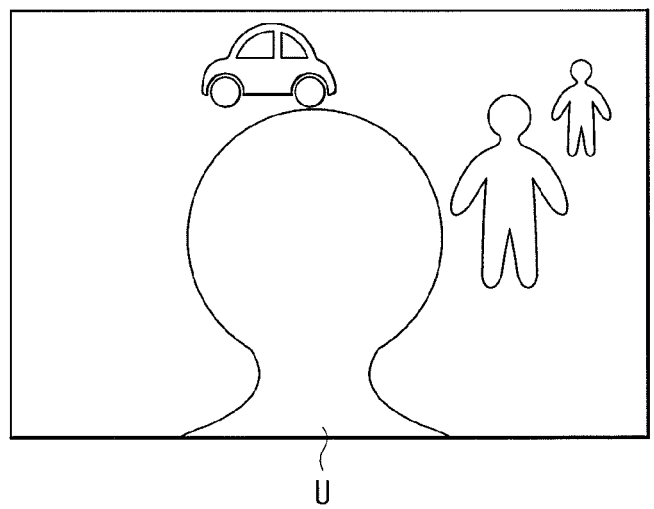

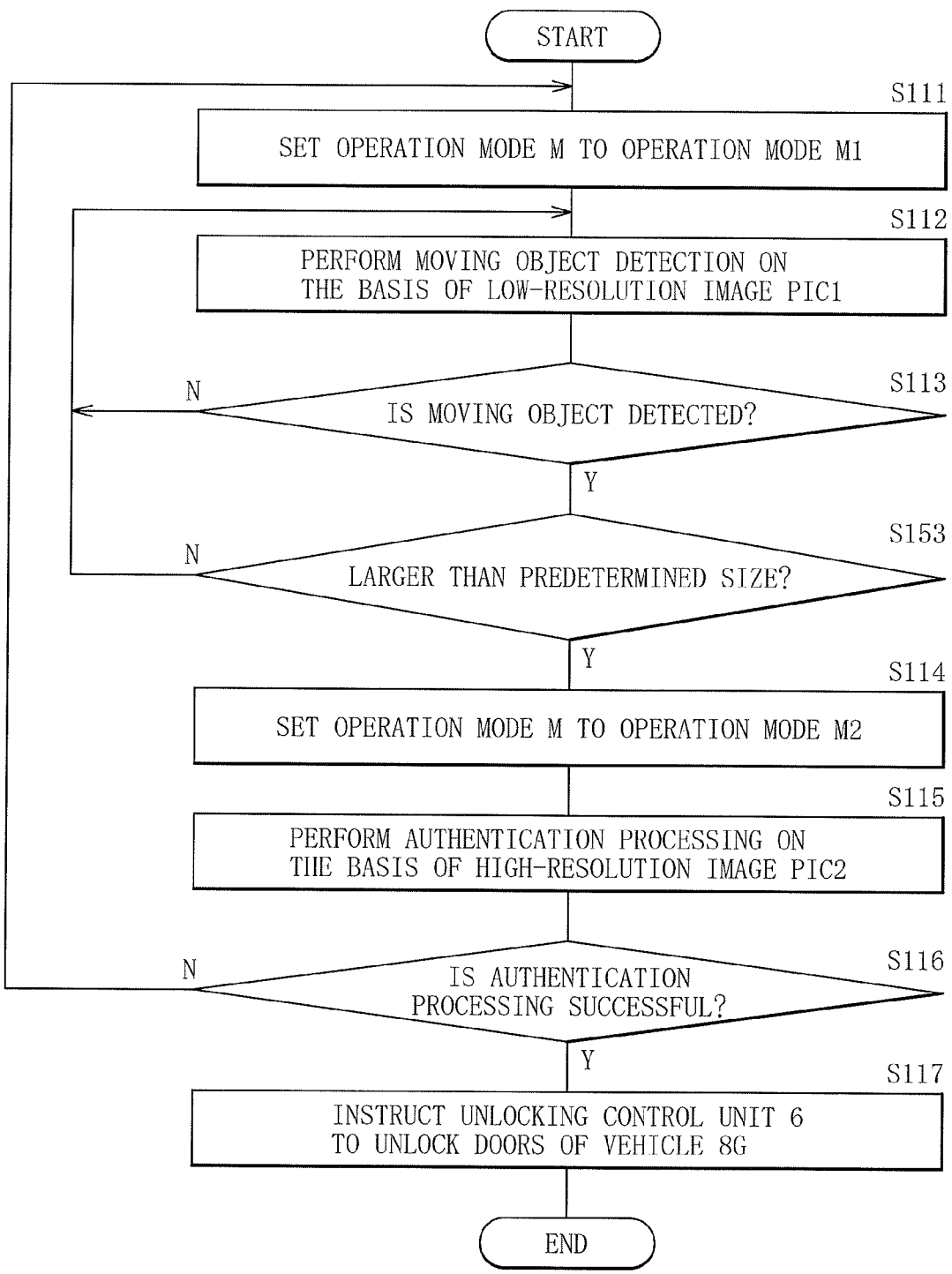

[ FIG. 17 ]
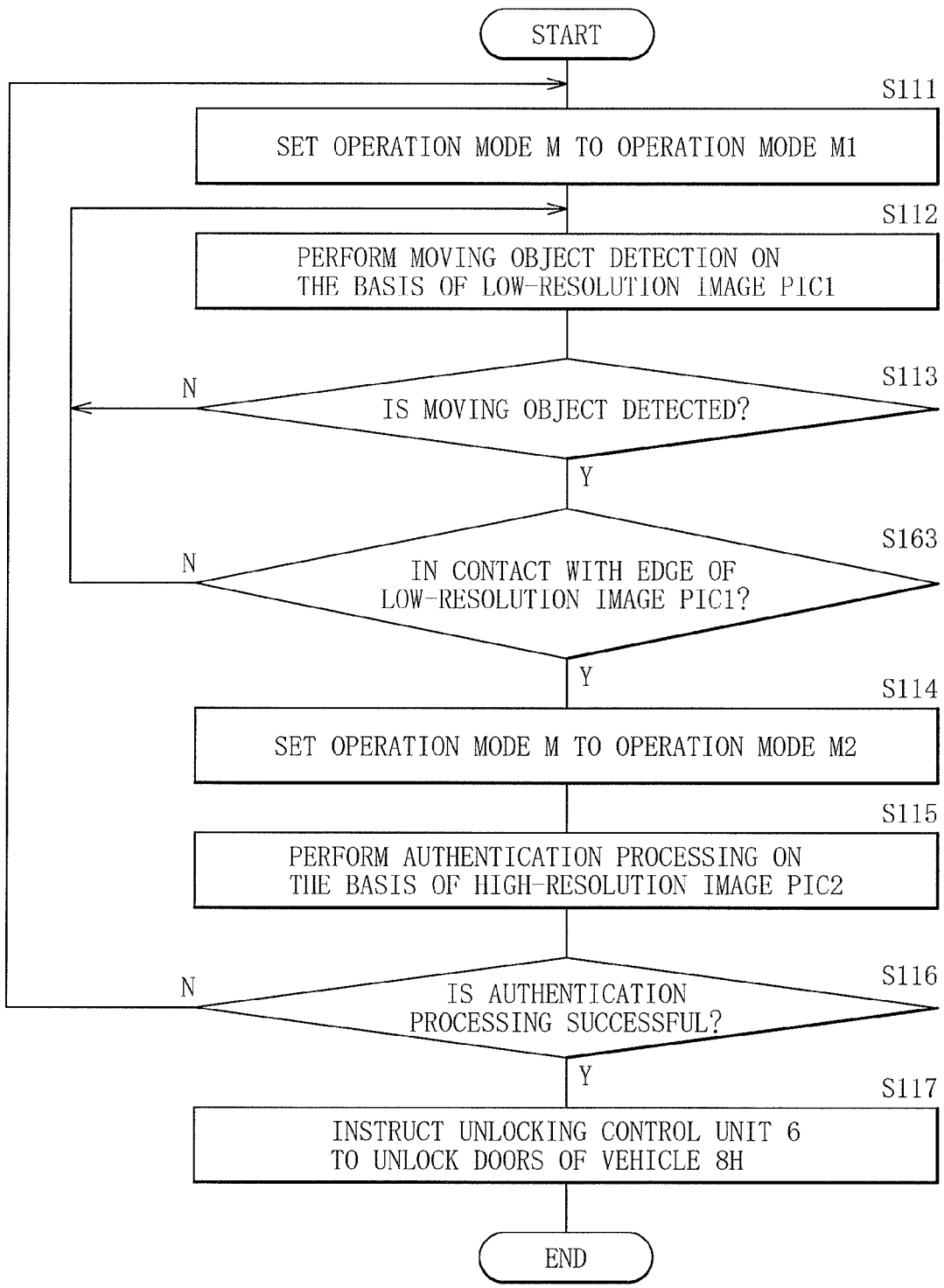

[ FIG. 18 ]
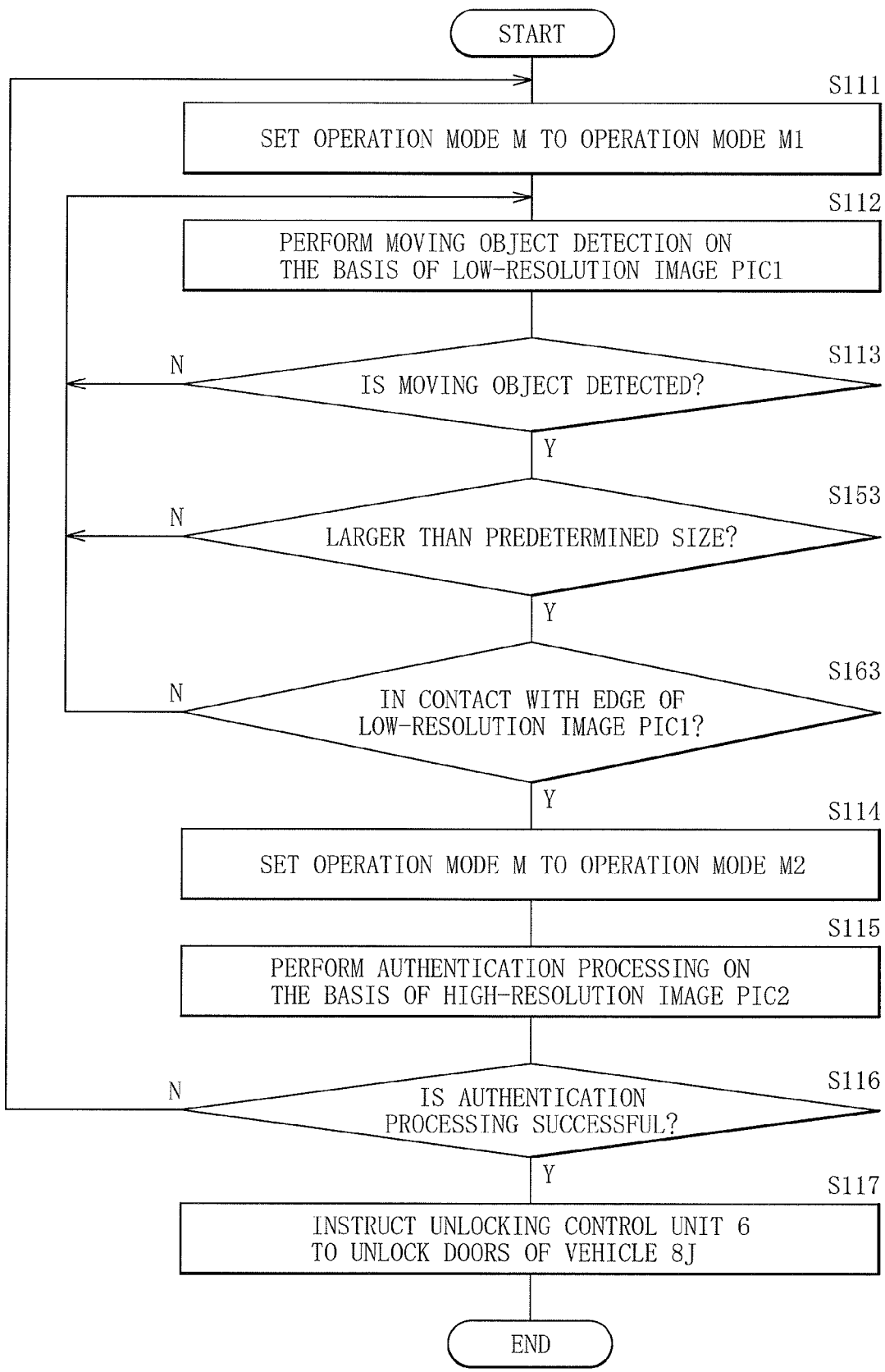

[ FIG. 19 ]
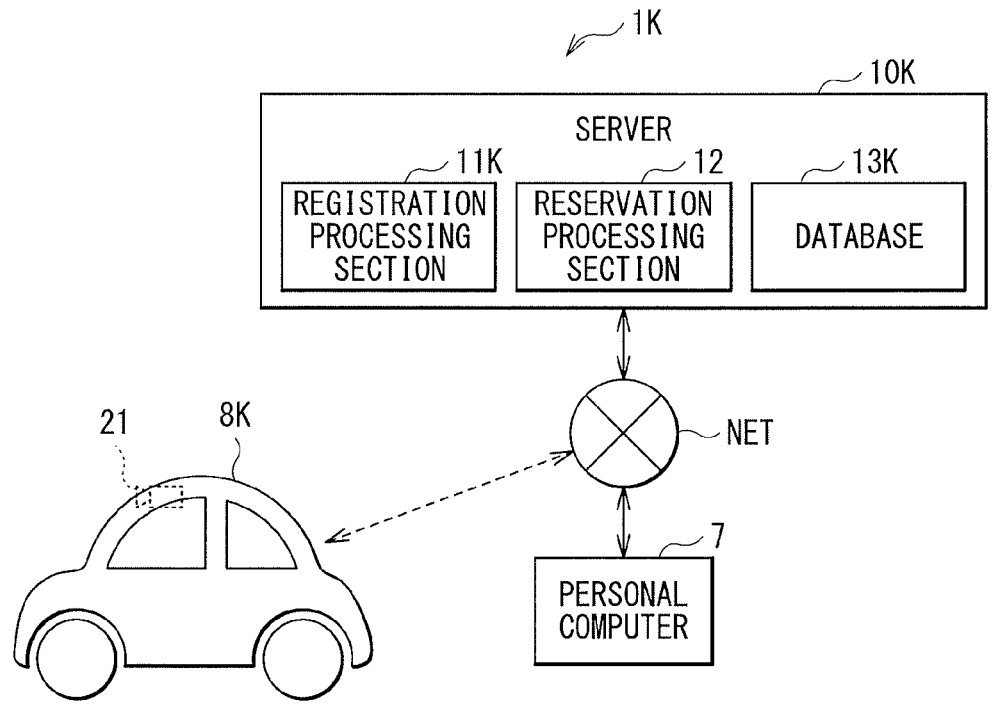
[ FIG. 20 ]
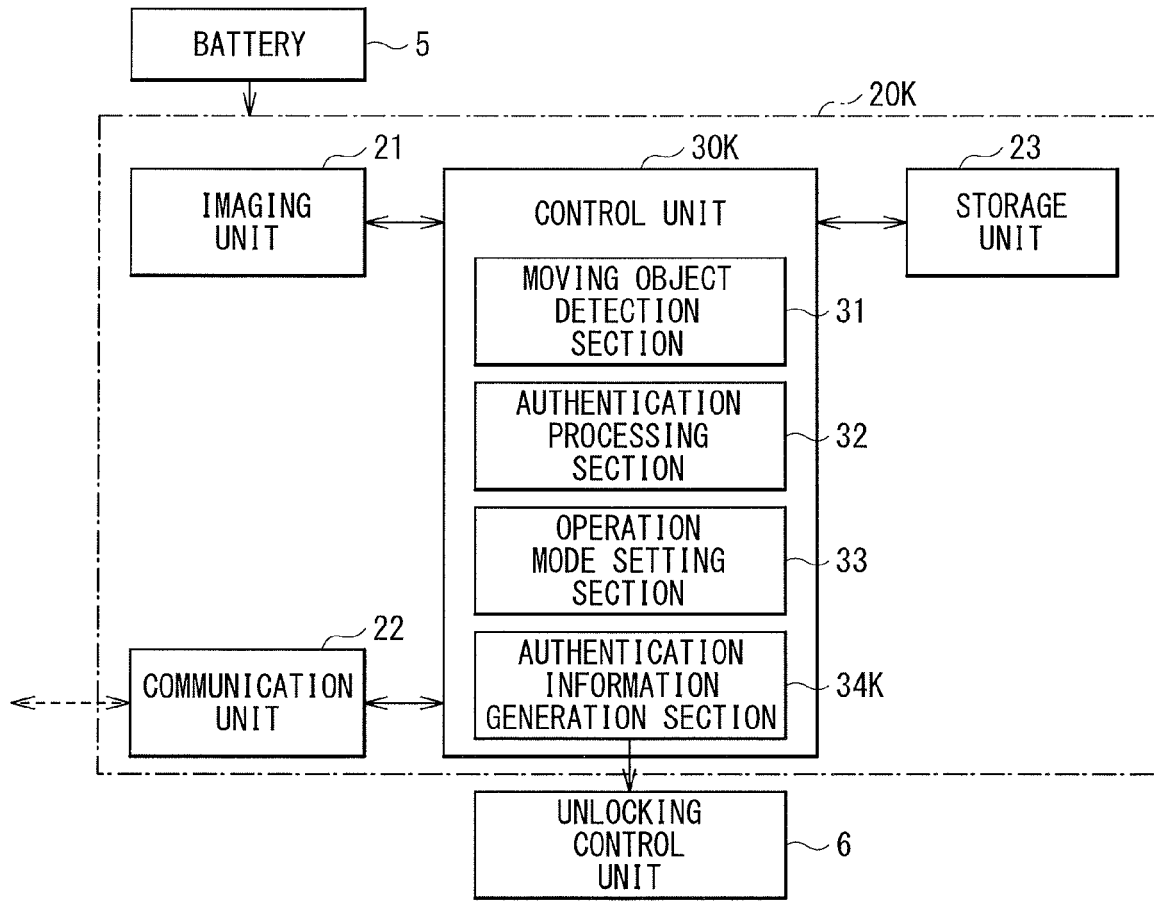

[ FIG. 21 ]
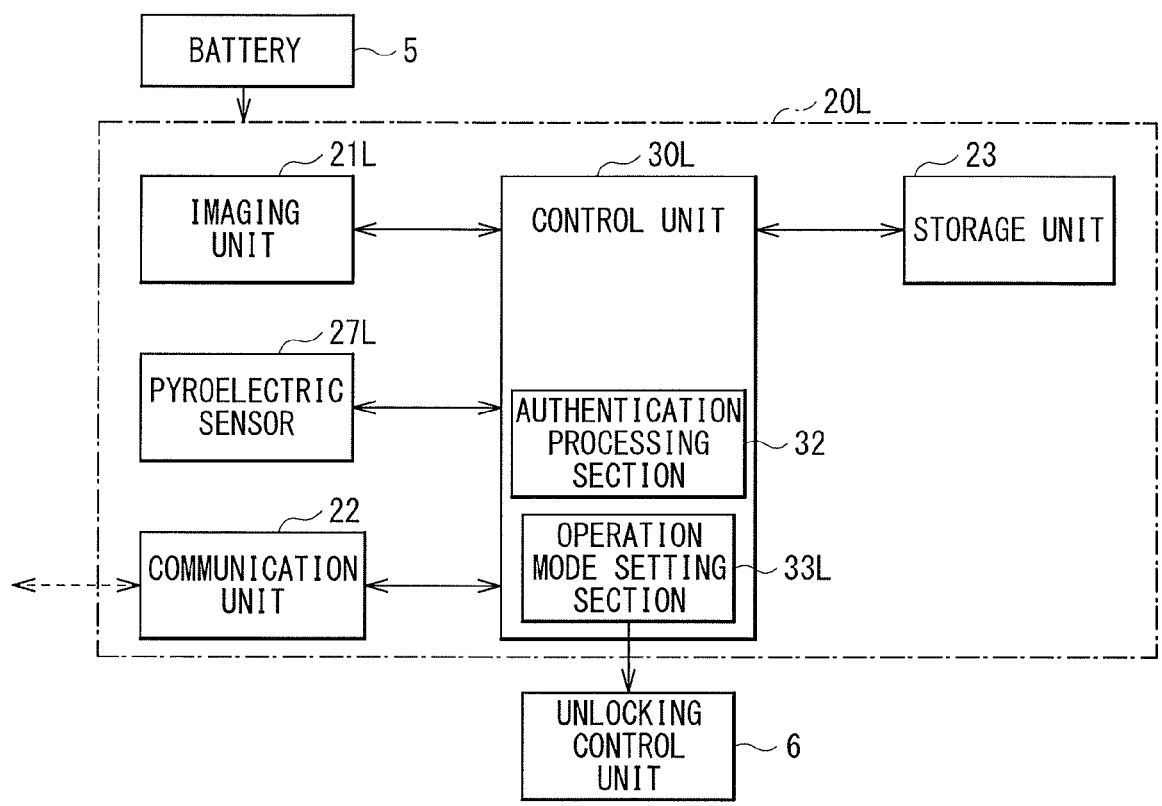

[ FIG. 22 ]
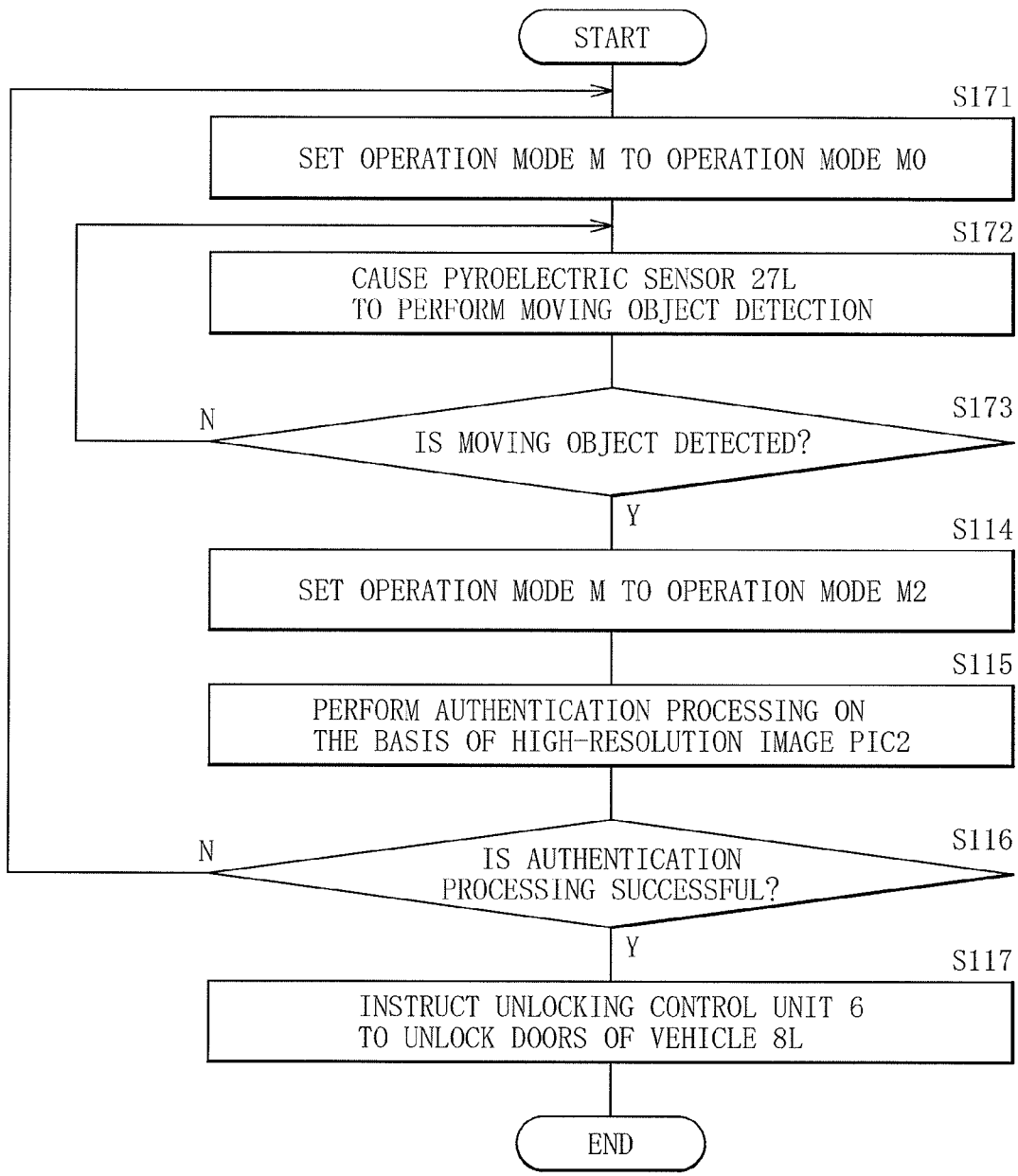

[ FIG. 23 ]
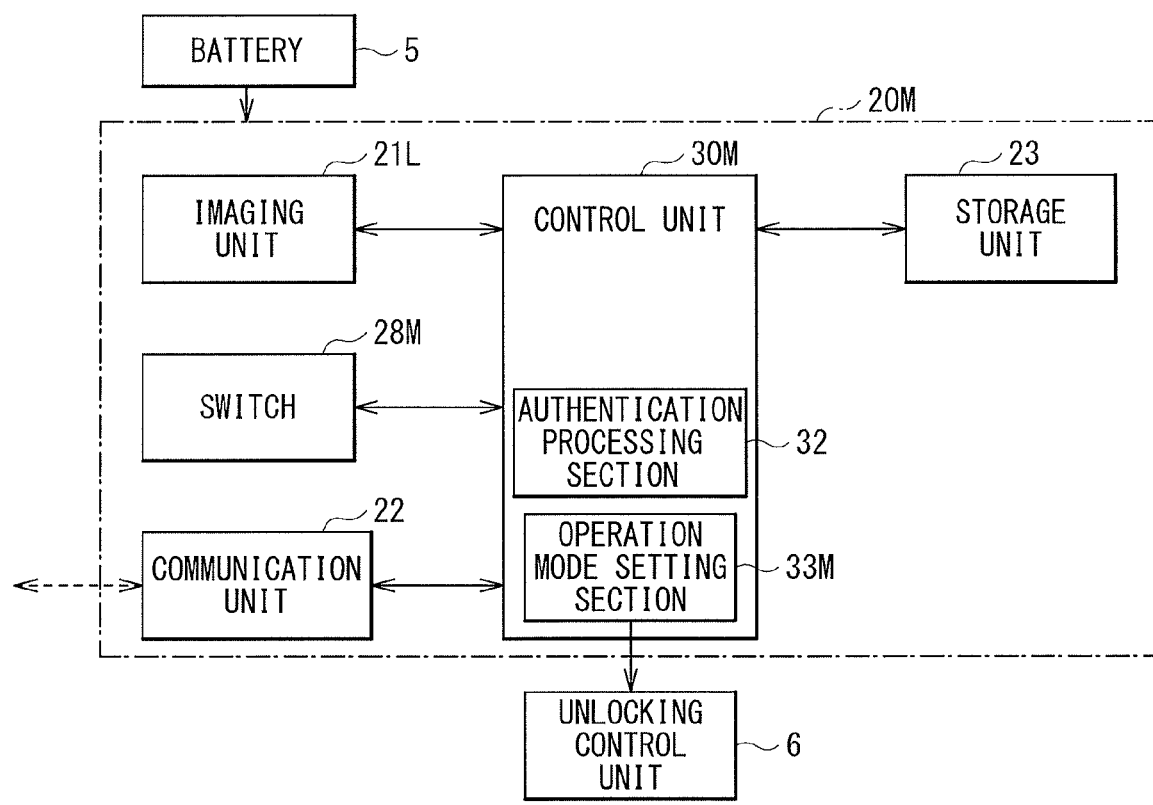

[ FIG. 24 ]
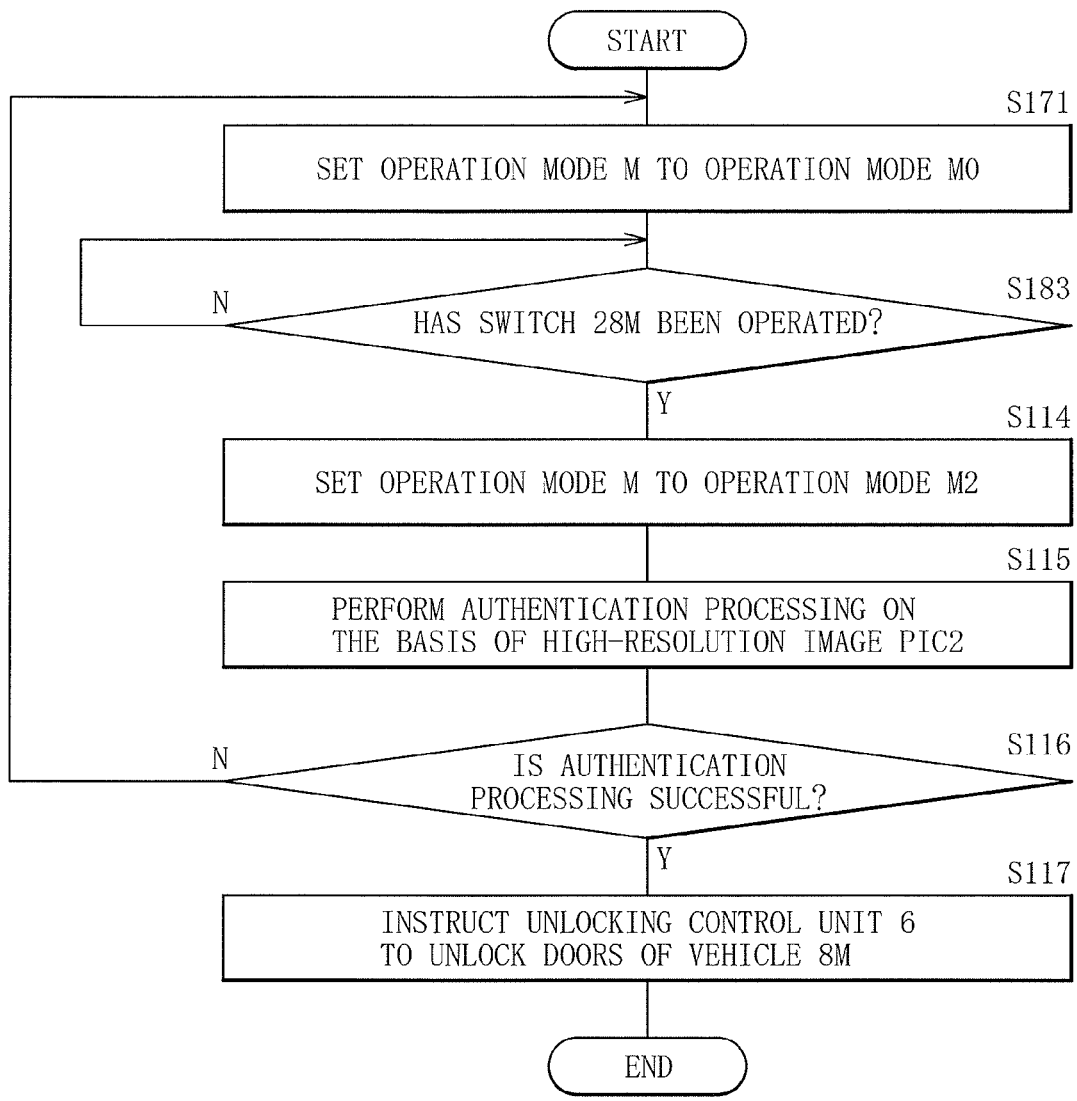

[ FIG. 25 ]
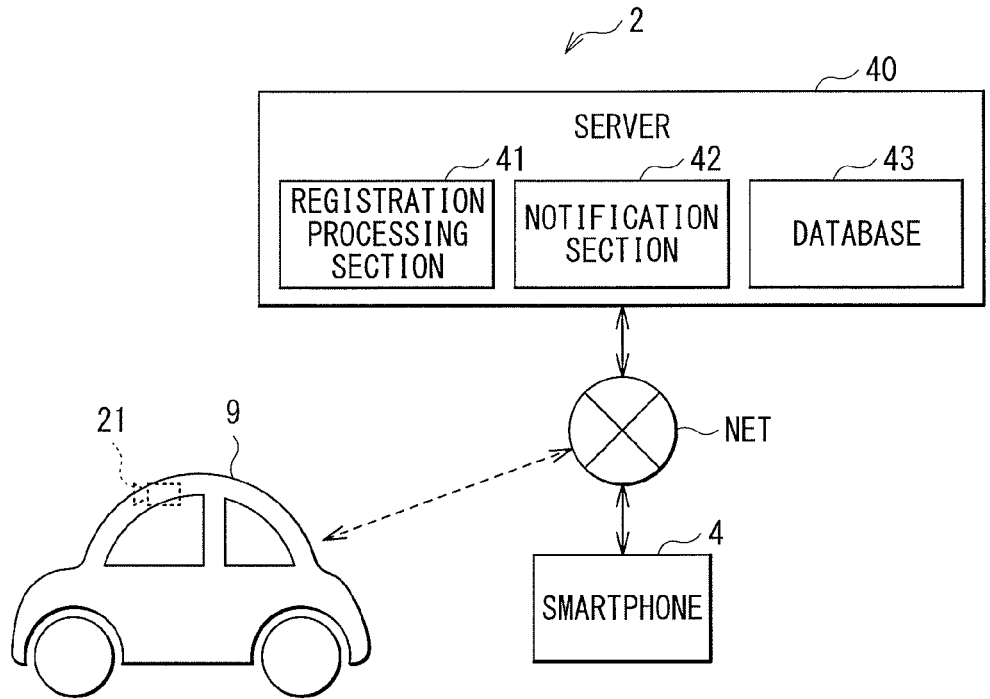
[ FIG. 26 ]
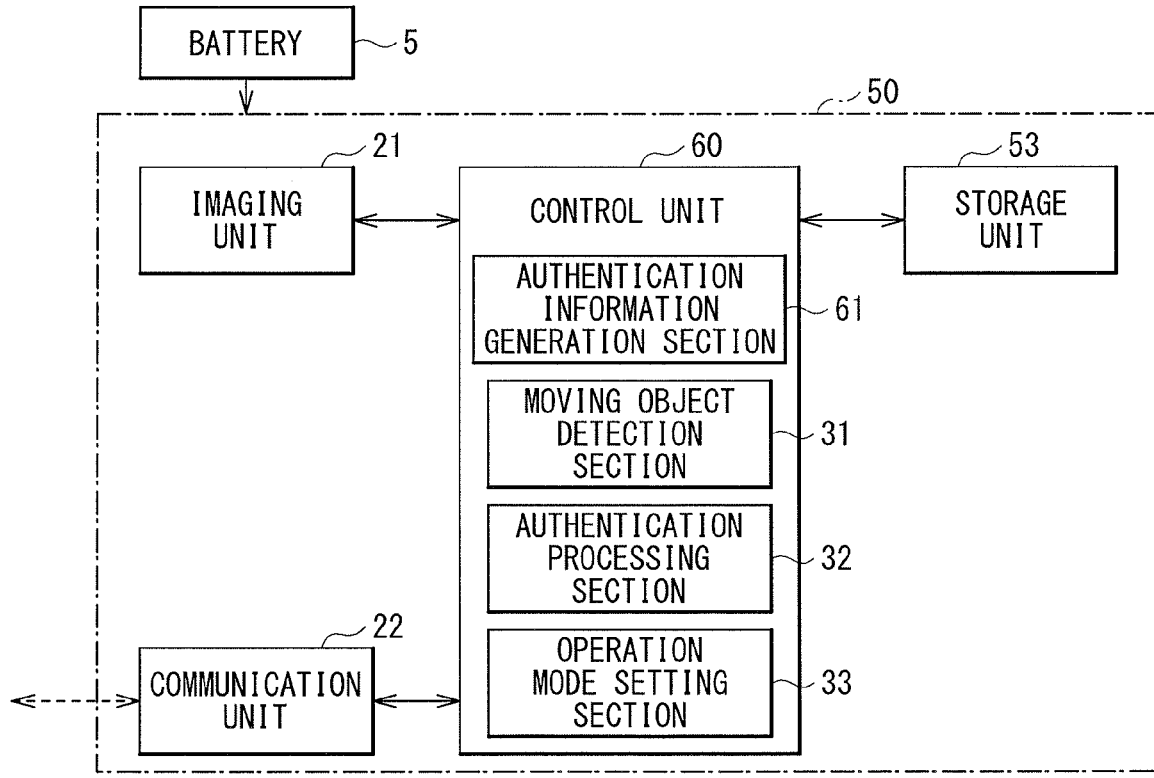

[ FIG. 27 ]
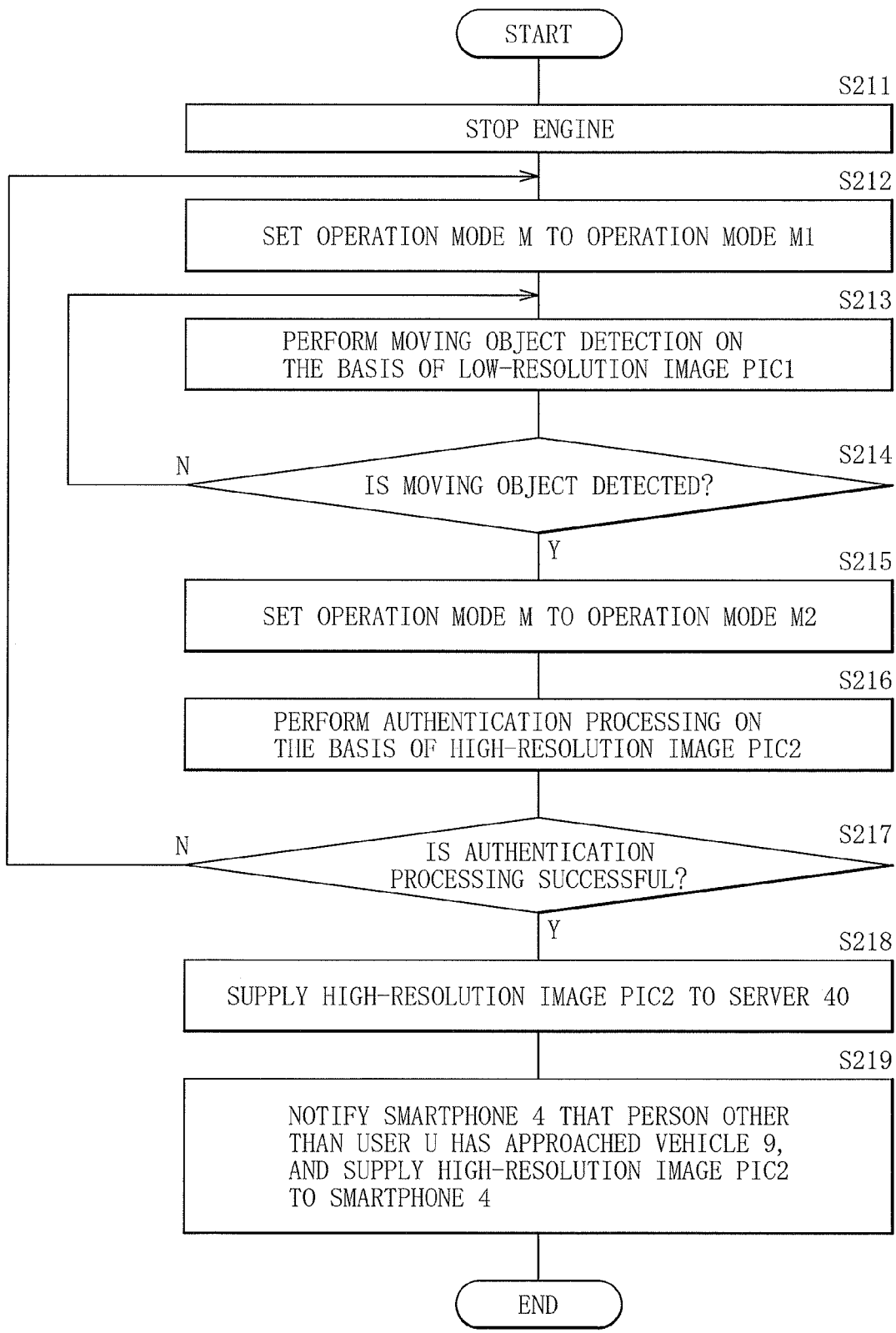

[ FIG. 28 ]
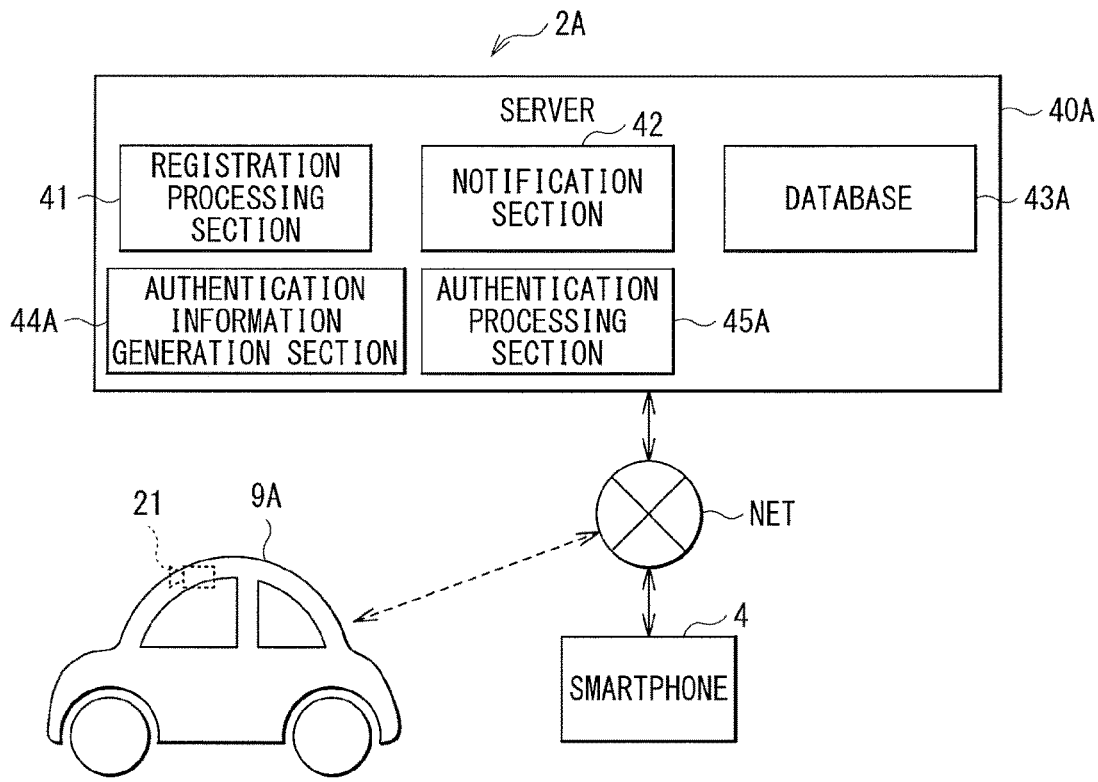
[ FIG. 29 ]
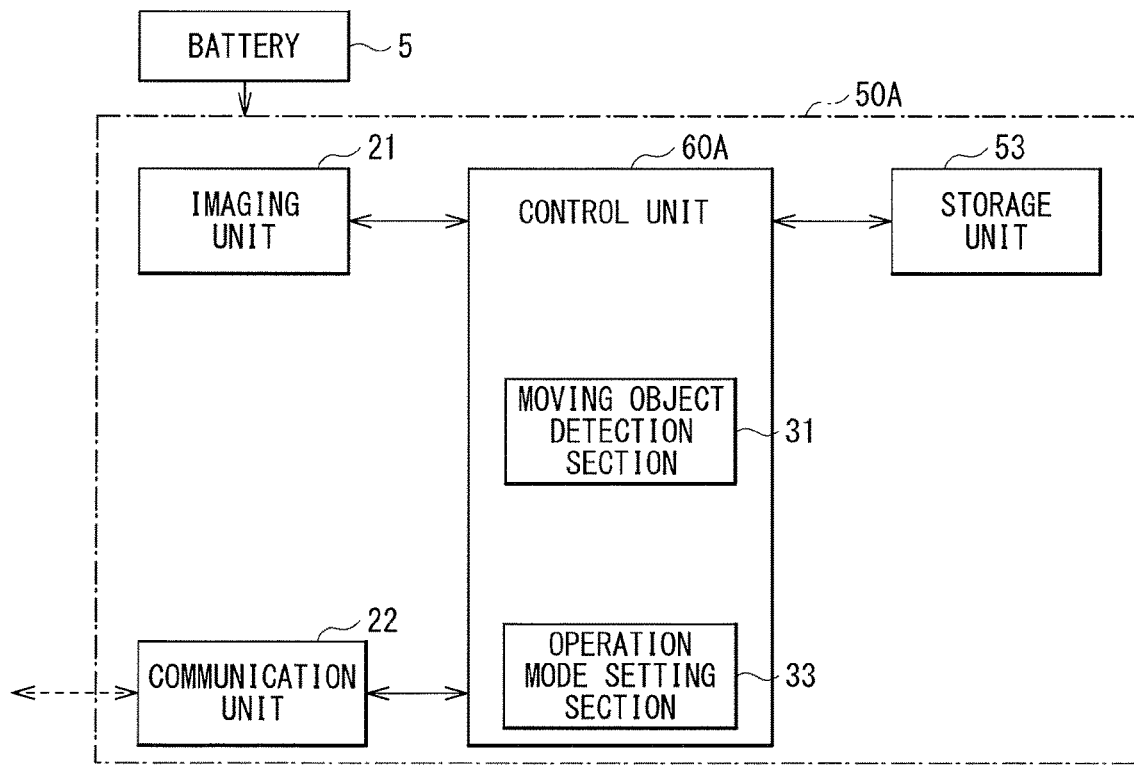

[ FIG. 30 ]
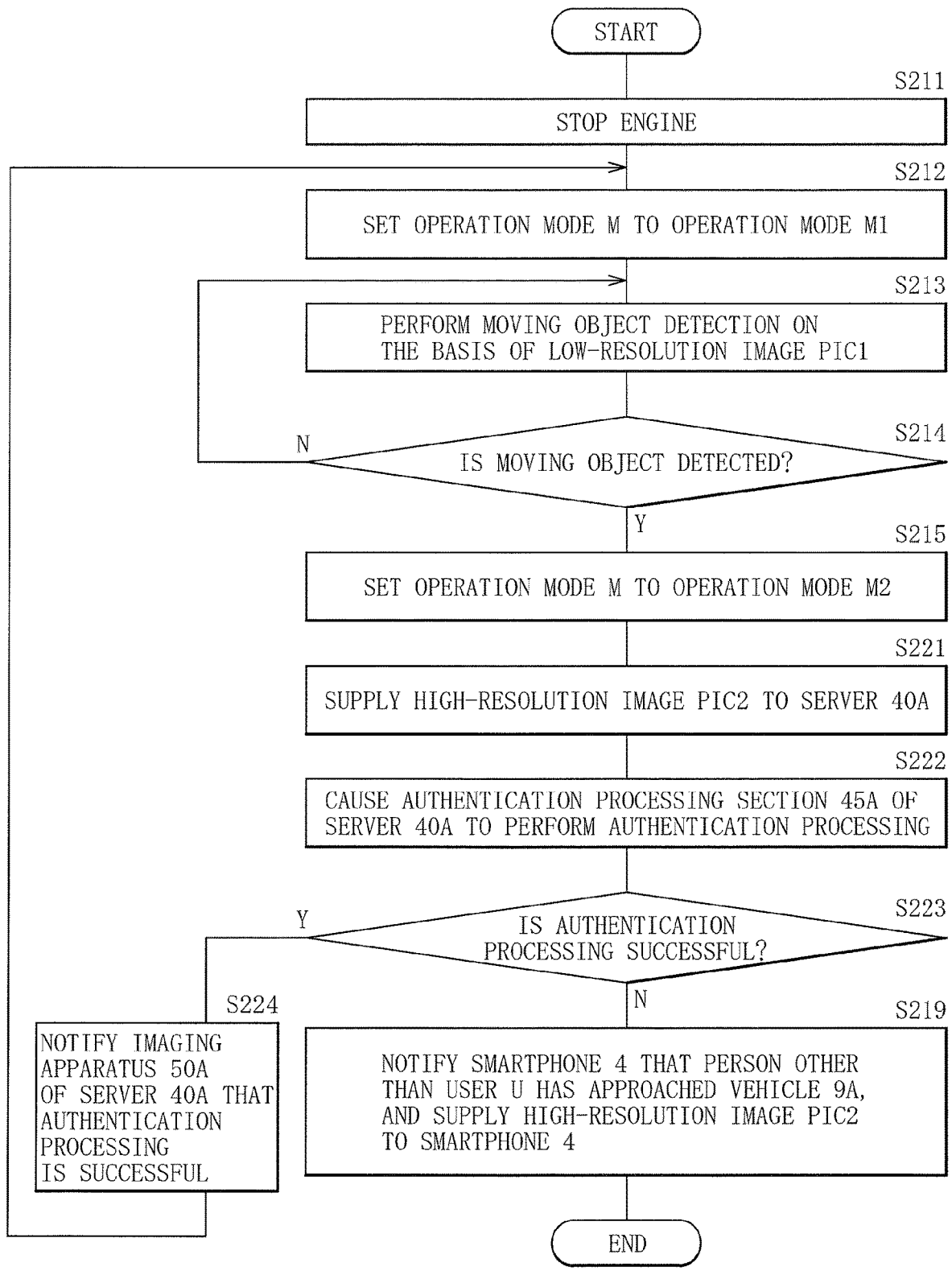

[FIG. 31]
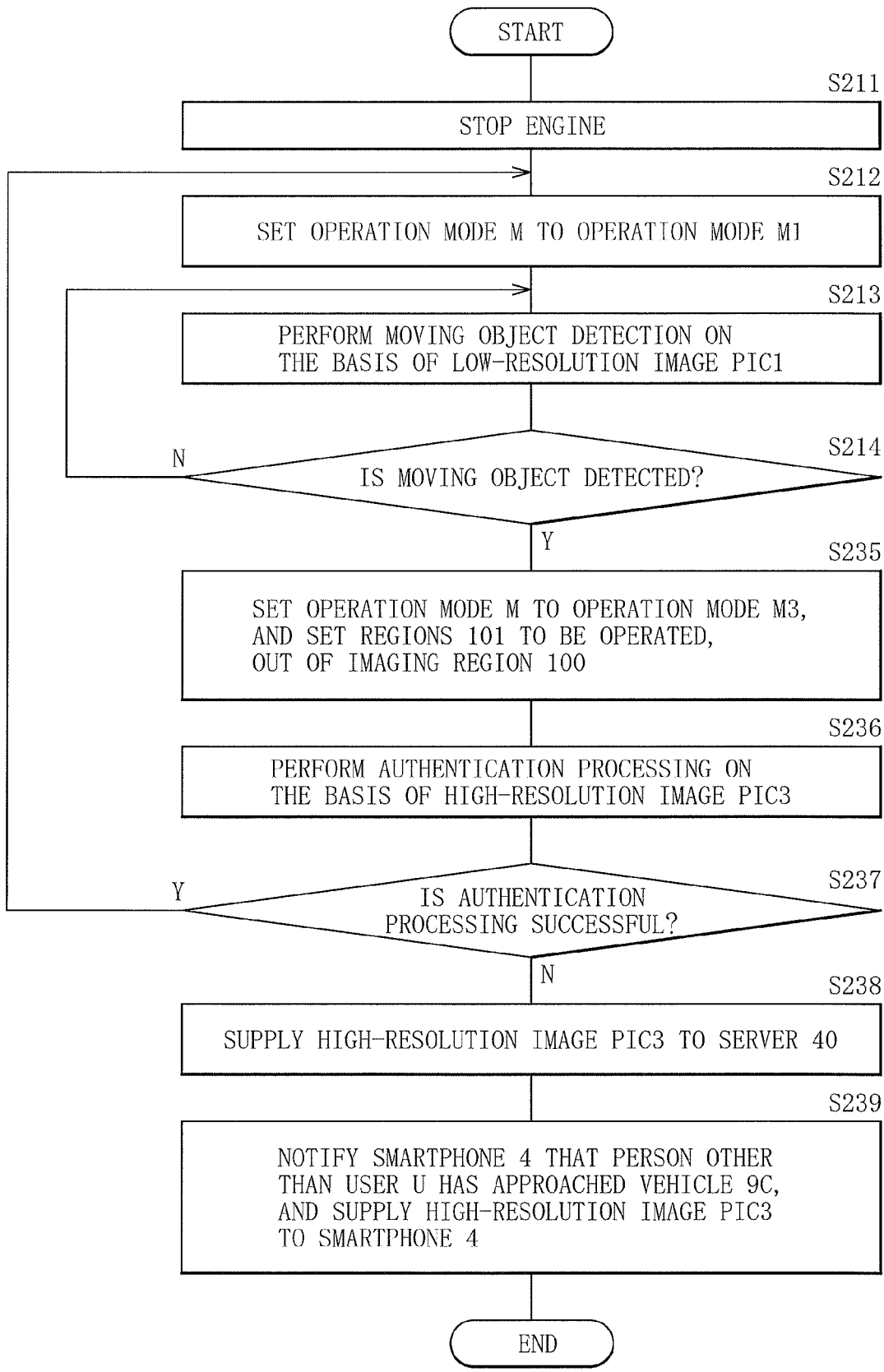

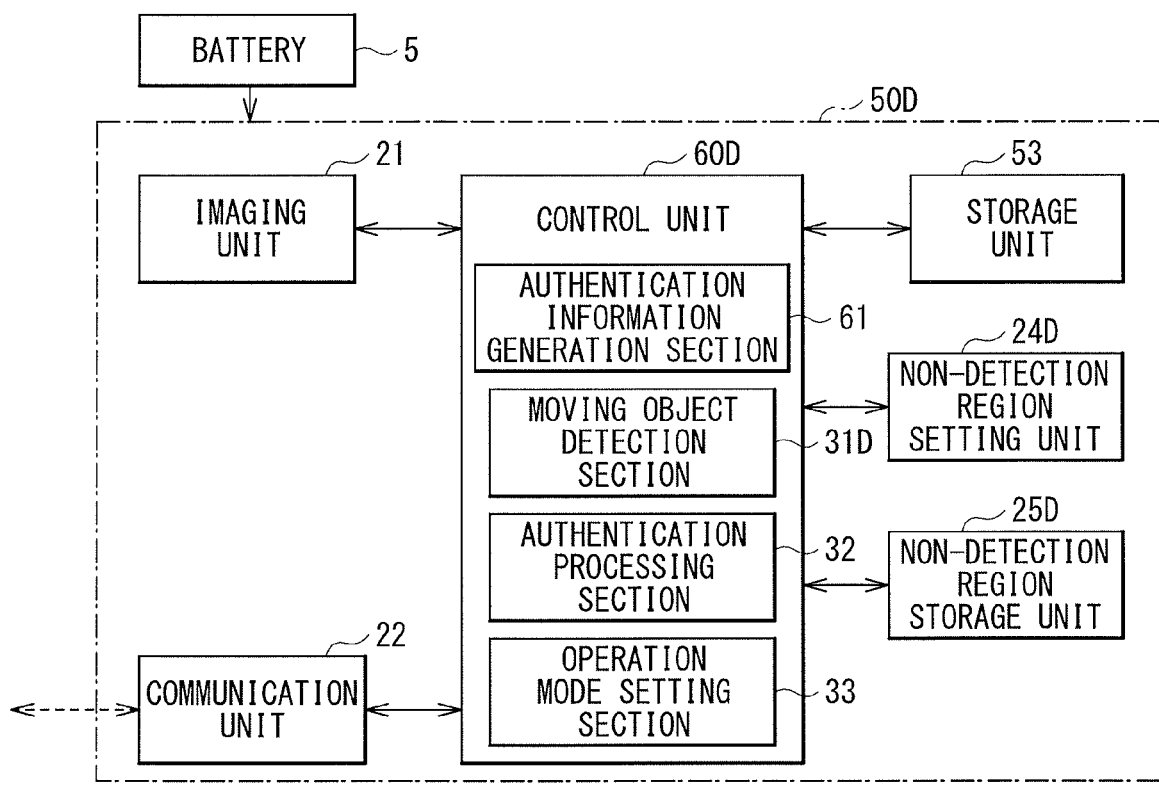
[ FIG. 32 ]

[ FIG. 33 ]
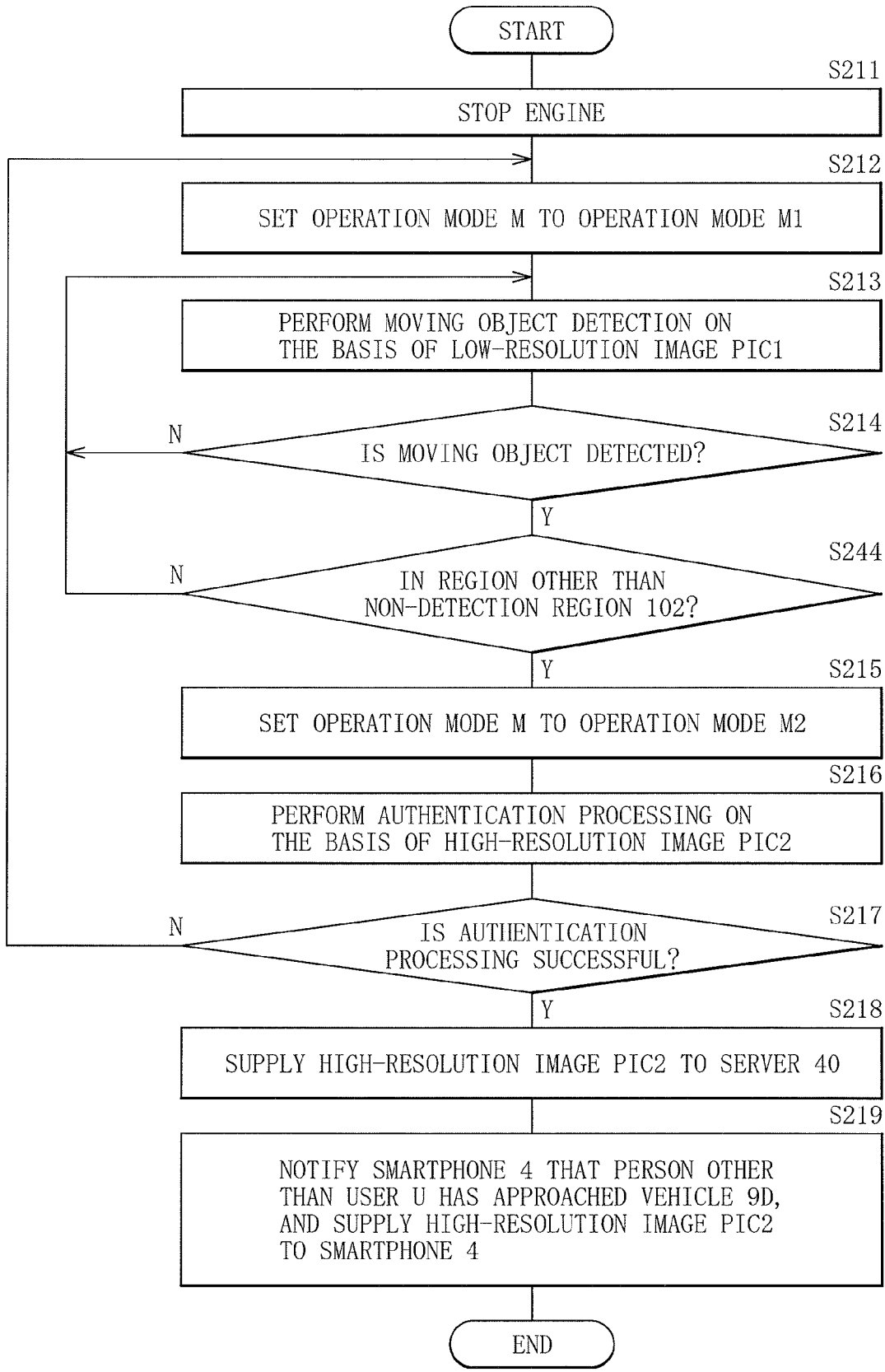

[ FIG. 34 ]
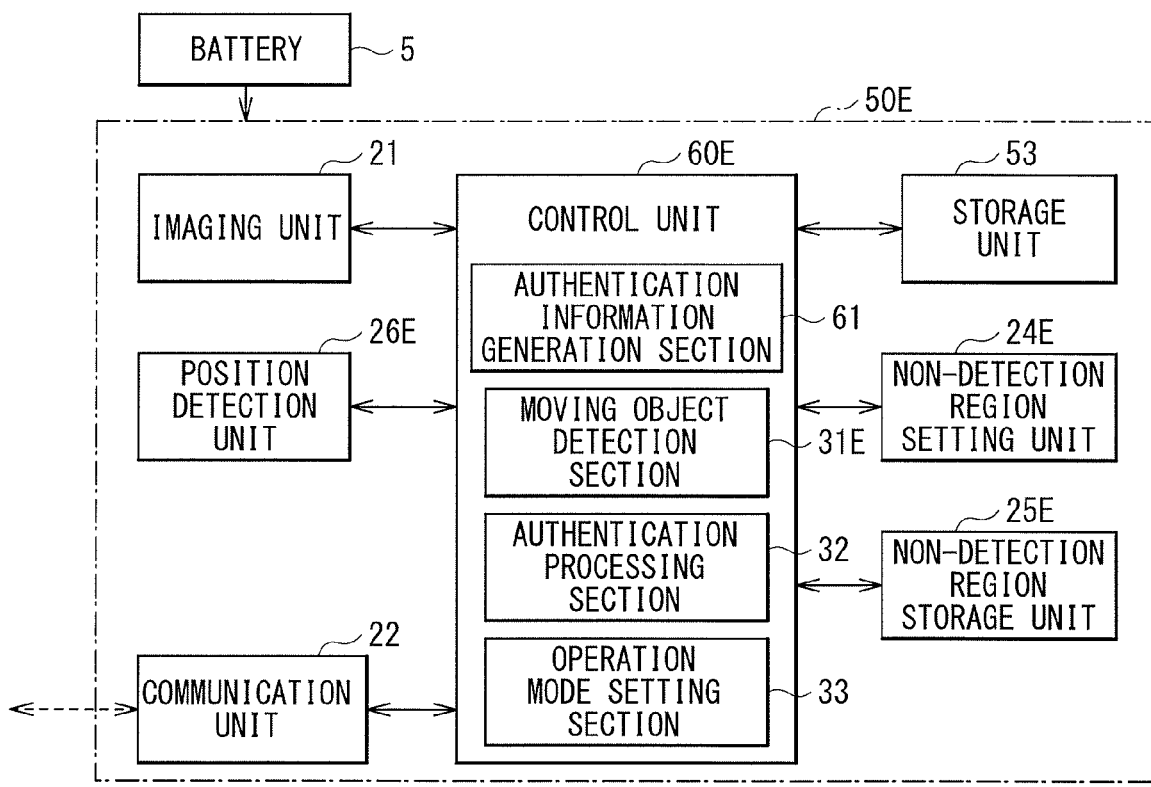

[ FIG. 35 ]
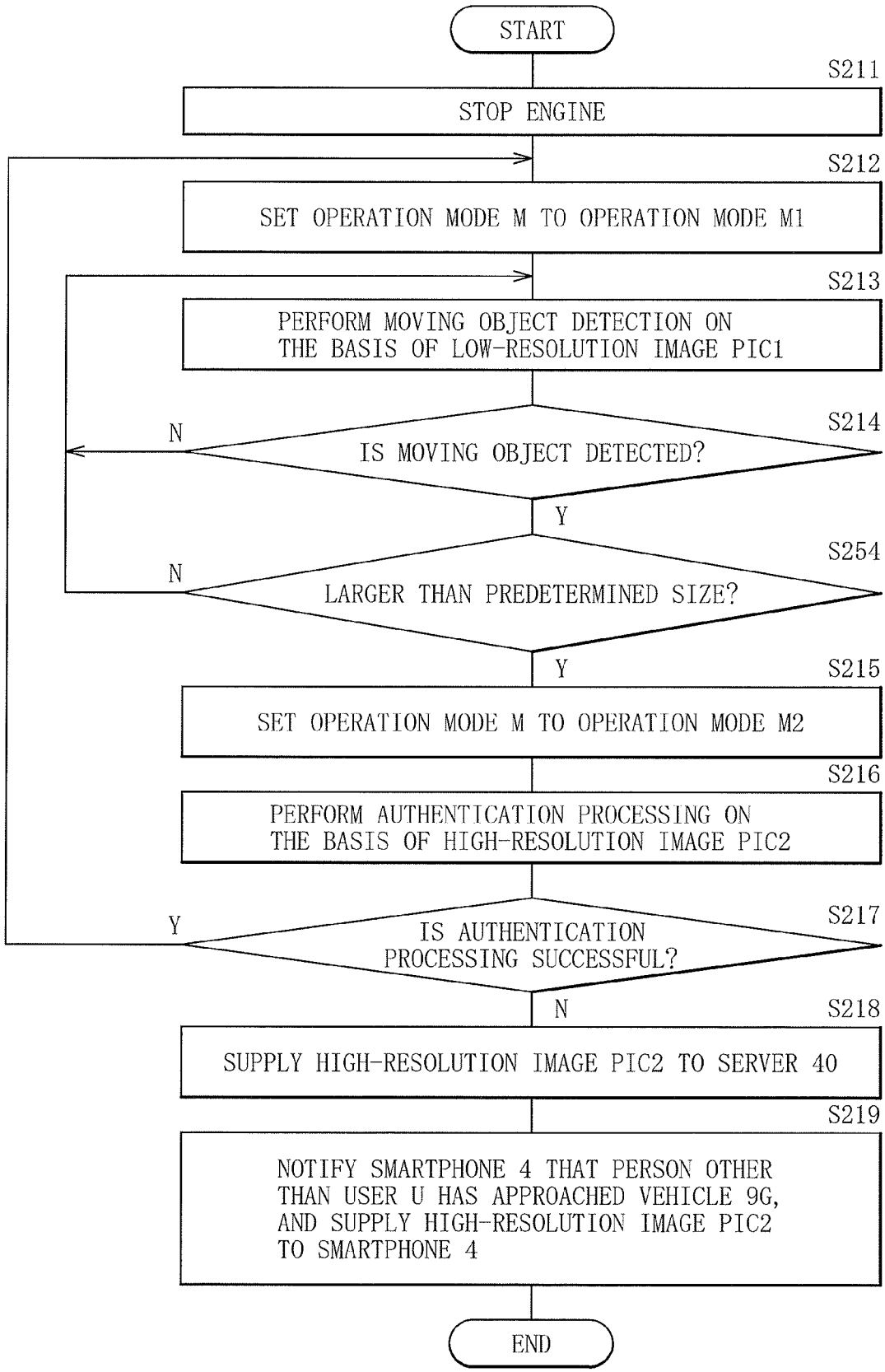

[ FIG. 36 ]
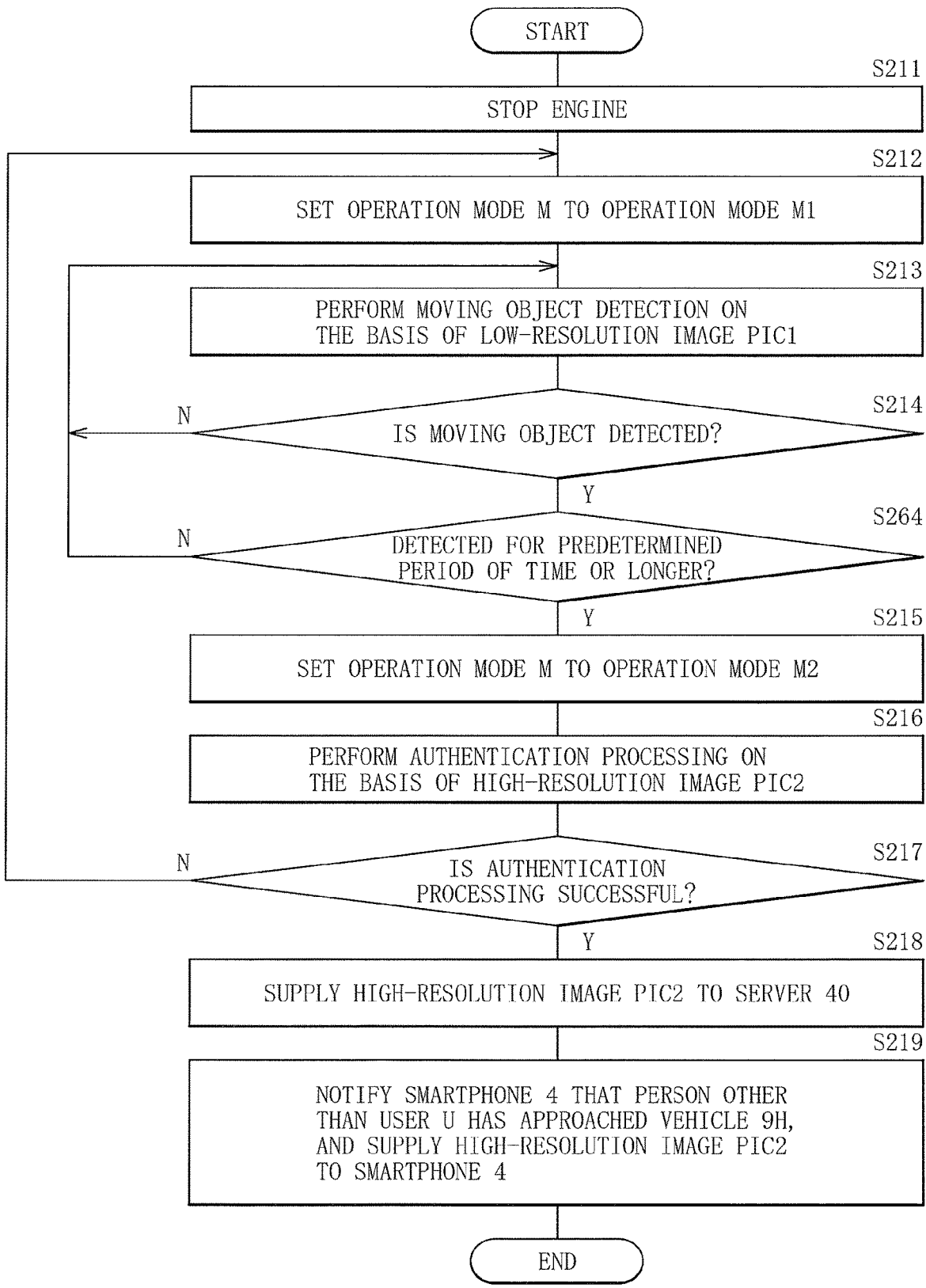

[ FIG. 37 ]
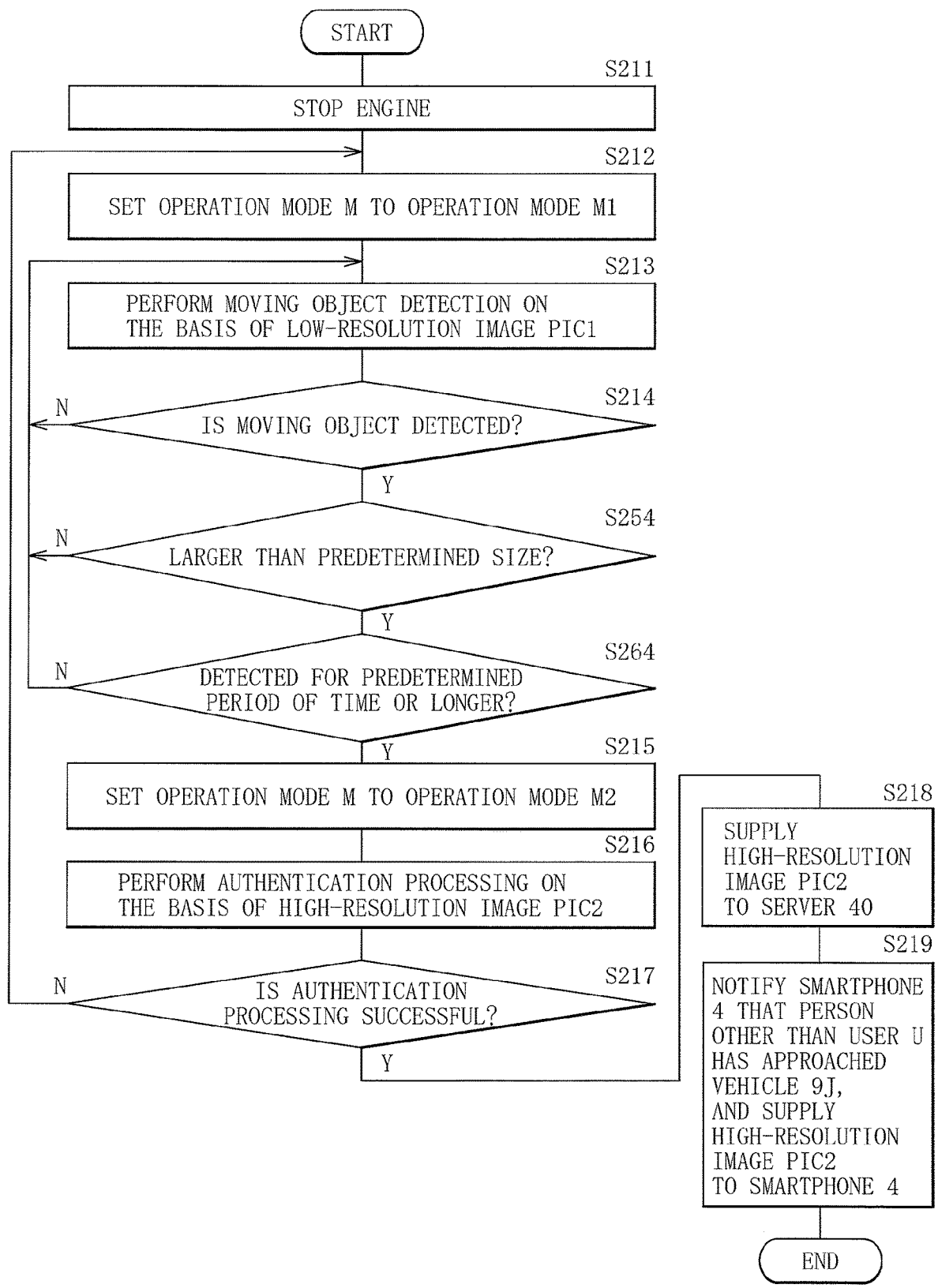

[ FIG. 38 ]
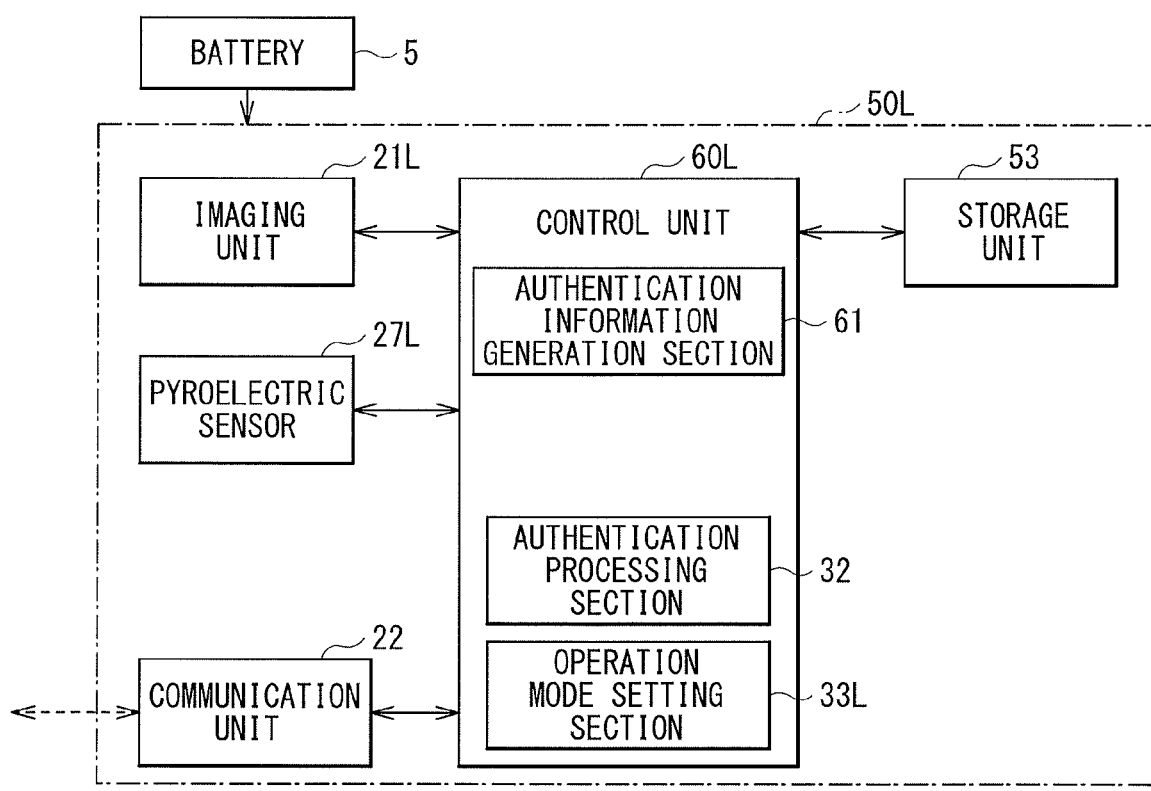

[ FIG. 39 ]
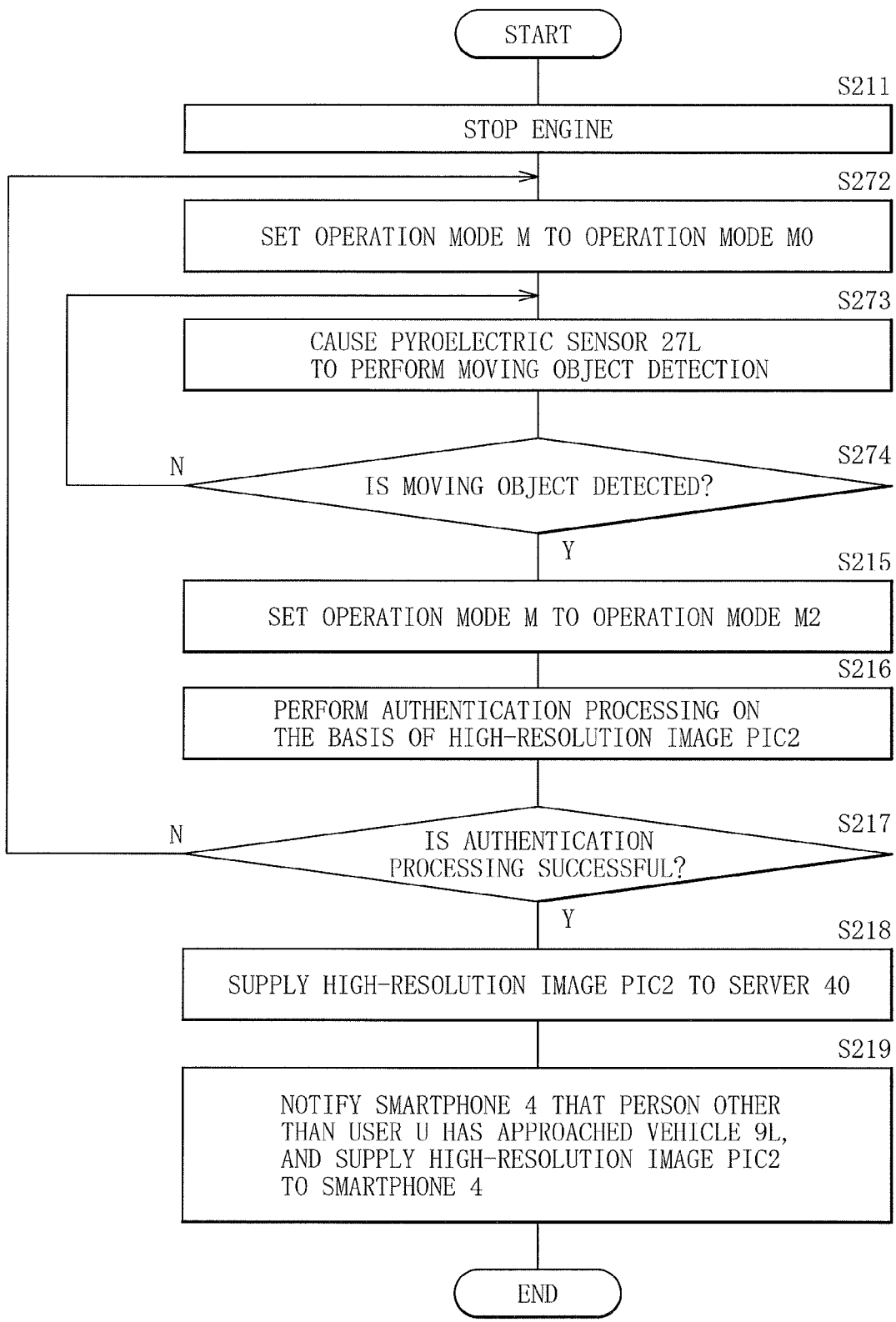

[ FIG. 40 ]
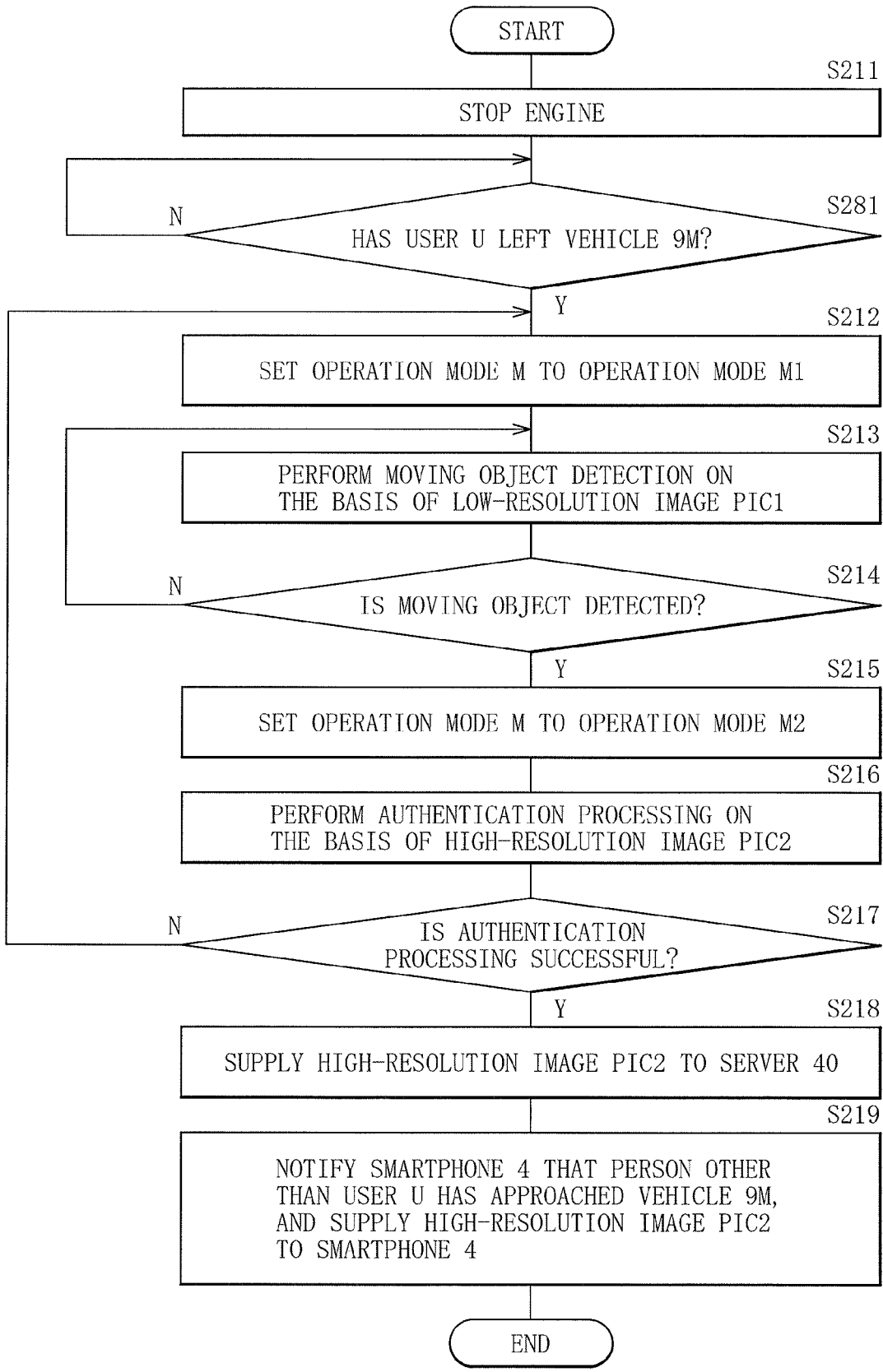

IMAGING APPARATUS HAVING A REDUCED POWER CONSUMPTION MODE AND MODE THAT GENERATES A CAPTURED IMAGE

TECHNICAL FIELD

The present disclosure relates to an imaging apparatus that captures an image, a vehicle utilization system including the imaging apparatus, and a vehicle monitoring system including the imaging apparatus.

BACKGROUND ART

In recent years, a camera is often used to acquire biometric information of a user, and authentication processing is performed on the basis of the biometric information. For example, PTL 1 discloses an electronic lock control system that acquires biometric information of a user using a mobile information terminal, performs authentication processing on the basis of the biometric information, and controls unlocking and locking of an electronic lock installed at the user's home on the basis of a result of the authentication processing.

CITATION LIST

Patent Literature

PTL 1: Japanese Unexamined Patent Application Publication No. 2005-36523

SUMMARY OF THE INVENTION

Incidentally, in general, it is desired, in an electronic apparatus, to reduce power consumption, and further reduction in power consumption is expected also in an imaging apparatus.

It is desirable to provide an imaging apparatus, a vehicle utilization system, and a vehicle monitoring system that make it possible to reduce power consumption.

An imaging apparatus according to an embodiment of the present disclosure includes an imaging unit and an operation mode setting section. The imaging unit has a plurality of operation modes including a first operation mode configured to reduce power consumption and a second operation mode that generates a captured image. The operation mode setting section selects one of the plurality of operation modes.

A vehicle utilization system according to an embodiment of the present disclosure includes a vehicle and a server. The vehicle includes an imaging apparatus. The imaging apparatus includes an imaging unit, an operation mode setting section, and a communication unit. The imaging unit has a plurality of operation modes including a first operation mode configured to reduce power consumption and a second operation mode that generates a captured image. The operation mode setting section selects one of the plurality of operation modes. The communication unit receives information on a reservation for utilization of the vehicle from the server.

A vehicle monitoring system according to an embodiment of the present disclosure includes a vehicle and a server. The vehicle includes an imaging apparatus. The imaging apparatus includes an imaging unit, an operation mode setting section, and a communication unit. The imaging unit has a plurality of operation modes including a first operation mode configured to reduce power consumption and a second operation mode that generates a captured image. The operation mode setting section selects one of the plurality of operation modes. The communication unit is configured to supply the captured image to the server.

In the imaging apparatus, the vehicle utilization system, and the vehicle monitoring system according to the embodiments of the present disclosure, the imaging unit performs such an operation as to reduce power consumption in the first operation mode, and generates a captured image in the second operation mode. The operation modes of the imaging unit are set by the operation mode setting section.

According to the imaging apparatus, the vehicle utilization system, and the monitoring system in the embodiments of the present disclosure, the imaging unit having the plurality of operation modes including the first operation mode and the second operation mode is used, thus making it possible to reduce power consumption. It is to be noted that the effects described herein are not necessarily limitative, and any of the effects described in the present disclosure may be provided.

BRIEF DESCRIPTION OF THE DRAWINGS

FIG. 1 is a configuration diagram illustrating a configuration example of a car sharing system according to a first embodiment of the present disclosure.

FIG. 2 is a block diagram illustrating a configuration example of an imaging apparatus in a vehicle illustrated in FIG. 1.

FIG. 3 is a flowchart illustrating an operation example of the car sharing system illustrated in FIG. 1.

FIG. 4 is another flow chart illustrating an operation example of the car sharing system illustrated in FIG. 1.

FIG. 5 is a configuration diagram illustrating a configuration example of a car sharing system according to a modification example of the first embodiment.

FIG. 6 is a block diagram illustrating a configuration example of an imaging apparatus in a vehicle illustrated in FIG. 5.

FIG. 7 is a flowchart illustrating an operation example of the car sharing system illustrated in FIG. 5.

FIG. 8 is an explanatory diagram illustrating a disposing example of an imaging unit according to another modification example of the first embodiment.

FIG. 9 is an explanatory diagram illustrating an example of an imaging region in the imaging unit according to another modification example of the first embodiment.

FIG. 10 is a flowchart illustrating an operation example of a car sharing system including the imaging unit illustrated in FIG. 9.

FIG. 11 is a block diagram illustrating a configuration example of an imaging apparatus according to another modification example of the first embodiment.

FIG. 12 is an explanatory diagram illustrating an example of a non-selection region.

FIG. 13 is a flowchart illustrating an operation example of a car sharing system including the imaging apparatus illustrated in FIG. 11.

FIG. 14 is a block diagram illustrating a configuration example of an imaging apparatus according to another modification example of the first embodiment.

FIG. 15 is an explanatory diagram illustrating an example of a captured image.

FIG. 16 is a flowchart illustrating an operation example of a car sharing system according to another modification example of the first embodiment.

FIG. 17 is a flowchart illustrating an operation example of a car sharing system according to another modification example of the first embodiment.

FIG. 18 is a flowchart illustrating an operation example of a car sharing system according to another modification example of the first embodiment.

FIG. 19 is a configuration diagram illustrating a configuration example of a car sharing system according to another modification example of the first embodiment.

FIG. 20 is a block diagram illustrating a configuration example of an imaging apparatus in a vehicle illustrated in FIG. 19.

FIG. 21 is a block diagram illustrating a configuration example of an imaging apparatus according to another modification example of the first embodiment.

FIG. 22 is a flowchart illustrating an operation example of a car sharing system including the imaging apparatus illustrated in FIG. 21.

FIG. 23 is a block diagram illustrating a configuration example of an imaging apparatus according to another modification example of the first embodiment.

FIG. 24 is a flowchart illustrating an operation example of a car sharing system including the imaging apparatus illustrated in FIG. 23.

FIG. 25 is a configuration diagram illustrating a configuration example of a vehicle monitoring system according to a second embodiment.

FIG. 26 is a block diagram illustrating a configuration example of an imaging apparatus in a vehicle illustrated in FIG. 25.

FIG. 27 is a flowchart illustrating an operation example of the vehicle monitoring system illustrated in FIG. 25.

FIG. 28 is a configuration diagram illustrating a configuration example of a vehicle monitoring system according to a modification example of the second embodiment.

FIG. 29 is a block diagram illustrating a configuration example of an imaging apparatus in a vehicle illustrated in FIG. 28.

FIG. 30 is a flowchart illustrating an operation example of the vehicle monitoring system illustrated in FIG. 28.

FIG. 31 is a flowchart illustrating an operation example of a vehicle monitoring system according to another modification example of the second embodiment.

FIG. 32 is a block diagram illustrating a configuration example of an imaging apparatus according to another modification example of the second embodiment.

FIG. 33 is a flowchart illustrating an operation example of a vehicle monitoring system including the imaging apparatus illustrated in FIG. 32.

FIG. 34 is a block diagram illustrating a configuration example of an imaging apparatus according to another modification example of the second embodiment.

FIG. 35 is a flowchart illustrating an operation example of a vehicle monitoring system according to another modification example of the second embodiment.

FIG. 36 is a flowchart illustrating an operation example of a vehicle monitoring system according to another modification example of the second embodiment.

FIG. 37 is a configuration diagram illustrating a configuration example of a vehicle monitoring system according to another modification example of the second embodiment.

FIG. 38 is a block diagram illustrating a configuration example of an imaging apparatus according to another modification example of the second embodiment.

FIG. 39 is a flowchart illustrating an operation example of a vehicle monitoring system including the imaging apparatus illustrated in FIG. 38.

FIG. 40 is a flowchart illustrating an operation example of a vehicle monitoring system according to another modification example of the second embodiment.

MODES FOR CARRYING OUT THE INVENTION

Hereinafter, description is given in detail of embodiments of the present disclosure with reference to the drawings. It is to be note that the description is given in the following order.
1. First embodiment (An example of a car sharing system)
2. Second embodiment (An example of a vehicle monitoring system)

1. First Embodiment

Configuration Example

FIG. 1 illustrates a configuration example of a car sharing system 1 including an imaging apparatus according to a first embodiment. It is to be noted that, although the car sharing system 1 is described as an example, this is not limitative; the present disclosure may be applied to, for example, a system that manages a rental car.

The car sharing system 1 includes a personal computer 7, a server 10, and a vehicle 8. The personal computer 7 and the server 10 are each coupled to Internet NET. In addition, an imaging apparatus 20 (described later) mounted on the vehicle 8 is coupled to the Internet NET via, for example, a mobile phone network. It is to be noted that this is not limitative; the imaging apparatus 20 may be coupled to the Internet NET via, for example, a wireless LAN (Local Area Network).

In the car sharing system 1, a user U operates, for example, the personal computer 7 to thereby reserve utilization of the vehicle 8. The server 10 performs reservation processing on the basis of information (reservation information INF3) on a reservation for utilization supplied from the personal computer 7, and supplies information (authentication information INF2) for authentication of the user U using a facial image of the user U to the imaging apparatus 20 (described later) of the reserved vehicle 8 together with the reservation information INF3. The imaging apparatus 20 of the vehicle 8 captures an image of a face of the user U when the user U utilizes the vehicle 8, and performs authentication processing using the authentication information INF2 on the basis of the captured image. When the authentication processing is successful, the vehicle 8 unlocks doors.

The personal computer 7 is, for example, a computer owned by the user U who uses the car sharing system 1. The personal computer 7 accepts an operation of the user U and communicates with the server 10. This allows the user U to perform user registration and to reserve the utilization of the vehicle 8. In a case where the user U performs the user registration, the car sharing system 1 creates an account of the user U, and the user U inputs user information INF1 such as an address and a name, and registers the facial image of the user U. Then, the personal computer 7 supplies the user information INF1 and the facial image of the user U to the server 10. In addition, in a case where the user U reserves the utilization of the vehicle 8, the user U inputs the reservation information INF3 such as a location, a vehicle type, and time for utilization. Then, the personal computer 7 supplies the reservation information INF3 to the server 10. It is to be noted that, although the personal computer 7 is used in this example, this is not limitative; alternatively, for example, a smartphone or a tablet terminal may be used.

The server 10 is an apparatus managed by a business operator who operates the car sharing system 1, for example. The server 10 includes a registration processing section 11, a reservation processing section 12, and a database 13.

The registration processing section 11 performs registration processing for registration of the user U on the basis of an instruction from the personal computer 7. Specifically, the registration processing section 11 creates an account of the user U on the basis of an instruction from the personal computer 7. Then, the registration processing section 11 generates the authentication information INF2 including various feature amounts relating to the facial image of the user U on the basis of the facial image of the user U supplied from the personal computer 7. Then, the registration processing section 11 registers, in the database 13, the user information INF1 supplied from the personal computer 7 and the generated authentication information INF2, in association with the account of the user U.

The reservation processing section 12 performs reservation processing of the vehicle 8 on the basis of the reservation information INF3 supplied from the personal computer 7. In addition, the reservation processing section 12 registers, in the database 13, the reservation information INF3 relating to the reservation processing, in association with the account of the user U.

The database 13 stores the user information INF1, the authentication information INF2, and the reservation information INF3, in association with the account of the user U.

This configuration causes the server 10 to accept a reservation for utilization of the vehicle 8. Then, the server 10 supplies the authentication information INF2 and the reservation information INF3 to the imaging apparatus 20 (described later) of the reserved vehicle 8.

The vehicle 8 is a vehicle managed by a business operator who operates the car sharing system 1, for example.

FIG. 2 illustrates a configuration example of the imaging apparatus 20 mounted on the vehicle 8. The imaging apparatus 20 includes an imaging unit 21, a communication unit 22, a storage unit 23, and a control unit 30.

The imaging unit 21 captures images of surroundings of the vehicle 8, and is configured by using, for example, a CIS (CMOS Image Sensor). The imaging unit 21 may capture a color image or a monochrome image. The imaging unit 21 is mounted, for example, in a vehicle interior of the vehicle 8, and is so disposed as to capture an image in the front direction of the vehicle 8 as illustrated in FIG. 1. It is to be noted that this is not limitative; alternatively, for example, the imaging unit 21 may be mounted outside the vehicle 8, or may be so disposed as to capture an image in the rear direction or the lateral direction of the vehicle 8. The imaging unit 21 acquires a facial image of the user U by capturing an image of the user U who has approached the vehicle 8, for example. The imaging unit 21 has two operation modes M (operation modes M1 and M2).

The operation mode M1 allows for acquisition of an image having low resolution (low-resolution image PIC1). The operation mode M1 is, for example, a mode in which a portion of a plurality of imaging pixels included in the imaging unit 21 is thinned out and operated; an operation of the imaging apparatus 20 in the operation mode M1 makes it possible to reduce power consumption. It is to be noted that this is not limitative; in the operation mode M1, a plurality of imaging pixels may be combined and operated to thereby acquire the low-resolution image PIC1. The imaging apparatus 20 performs moving object detection on the basis of the low-resolution image PIC1.

The operation mode M2 allows for acquisition of an image having high resolution (high-resolution image PIC2). The operation mode M2 is, for example, a mode in which all of the plurality of imaging pixels included in the imaging unit 21 are operated. The imaging apparatus 20 performs authentication processing on the basis of the high-resolution image PIC2.

In this example, the communication unit 22 communicates with the server 10 via a mobile phone network. The communication unit 22 receives, for example, the authentication information INF2 and the reservation information INF3 that are supplied from the server 10.

The storage unit 23 stores the authentication information INF2 and the reservation information INF3 that are supplied from the server 10.

The control unit 30 controls an operation of the imaging apparatus 20. The control unit 30 is configured by using, for example, CPU (Central Processing Unit), RAM (Random Access Memory), and the like. The control unit 30 includes a moving object detection section 31, an authentication processing section 32, and an operation mode setting section 33. The moving object detection section 31 detects presence or absence of a moving object on the basis of the low-resolution image PIC1 to thereby perform moving object detection. The authentication processing section 32 performs authentication processing by utilizing the authentication information INF2 on the basis of the high-resolution image PIC2. The operation mode setting section 33 sets the operation mode M of the imaging unit 21. In addition, the control unit 30 also has a function of instructing an unlocking control unit 6 (described later) to unlock doors of the vehicle 8 in a case where the authentication processing performed in the authentication processing section 32 is successful.

As illustrated in FIG. 2, the vehicle 8 includes a battery 5 and the unlocking control unit 6, in addition to the imaging apparatus 20. The battery 5 is a so-called car battery that supplies electric power to the imaging apparatus 20 and various electronic apparatuses of the vehicle 8. The unlocking control unit 6 controls unlocking and locking of the doors of the vehicle 8. The unlocking control unit 6 is configured by using ECU (Engine Control Unit) that controls operations of various apparatuses of the vehicle 8, such as an engine and an air-conditioning equipment.

This configuration allows the imaging unit 21 to first operate in the operation mode M1 to thereby acquire the low-resolution image PIC1. Then, the moving object detection section 31 performs moving object detection on the basis of the low-resolution image PIC1. In a case where a moving object is detected, the imaging unit 21 operates in the operation mode M2 to thereby acquire the high-resolution image PIC2. Then, the authentication processing section 32 performs authentication processing by utilizing the authentication information INF2 on the basis of the high-resolution image PIC2. In a case where the authentication processing is successful, the control unit 30 instructs the unlocking control unit 6 to unlock the doors of the vehicle 8.

Here, the car sharing system 1 corresponds to a specific example of a "vehicle utilization system" in the present disclosure. The imaging unit 21 corresponds to a specific example of an "imaging unit" in the present disclosure. The operation mode M1 corresponds to a specific example of a "first operation mode" in the present disclosure. The operation mode M2 corresponds to a specific example of a "second operation mode" in the present disclosure. The high-resolution image PIC2 corresponds to a specific example of a "captured image" in the present disclosure. The operation mode setting section 33 corresponds to a specific example of an "operation mode setting section" in the present disclosure. The moving object detection section 31 corresponds to a specific example of a "detection processing section" in the present disclosure. The server 10 corresponds to a specific example of a "second apparatus" in the present disclosure.

[Operations and Workings]

Next, description is given of operations and workings of the car sharing system 1 of the present embodiment.

(Overview of Overall Operation)

First, description is given of an overview of an overall operation of the car sharing system 1 with reference to FIGS. 1 and 2. The registration processing section 11 of the server 10 performs registration processing on the basis of an instruction from the personal computer 7. Specifically, the registration processing section 11 creates an account of the user U on the basis of the instruction from the personal computer 7. Then, the registration processing section 11 generates the authentication information INF2 including various feature amounts relating to the facial image of the user U on the basis of the facial image of the user U supplied from the personal computer 7. Then, the registration processing section 11 registers, in the database 13, the user information INF1 and the authentication information INF2, in association with the account of the user U. The reservation processing section 12 performs reservation processing of the vehicle 8 on the basis of the reservation information INF3 supplied from the personal computer 7. Then, the reservation processing section 12 registers, in the database 13, the reservation information INF3 relating to the reservation processing, in association with the account of the user U. Then, the server 10 supplies the authentication information INF2 and the reservation information INF3 to the imaging apparatus 20 of the reserved vehicle 8.

The communication unit 22 of the imaging apparatus 20 receives the authentication information INF2 and the reservation information INF3 that are supplied from the server 10, and the storage unit 23 stores the authentication information INF2 and the reservation information INF3. The imaging unit 21 first operates in the operation mode M1 to thereby acquire the low-resolution image PIC1. Then, the moving object detection section 31 performs moving object detection on the basis of the low-resolution image PIC1. In a case where a moving object is detected, the imaging unit 21 operates in the operation mode M2 to thereby acquire the high-resolution image PIC2. The authentication processing section 32 performs authentication processing by utilizing the authentication information INF2 on the basis of the high-resolution image PIC2. In a case where the authentication processing is successful, the control unit 30 instructs the unlocking control unit 6 to unlock the doors of the vehicle 8.

(Detailed Operation)

FIG. 3 illustrates an operation example of the car sharing system 1 when the user U reserves utilization of the vehicle 8.

First, the personal computer 7 generates the reservation information INF3 on the basis of an operation of the user U, and supplies the generated reservation information INF3 to the server 10 (step S101).

Next, the reservation processing section 12 of the server 10 registers the received reservation information INF3 in the database 13, in association with the account of the user U (step S102).

Next, the server 10 supplies, to the imaging apparatus 20 of the reserved vehicle 8, the reservation information INF3 and the authentication information INF2 relating to the user U who has reserved the utilization of the vehicle 8 (step S103).

This completes the flow.

FIG. 4 illustrates an operation example of the car sharing system 1 when the user U who has reserved utilization of the vehicle 8 starts the utilization of the vehicle 8.

First, the operation mode setting section 33 sets the operation mode M of the imaging unit 21 to the operation mode M1 (step S111). This allows the imaging unit 21 to start acquiring the low-resolution image PIC1. It is to be noted that the operation mode setting section 33 may set the operation mode M to the operation mode M1 when a previous user of the vehicle 8 has parked the vehicle 8 at a station of the car sharing system 1, or may set the operation mode M to the operation mode M1 at a starting time of the utilization indicated by the reservation information INF3.

Next, the moving object detection section 31 performs moving object detection on the basis of the low-resolution image PIC1 (step S112).

Next, the moving object detection section 31 checks whether or not a moving object is detected (step S113). When no moving object is detected ("N" in step S113), the flow returns to step S112, and these steps S112 and S113 are repeated until a moving object is detected. Specifically, these steps S112 and S113 are repeated, for example, until the user U approaches the vehicle 8 in a period of time corresponding to the reservation information INF3 and the moving object detection section 31 detects the user U as a moving object.

In a case where a moving object is detected in step S113 ("Y" in step S113), the operation mode setting section 33 sets the operation mode M of the imaging unit 21 to the operation mode M2 (step S114). This allows the imaging unit 21 to acquire the high-resolution image PIC2. The high-resolution image PIC2 includes, for example, a facial image of the user U.

Next, the authentication processing section 32 performs authentication processing by utilizing the authentication information INF2 stored in the storage unit 23 on the basis of the high-resolution image PIC2 (step S115). That is, the high-resolution image PIC2 includes, for example, the facial image of the user U, and thus the authentication processing section 32 performs the authentication processing by utilizing the authentication information INF2 on the basis of the high-resolution image PIC2.

Next, the authentication processing section 32 checks whether or not the authentication processing is successful (step S116). In a case where the authentication processing has failed ("N" in step S116), the flow returns to step S111, and the operation mode setting section 33 sets the operation mode M to the operation mode M1. That is, in this case, for example, a stranger having no relation with the user U who has reserved the utilization happens to approach the vehicle 8 and the operation mode setting section 33 has set the operation mode M to the operation mode M2; therefore, the operation mode setting section 33 returns the operation mode M to the operation mode M1.

In a case where the authentication processing is successful in step S116 ("Y" in step S116), the control unit 30 instructs the unlocking control unit 6 to unlock doors of the vehicle 8 (step S117).

This completes the flow. This allows the unlocking control unit 6 to unlock the doors of the vehicle 8, thus enabling the user U to utilize the vehicle 8.

As described above, in the car sharing system 1, the authentication processing is performed on the basis of a captured image (the high-resolution image PIC2), and when the authentication processing is successful, the doors of the vehicle 8 are unlocked, thus making it possible to enhance convenience of the user U. That is, for example, in a case where a reader/writer of near field communication (NFC; Near Field Communication) is mounted on a vehicle and the vehicle is utilized by waving a member card of the car sharing system over the reader/writer, for example, leaving the member card behind at home makes the car sharing system unavailable, which is inconvenient. In addition, for example, losing a member card leads to a possibility that the member card may be utilized illegally by a person who has picked up the member card. Meanwhile, in the car sharing system 1, the authentication processing is performed on the basis of a captured image, and thus only capturing an image of the user U enables the user U to utilize the car sharing system 1, thus making it possible to enhance convenience of the user.

In addition, in the car sharing system 1, the imaging apparatus 20 is configured by using the imaging unit 21 having the operation modes M1 and M2, thus making it possible to reduce power consumption. That is, the high-resolution image PIC2 needs to be used to perform the authenticating process; however, in a case where the imaging unit 21 acquires the high-resolution image PIC2 constantly, there is a possibility that the power consumption may increase. As a result, there is a possibility, in the vehicle 8, that a battery level in the battery 5 may be lowered. Meanwhile, in the car sharing system 1, first setting the operation mode M of the imaging unit 21 to the operation mode M1 allows the low-resolution image PIC1 to be acquired. Then, in a case where a moving object is detected on the basis of the low-resolution image PIC1, the operation mode M of the imaging unit 21 is set to the operation mode M2, thereby allowing the high-resolution image PIC2 to be acquired. This enables the car sharing system 1 to effectively reduce the power consumption.

Further, in the car sharing system 1, the authentication processing is configured to be performed on the basis of a result of imaging performed by the imaging unit 21, thus making it possible to suppress introduction costs. That is, in recent years, a vehicle has been increasingly equipped with a drive recorder and an advanced driver assistance system (ADAS; advanced driver assistance system). The vehicle with the drive recorder and the ADAS being introduced is mounted with an imaging unit. Therefore, configuring the imaging apparatus 20 by using the imaging unit that has already been mounted in this manner makes it possible to suppress the introduction costs.

[Effects]

As described above, in the present embodiment, the authentication processing is performed on the basis of a captured image, and the doors of the vehicle are unlocked when the authentication processing is successful, thus making it possible to enhance convenience of the user.

In the present embodiment, the imaging apparatus is configured by using the imaging unit having the operation modes M1 and M2, thus making it possible to reduce the power consumption.

In the present embodiment, the authentication processing is configured to be performed on the basis of a result of imaging performed by the imaging unit, thus making it possible to suppress the introduction costs.

Modification Example 1-1

In the above embodiment, the imaging apparatus 20 performs the authentication processing, but this is not limitative; alternatively, for example, a server may perform the authentication processing. Hereinafter, the car sharing system 1A according to the present modification example is described in detail.

FIG. 5 illustrates a configuration example of the car sharing system 1A. The car sharing system 1A includes a server 10A and a vehicle 8A.

The server 10A includes an authentication processing section 14A. The authentication processing section 14A performs authentication processing using the authentication information INF2 stored in the database 13 on the basis of the high-resolution image PIC2 supplied from an imaging apparatus 20A (described later) of the vehicle 8A. In addition, the server 10A also has a function of notifying the imaging apparatus 20A (described later) of the vehicle 8A of a processing result of the authentication processing performed by the authentication processing section 14A.

Here, the server 10A corresponds to a specific example of a "third apparatus" in the present disclosure.

FIG. 6 illustrates a configuration example of the imaging apparatus 20A mounted on the vehicle 8A. The imaging apparatus 20A includes a control unit 30A. The control unit 30A includes the moving object detection section 31 and the operation mode setting section 33. That is, the control unit 30A omits the authentication processing section 32 from the control unit 30 according to the foregoing first embodiment. In addition, the control unit 30A also has functions of supplying, to the server 10A using the communication unit 22, the high-resolution image PIC2 acquired by the imaging unit 21 when the operation mode M of the imaging unit 21 is set to the operation mode M2 and of instructing the unlocking control unit 6 to unlock doors of the vehicle 8A in a case where a notification is received from the server 10A to the effect that authentication processing is successful.

FIG. 7 illustrates an operation example of the car sharing system 1A when the user U who has reserved utilization of the vehicle 8A starts the utilization of the vehicle 8A.

Similarly to the case of the foregoing first embodiment (FIG. 4), first, the operation mode setting section 33 sets the operation mode M of the imaging unit 21 to the operation mode M1 (step S111). This allows the imaging unit 21 to start acquiring the low-resolution image PIC1. Next, the moving object detection section 31 performs moving object detection on the basis of the low-resolution image PIC1 (step S112). Then, the moving object detection section 31 checks whether or not a moving object is detected (step S113). In a case where no moving object is detected ("N" in step S113), the flow returns to step S112. In a case where a moving object is detected ("Y" in step S113), the operation mode setting section 33 sets the operation mode M of the imaging unit 21 to the operation mode M2 (step S114). This allows the imaging unit 21 to acquire the high-resolution image PIC2.

Next, the communication unit 22 of the imaging apparatus 20A supplies the high-resolution image PIC2 to the server 10A (step S121).

Next, the authentication processing section 14A of the server 10A performs authentication processing by utilizing the authentication information INF2 stored in the database 13 on the basis of the high-resolution image PIC2 supplied from the imaging apparatus 20A (step S122).

Next, the authentication processing section 14A checks whether or not the authentication processing is successful (step S123). In a case where the authentication processing has failed ("N" in step S123), the server 10A notifies the imaging apparatus 20A that the authentication processing has failed (step S124). The communication unit 22 of the imaging apparatus 20A receives this notification. Then, the flow returns to step S111.

In a case where the authentication processing is successful ("Y" in step S123) in step S123, the server 10A notifies the imaging apparatus 20A that the authentication processing is successful (step S125). The communication unit 22 of the imaging apparatus 20A receives this notification.

Next, the control unit 30A instructs the unlocking control unit 6 to unlock the doors of the vehicle 8A (step S116). This completes the flow.

Modification Example 1-2

In the above embodiment, one imaging unit 21 is provided, but this is not limitative. For example, as in a vehicle 8B1 illustrated in (A) of FIG. 8, one imaging unit 21B1 may be provided similarly to the above embodiment. The imaging unit 21B is so disposed as to capture an image in the front direction of the vehicle 8B1. Further, for example, as in a vehicle 8B2 illustrated in (B) of FIG. 8, two imaging units 21B1 and 21B2 may be provided. The imaging unit 21B2 is so disposed as to capture an image in the right direction of the vehicle 8B2. That is, in the vehicle 8B2, the driver's seat is on right side, and the user U approaches the right side of the vehicle 8B2; thus, the imaging unit 21B2 captures an image in the right direction of the vehicle 8B2.

Further, as in a vehicle 8B3 illustrated in (C) of FIG. 8, five imaging units 21B1 and 21B3 to 21B6 may be provided. The imaging unit 21B3 is so disposed as to capture an image in the left front direction of the vehicle 8B3; the imaging unit 21B4 is so disposed as to capture an image in the right front direction of the vehicle 8B3; the imaging unit 21B5 is so disposed as to capture an image in the left rear direction of the vehicle 8B3; and the imaging unit 21B6 is so disposed as to capture an image in the right rear direction of the vehicle 8B3. This configuration makes it possible to recognize the user U from whichever direction the user U approaches the vehicle 8B3. The five imaging units 21B1 and 21B3 to 21B6 configure, for example, a parking camera system. By configuring the imaging apparatus 20B according to the present modification example by utilizing the imaging units of such a camera system, it is possible to suppress the introduction costs.

For example, each of these five imaging units 21B1 and 21B3 to 21B6 has the two operation modes M (the operation modes M1 and M2). An operation mode setting section 33B according to the present modification example may set the operation modes M of these five imaging units 21B1 and 21B3 to 21B6 collectively. Specifically, in a case where the five imaging units 21B1 and 21B3 to 21B6 operate in the operation mode M1, when the moving object detection section 31B according to the present modification example detects a moving object on the basis of, for example, the low-resolution image PIC1 acquired by the imaging unit 21B4, the operation mode setting section 33B is able to set the operation mode M of each of the five imaging units 21B1 and 21B3 to 21B6 to the operation mode M2.

The operation mode setting section 33B may individually set the operation modes M of these five imaging units 21B1 and 21B3 to 21B6. Specifically, in a case where the five imaging units 21B1 and 21B3 to 21B6 operate in the operation mode M1, when the moving object detection section 31B detects a moving object on the basis of, for example, the low-resolution image PIC1 acquired by the imaging unit 21B4, the operation mode setting section 33B is able to set the operation mode M of the imaging unit 21B4 to the operation mode M2.

Modification Example 1-3

In the above embodiment, the imaging unit 21 operates all of the plurality of imaging pixels included in the imaging unit 21 in the operation mode M2 that acquires the high-resolution image PIC2, but this is not limitative; alternatively, for example, a portion of the plurality of imaging pixels included in the imaging unit 21 may be operated. Hereinafter, a car sharing system 1C according to the present modification example is described in detail. The car sharing system 1C includes a vehicle 8C. The vehicle 8C includes an imaging apparatus 20C. The imaging apparatus 20C includes an imaging unit 21C and a control unit 30C.

FIG. 9 illustrates an example of an imaging region 100 in the imaging unit 21C. The imaging region 100 of the imaging unit 21C is divided into a plurality of regions 101. Although not illustrated, a plurality of imaging pixels are arranged side by side in each of the plurality of regions 101. The imaging unit 21C is configured to be able to perform an imaging operation using the regions 101 as a unit.

The imaging unit 21C has two operation modes M (operation modes M1 and M3). The operation mode M3 allows for acquisition of an image having high resolution (a high-resolution image PIC3), and is a mode in which an imaging operation is performed using the regions 101 as a unit. That is, the operation mode M3 is a so-called ROI (Region of Interest) mode that allows for operations of only imaging pixels of one or a plurality of regions 101, of the imaging region 100, where the imaging operation is desired to be performed.

The control unit 30C includes an operation mode setting section 33C. The operation mode setting section 33C sets the operation mode M of the imaging unit 21C. When the operation mode M of the imaging unit 21C is set to the operation mode M3, the operation mode setting section 33C selectively operates one or a plurality of regions 101, of the imaging region 100, where a moving object has been detected in the moving object detection.

FIG. 10 illustrates an operation example of the car sharing system 1C when the user U who has reserved utilization of the vehicle 8C starts the utilization of the vehicle 8C.

Similarly to the case of the foregoing first embodiment (FIG. 4), first, the operation mode setting section 33C sets the operation mode M of the imaging unit 21 to the operation mode M1 (step S111). This allows the imaging unit 21C to start acquiring the low-resolution image PIC1. Next, the moving object detection section 31 performs moving object detection on the basis of the low-resolution image PIC1 (step S112). Then, the moving object detection section 31 checks whether or not a moving object is detected (step S113). In a case where no moving object is detected ("N" in step S113), the flow returns to step S112.

In a case where a moving object is detected in step S113 ("Y" in step S113), the operation mode setting section 33C sets the operation mode M of the imaging unit 21C to the operation mode M3, and sets regions 101 to be operated, out of the imaging region 100 (step S134). At this time, the operation mode setting section 33C sets, as the regions 101 to be operated, one or a plurality of regions 101 where a moving object has been detected in the moving object detection, out of the imaging region 100. This allows the imaging unit 21C to acquire the high-resolution image PIC3.

Next, the authentication processing section 32 performs authentication processing by utilizing the authentication information INF2 stored in the storage unit 23 on the basis of the high-resolution image PIC3 (step S135).

Next, the authentication processing section 32 checks whether or not the authentication processing is successful (step S136). In a case where the authentication processing has failed ("N" in step S136), the flow returns to step S111. In a case where the authentication processing is successful ("Y" in step S136), the control unit 30C instructs the unlocking control unit 6 to unlock doors of the vehicle 8C (step S117). This completes the flow.

As described above, in the car sharing system 1C, in the operation mode M3 that acquires the high-resolution image PIC3, one or a plurality of regions 101, of the imaging region 100, where a moving object has been detected in the moving object detection is operated. This enables the car sharing system 1C, for example, to operate only the regions 101 including the facial image of the user while stopping the operation of other regions 101, thus making it possible to effectively reduce the power consumption.

In this example, the imaging unit 21C has the two operation modes M1 and M3, but this is not limitative; for example, the imaging unit 21C may further have an operation mode M2 that acquires the high-resolution image PIC2. In this case, for example, the operation may be performed in the operation mode M2 as necessary after the operation is performed in the operation mode M3. Specifically, for example, in a case where a position of the moving object is shifted when one or a plurality of regions 101 of the imaging region 100 is operated in the operation mode M3, the imaging apparatus 20C may set the operation mode M to the operation mode M2 and operate all the regions 101.

Modification Example 1-4

In the above embodiment, the imaging unit 21 sets the operation mode M to the operation mode M2 in a case where a moving object is detected in the imaging region 100 of the imaging unit 21, but this is not limitative. Alternatively, for example, in a case where a moving object is detected in a predetermined region of the imaging region 100 of the imaging unit 21, the operation mode M may be set to the operation mode M2. Hereinafter, a car sharing system 1D according to the present modification example is described in detail. The car sharing system 1D includes a vehicle 8D. The vehicle 8D includes an imaging apparatus 20D.

FIG. 11 illustrates a configuration example of the imaging apparatus 20D. The imaging apparatus 20D includes a non-detection region setting unit 24D, a non-detection region storage unit 25D, and a control unit 30D.

The non-detection region setting unit 24D sets a non-detection region 102 on the basis of, for example, an operation by a person in charge of a business operator who operates the car sharing system 1D. The non-detection region 102 is a region, of the imaging region 100, excluded from a target region of the moving object detection. That is, as described later, the imaging apparatus 20D checks whether or not a moving object is detected in a region, of the imaging region 100, other than the non-detection region 102. The non-detection region storage unit 25D stores the non-detection region 102 set by the non-detection region setting unit 24D.

FIG. 12 illustrates an example of the non-detection region 102. In this example, a road is seen in a captured image of the imaging unit 21. A vehicle and a person pass through this road. In this example, the non-detection region setting unit 24D sets a region including this road as the non-detection region 102. That is, in a case where the non-detection region 102 is not set, there is a possibility that a moving object may be detected each time a vehicle or a person passes through a road near the vehicle 8D; therefore, in this example, a region including this road is set as the non-detection region 102.

The control unit 30D includes a moving object detection section 31D. The moving object detection section 31D performs moving object detection on the basis of the low-resolution image PIC1. The moving object detection section 31D has a function of checking whether or not a moving object is detected in a region other than the non-detection region 102.

FIG. 13 illustrates an operation example of the car sharing system 1D when the user U who has reserved utilization of the vehicle 8D starts the utilization of the vehicle 8D.

Similarly to the case of the foregoing first embodiment (FIG. 4), first, the operation mode setting section 33 sets the operation mode M of the imaging unit 21 to the operation mode M1 (step S111). This allows the imaging unit 21 to start acquiring the low-resolution image PIC1. Next, the moving object detection section 31D performs moving object detection on the basis of the low-resolution image PIC1 (step S112). Then, the moving object detection section 31D checks whether or not a moving object is detected (step S113). In a case where no moving object is detected ("N" in step S113), the flow returns to step S112.

In a case where a moving object is detected in step S113 ("Y" in step S113), the moving object detection section 31D checks whether or not a moving object is detected in a region other than the non-detection region 102 (step S143). In a case where no moving object is detected in the region other than the non-detection region 102 ("N" in step S143), the flow returns to step S112.

In a case where a moving object is detected in the region other than the non-detection region 102 in step S143 ("Y" in step S143), the operation mode setting section 33 sets the operation mode M of the imaging unit 21 to the operation mode M2 (step S114). This allows the imaging unit 21 to acquire the high-resolution image PIC2. Then, the authentication processing section 32 performs authentication processing by utilizing the authentication information INF2 stored in the storage unit 23 on the basis of the high-resolution image PIC2 (step S115).

Next, the authentication processing section 32 checks whether or not the authentication processing is successful (step S116). In a case where the authentication processing has failed ("N" in step S116), the flow returns to step S111. In a case where the authentication processing is successful ("Y" in step S116), the control unit 30D instructs the unlocking control unit 6 to unlock doors of the vehicle 8D (step S117). This completes the flow.

As described above, in the car sharing system 1D, the operation mode M is set to the operation mode M2 in a case where a moving object is detected in a region other than the non-detection region 102. This makes it possible to reduce a possibility that the operation mode M may be set to the operation mode M2 each time a vehicle or a person passes through a road near the vehicle 8D, for example, thus making it possible to effectively reduce the power consumption.

The non-detection region setting unit 24D is able to set the non-detection region 102, for example, on the basis of the operation of a person in charge of the business operator who operates the car sharing system 1D. Specifically, for example, the person in charge is able to set the non-detection region 102 while confirming a captured image taken by the imaging unit 21 when the vehicle 8D is parked in a station of the car sharing system 1D. For example, in a case where a location of the station of the car sharing system 1D is changed, the person in charge is able to similarly set the non-detection region 102 again.

Further, for example, as in an imaging apparatus 20E illustrated in FIG. 14, a plurality of non-detection regions 102 may be set in advance, and one of the plurality of non-detection regions 102 may be selected. The imaging apparatus 20E includes a non-detection region setting unit 24E, a non-detection region storage unit 25E, a position detection unit 26E, and a control unit 30E. The non-detection region setting unit 24E is able to set the plurality of non-detection regions 102. The non-detection region storage unit 25E stores the plurality of non-detection regions 102 set by the non-detection region setting unit 24E. The position detection unit 26E detects a position and an orientation of a vehicle 8E mounted with the imaging apparatus 20E, and is configured by using, for example, a GPS (Global Positioning System) receiver, a geomagnetic sensor, or the like. The control unit 30E includes a moving object detection section 31E. The moving object detection section 31E selects one of the plurality of non-detection regions 102 stored in the non-detection region storage unit 25E on the basis of a result of the detection of the position detection unit 26E, and performs moving object detection on the basis of the low-resolution image PIC1 using the selected non-detection region 102. Accordingly, for example, in a case where there is a plurality of stations of a car sharing system 1E, it is possible to select non-detection regions 102 in accordance with a station where the vehicle 8E is parked.

In the example of FIG. 11, the non-detection region setting unit 24D sets the non-detection region 102 on the basis of the operation of a person in charge, but this is not limitative. Alternatively, for example, the non-detection region setting unit may automatically set the non-detection region 102. Specifically, for example, the imaging unit 21 may perform an imaging operation for a predetermined length of time, and a non-detection region setting unit 24F according to the present modification example may set, as the non-detection region 102, a region where a moving object has been detected in the imaging region 100. That is, for example, in a case where there is a road near a vehicle 8F according to the present modification example, it is expected that a vehicle or a person may pass through, thus making it possible to set a region including the road as the non-detection region 102 by detecting the region where a moving object has been detected in the imaging region 100. In addition, the non-detection region setting unit 24F may set the non-detection region 102 using, for example, a machine learning method. It is to be noted that this is not limitative; for example, the non-detection region setting unit 24F may detect a road by performing image recognition processing on the basis of a captured image to set the non-detection region 102 on the basis of a result of the detection, or may acquire map data via, for example, the Internet NET to set the non-detection region 102 by utilizing the map data.

Modification Example 1-5

In the above embodiment, the imaging unit 21 sets the operation mode M to the operation mode M2 in a case where a moving object is detected in the imaging region 100 of the imaging unit 21, but this is not limitative. Alternatively, the operation mode M may be set to the operation mode M2 on the basis of, for example, a size of an image of a moving object detected by the moving object detection or a position of the image of the detected moving object. Hereinafter, the present modification example is described in detail with reference to several examples.

A car sharing system 1G according to the present modification example includes a vehicle 8G. The vehicle 8G includes an imaging apparatus 20G. The imaging apparatus 20G includes a control unit 30G. The control unit 30G includes a moving object detection section 31G. The moving object detection section 31G performs moving object detection on the basis of the low-resolution image PIC1. In addition, the moving object detection section 31G also has functions of determining a size of an image of a moving object detected by the moving object detection and of judging whether or not the size is larger than a predetermined size. That is, as illustrated in FIG. 15, the captured image may include images of various subjects, but in a case where the imaging apparatus 20G performs authentication processing, it is expected that a face of the user U is seen to be large. Therefore, the moving object detection section 31G determines the size of the image of the detected moving object, and judges whether or not the size is larger than the predetermined size.

FIG. 16 illustrates an operation example of the car sharing system 1G when the user U who has reserved utilization of the vehicle 8G starts the utilization of the vehicle 8G.

Similarly to the case of the foregoing first embodiment (FIG. 4), first, the operation mode setting section 33 sets the operation mode M of the imaging unit 21 to the operation mode M1 (step S111). This allows the imaging unit 21 to start acquiring the low-resolution image PIC1. Next, the moving object detection section 31G performs moving object detection on the basis of the low-resolution image PIC1 (step S112). Then, the moving object detection section 31G checks whether or not a moving object is detected (step S113). In a case where no moving object is detected ("N" in step S113), the flow returns to step S112.

In a case where a moving object is detected in step S113 ("Y" in step S113), the moving object detection section 31G checks whether or not a size of an image of the detected moving object is larger than a predetermined size (step S153). Specifically, the moving object detection section 31G determines an area of the image of the detected moving object, and checks whether or not the area of the image is larger than a predetermined area. In a case where the size of the image of the detected moving object is not larger than the predetermined size ("N" in step S153), the flow returns to step S112.

In a case where the size of the image of the detected moving object is larger than the predetermined size in step S153 ("Y" in step S153), the operation mode setting section 33 sets the operation mode M of the imaging unit 21 to the operation mode M2 (step S114). This allows the imaging unit 21 to acquire the high-resolution image PIC2. Then, the authentication processing section 32 performs authentication processing by utilizing the authentication information INF2 stored in the storage unit 23 on the basis of the high-resolution image PIC2 (step S115).

Next, the authentication processing section 32 checks whether or not the authentication processing is successful (step S116). In a case where the authentication processing has failed ("N" in step S116), the flow returns to step S111. In a case where the authentication processing is successful ("Y" in step S116), the control unit 30G instructs the unlocking control unit 6 to unlock doors of the vehicle 8G (step S117). This completes the flow.

As described above, in the car sharing system 1G, the operation mode M is set to the operation mode M2 in a case where the size of the image of the moving object detected by the moving object detection section 31G is larger than a predetermined size. Accordingly, for example, even in a case where a person or an animal happens to be close to the vehicle 8G, the size of the image of the person or the animal is small, and thus the operation mode setting section 33 does not change the operation mode M. As a result, it is possible for the car sharing system 1G to reduce a possibility that the operation mode M may be set to the operation mode M2 each time a person or an animal passes near the vehicle 8G, thus making it possible to effectively reduce the power consumption.

Next, description is given of another car sharing system 1H according to the present modification example. The car sharing system 1H includes a vehicle 8H. The vehicle 8H includes an imaging apparatus 20H. The imaging apparatus 20H includes a control unit 30H. The control unit 30H includes a moving object detection section 31H. The moving object detection section 31H performs moving object detection on the basis of the low-resolution image PIC1. In addition, the moving object detection section 31H also has a function of judging whether or not an image of the moving object detected by the moving object detection is in contact with an edge of the low-resolution image PIC1. That is, as illustrated in FIG. 15, the captured image may include images of various subjects; in a case where the imaging apparatus 20H performs authentication processing, it is expected that a face of the user U is seen to be large. In this case, a whole-body image of the user U does not fit in the captured image, and thus the image of the user U comes into contact with an edge of the captured image. Hence, the moving object detection section 31H judges whether or not the image of the detected moving object (the user U in this example) is in contact with an edge of the low-resolution image PIC1.

FIG. 17 illustrates an operation example of the car sharing system 1H when the user U who has reserved utilization of the vehicle 8H starts the utilization of the vehicle 8H. In this flowchart, step S153 in the flowchart (FIG. 16) of the car sharing system 1G is replaced with step S163.

In a case where a moving object is detected in step S113 ("Y" in step S113), the moving object detection section 31H checks whether or not the image of the detected moving object is in contact with an edge of the low-resolution image PIC1 (step S163). In a case where the image of the detected moving object is not in contact with an edge of the low-resolution image PIC1 ("N" in step S163), the flow returns to step S112.

In a case where the image of the detected moving object is in contact with an edge of the low-resolution image PIC1 in step S163 ("Y" in step S163), the operation mode setting section 33 sets the operation mode M of the imaging unit 21 to the operation mode M2 (step S114).

As described above, in the car sharing system 1H, the operation mode M is set to the operation mode M2 in a case where the image of the moving object detected by the moving object detection section 31H is in contact with an edge of the low-resolution image PIC1. This makes it possible to reduce a possibility that the operation mode M may be set to the operation mode M2 each time a person or an animal passes near the vehicle 8H, thus making it possible to effectively reduce the power consumption.

In addition, these car sharing systems 1G and 1H may be combined. Specifically, as in a car sharing system 1J illustrated in FIG. 18, in a case where a size of an image of a moving object detected by the moving object detection is larger than a predetermined size and where the moving object detected by the moving object detection is in contact with an edge of the low-resolution image PIC1 (steps S153 and S163), the operation mode M may be set to the operation mode M2. Also in this case, it is possible to effectively reduce the power consumption.

Modification Example 1-6

In the above embodiment, the registration processing section 11 of the server 10 generates the authentication information INF2 on the basis of the facial image of the user U, but this is not limitative; alternatively, for example, the imaging apparatus may generate the authentication information INF2 on the basis of the facial image of the user U. Hereinafter, a car sharing system 1K according to the present modification example is described in detail.

FIG. 19 illustrates a configuration example of the car sharing system 1K. The car sharing system 1K includes a server 10K and a vehicle 8K.

The server 10K includes a registration processing section 11K and a database 13K.

The registration processing section 11K performs registration processing for registration of a user on the basis of an instruction from the personal computer 7. Specifically, the registration processing section 11 creates an account of the user U on the basis of an instruction from the personal computer 7. Then, the registration processing section 11K registers the user information INF1 and the facial image of the user U in the database 13K, in association with the account of the user U.

The database 13K stores the user information INF1, the facial image of the user U, and the reservation information INF3, in association with the account of the user U.

Similarly to the server 10 according to the foregoing first embodiment, the server 10K accepts a reservation for utilization of the vehicle 8K. Further, the server 10K supplies the facial image of the user U and the reservation information INF3 to an imaging apparatus 20K (described later) of the reserved vehicle 8K.

FIG. 20 illustrates a configuration example of the imaging apparatus 20K mounted on the vehicle 8K. The imaging apparatus 20K includes a control unit 30K. The control unit 30K includes an authentication information generation section 34K. The authentication information generation section 34K generates the authentication information INF2 including various feature amounts relating to the facial image of the user U on the basis of the facial image of the user U supplied from the server 10K. Further, the storage unit 23 stores the authentication information INF2 generated by the authentication information generation section 34K and the reservation information INF3 supplied from the server 10K.

Modification Example 1-7

In the above embodiment, the moving object detection is performed on the basis of the low-resolution image PIC1 acquired by the imaging unit 21, but this is not limitative. Hereinafter, the present modification example is described in detail with reference to several examples.

A car sharing system 1L according to the present modification example includes a vehicle 8L. The vehicle 8L includes an imaging apparatus 20L.

FIG. 21 illustrates a configuration example of the imaging apparatus 20L. The imaging apparatus 20L includes an imaging unit 21L, a pyroelectric sensor 27L, and a control unit 30L. The imaging unit 21L has two operation modes M (operation modes M0 and M2). The operation mode M0 is a mode that stops an imaging operation. The imaging apparatus 20L is able to reduce power consumption by setting the operation mode M of the imaging unit 21L to the operation mode M0. The pyroelectric sensor 27L is, for example, an infrared sensor, and detects a moving object (e.g., the user U). The control unit 30L includes an operation mode setting section 33L. The operation mode setting section 33L sets the operation mode M of the imaging unit 21L. In a case where, for example, the operation mode M of the imaging unit 21L is the operation mode M0, when the pyroelectric sensor 27L detects a moving object, the operation mode setting section 33L sets the operation mode M to the operation mode M2.

Here, the pyroelectric sensor 27L corresponds to a specific example of a "sensor" in the present disclosure.

FIG. 22 illustrates an operation example of the car sharing system 1L when the user U who has reserved utilization of the vehicle 8L starts the utilization of the vehicle 8L.

First, the operation mode setting section 33L sets the operation mode M of the imaging unit 21L to the operation mode M0 (step S171). This causes the imaging unit 21L to stop the imaging operation. Then, the pyroelectric sensor 27L performs moving object detection (step S172).

Next, the control unit 30L checks whether or not the pyroelectric sensor 27L has detected a moving object (step S173). In a case where no moving object is detected ("N" in step S173), the flow returns to step S172.

In a case where a moving object is detected in step S173 ("Y" in step S173), the operation mode setting section 33L sets the operation mode M of the imaging unit 21L to the operation mode M2 (step S114). This allows the imaging unit 21L to acquire the high-resolution image PIC2. Then, the authentication processing section 32 performs authentication processing by utilizing the authentication information INF2 stored in the storage unit 23 on the basis of the high-resolution image PIC2 (step S115).

Next, the authentication processing section 32 checks whether or not the authentication processing is successful (step S116). In a case where the authentication processing has failed ("N" in step S116), the flow returns to step S171. In a case where the authentication processing is successful ("Y" in step S116), the control unit 30L instructs the unlocking control unit 6 to unlock doors of the vehicle 8L (step S117). This completes the flow.

As described above, in the car sharing system 1L, the imaging apparatus 20 is configured by using the imaging unit 21L having the operation mode M0 that stops the imaging operation and the operation mode M2 that acquires the high-resolution image PIC2, and the operation mode M is set to the operation mode M2 when the pyroelectric sensor 27L detects a moving object, thus making it possible to reduce the power consumption.

Next, description is given of another car sharing system 1M according to the present modification example. The car sharing system 1M includes a vehicle 8M. The vehicle 8M includes an imaging apparatus 20M.

FIG. 23 illustrates a configuration example of the imaging apparatus 20M. The imaging apparatus 20M includes the imaging unit 21L, a switch 28M, and a control unit 30M. The switch 28M is operated by the user U, for example. The control unit 30M includes an operation mode setting section 33M. The operation mode setting section 33M sets the operation mode M of the imaging unit 21L. In a case where, for example, the operation mode M of the imaging unit 21L is the operation mode M0, when the switch 28M is operated, the operation mode setting section 33M sets the operation mode M to the operation mode M2.

FIG. 24 illustrates an operation example of the car sharing system 1M when the user U who has reserved utilization of the vehicle 8M starts the utilization of the vehicle 8M.

First, the operation mode setting section 33M sets the operation mode M of the imaging unit 21L to the operation mode M0 (step S171). This causes the imaging unit 21L to stop the imaging operation.

Next, the control unit 30M checks whether or not the switch 28M has been operated (step S183). In a case where the switch 28M has not been operated ("N" in step S183), the flow returns to step S183, and this step S183 is repeated until the switch 28M is operated. Specifically, for example, this step S183 is repeated until the user U approaches the vehicle 8M and operates the switch 28M at the time corresponding to the reservation information INF3.

In a case where the switch 28M has been operated in step S183 ("Y" in step S183), the operation mode setting section 33M sets the operation mode M of the imaging unit 21L to the operation mode M2 (step S114). This allows the imaging unit 21L to acquire the high-resolution image PIC2. Then, the authentication processing section 32 performs authentication processing by utilizing the authentication information INF2 stored in the storage unit 23 on the basis of the high-resolution image PIC2 (step S115).

Next, the authentication processing section 32 checks whether or not the authentication processing is successful (step S116). In a case where the authentication processing has failed ("N" in step S116), the flow returns to step S171. In a case where the authentication processing is successful ("Y" in step S116), the control unit 30M instructs the unlocking control unit 6 to unlock doors of the vehicle 8M (step S117). This completes the flow.

As described above, in the car sharing systems 1L and 1M, the imaging apparatus 20 is configured by using the imaging unit 21L having the operation mode M0 that stops the imaging operation and the operation mode M2 that acquires the high-resolution image PIC2, and the operation mode M is set to the operation mode M2 when the user U operates the switch 28M, thus making it possible to reduce the power consumption.

Other Modification Examples

Further, two or more of the modification examples may be combined.

2. Second Embodiment

Next, description is given of a vehicle monitoring system 2 including an imaging apparatus according to a second embodiment. It is to be noted that components substantially the same as those of the imaging apparatus 20 of the car sharing system 1 according to the foregoing first embodiment are denoted by the same reference numerals, and descriptions thereof are omitted where appropriate.

FIG. 25 illustrates a configuration example of the vehicle monitoring system 2. The vehicle monitoring system 2 includes a vehicle 9, a server 40, and a smartphone 4. The server 40 is coupled to the Internet NET. In addition, the smartphone 4 and an imaging apparatus 50 (described later) mounted on the vehicle 9 are coupled to the Internet NET via a mobile phone network, for example.

In the vehicle monitoring system 2, the imaging apparatus 50 (described later) of the vehicle 9 captures an image of a person who has approached the vehicle 9, and performs authentication processing by using the authentication information INF2 on the basis of the captured image. Then, in a case where the authentication processing has failed, the imaging apparatus 50 supplies the captured image to the server 40. Then, the server 40 notifies the smartphone 4 that a person other than the registered user U has approached the vehicle 9, and supplies the captured image to the smartphone 4.

The vehicle 9 is, for example, a vehicle owned by the user U who utilizes the vehicle monitoring system 2.

FIG. 26 illustrates a configuration example of the imaging apparatus 50 mounted on the vehicle 9. The imaging apparatus 50 includes the imaging unit 21, the communication unit 22, a control unit 60, and a storage unit 53.

The control unit 60 includes an authentication information generation section 61, the moving object detection section 31, the authentication processing section 32, and the operation mode setting section 33.

The authentication information generation section 61 generates the authentication information INF2 including various feature amounts relating to a facial image of the user U on the basis of the facial image of the user U captured by the imaging unit 21. That is, the user U causes the imaging unit 21 to capture an own image of the user U prior to utilization of the vehicle monitoring system 2. The authentication information generation section 61 generates the authentication information INF2 on the basis of the facial image of the user U captured in this manner.

Similarly to the case of the foregoing first embodiment, the moving object detection section 31 performs moving object detection by detecting presence or absence of a moving object on the basis of the low-resolution image PIC1. Similarly to the case of the foregoing first embodiment, the authentication processing section 32 performs authentication processing by utilizing the authentication information INF2 on the basis of the high-resolution image PIC2. Similarly to the case of the foregoing first embodiment, the operation mode setting section 33 sets the operation mode M of the imaging unit 21.

Further, the control unit 60 also has a function of instructing the communication unit 22 to supply the high-resolution image PIC2 to the server 40 in a case where the authentication processing performed by the authentication processing section 32 has failed.

The storage unit 53 stores the authentication information INF2 generated by the authentication information generation section 61. It is to be noted that, in this example, the authentication information INF2 on one user U is stored, but this is not limitative; a plurality of pieces of authentication information INF2 corresponding, respectively, to a plurality of users U who may utilize the vehicle 9 may be stored.

With this configuration, first, the imaging unit 21 operates in the operation mode M1 to thereby acquire the low-resolution image PIC1. Then, the moving object detection section 31 performs moving object detection on the basis of the low-resolution image PIC1. In a case where a moving object is detected, the imaging unit 21 operates in the operation mode M2 to thereby acquire the high-resolution image PIC2. Further, the authentication processing section 32 performs authentication processing by utilizing the authentication information INF2 on the basis of the high-resolution image PIC2. In a case where the authentication processing has failed, the communication unit 22 supplies the high-resolution image PIC2 to the server 40.

The smartphone 4 (FIG. 25) is, for example, a multifunctional mobile phone owned by the user U who utilizes the vehicle monitoring system 2. The smartphone 4 accepts an operation of the user U and communicates with the server 40. In a case where the user U performs user registration, the vehicle monitoring system 2 creates an account of the user U, and the user U inputs the user information INF1 such as an address and a name. Then, the smartphone 4 supplies the user information INF1 to the server 40. In addition, in a case where the smartphone 4 receives a notification from the server 40 that a person other than the registered user U has approached the vehicle 9, the smartphone 4 displays such a notification as well as the high-resolution image PIC2 on a display unit.

The server 40 is, for example, an apparatus managed by a business operator who operates the vehicle monitoring system 2. The server 40 includes a registration processing section 41, a notification section 42, and a database 43.

The registration processing section 41 performs registration processing for registration of a user on the basis of an instruction from the smartphone 4. Specifically, the registration processing section 41 creates an account of the user U on the basis of an instruction from the smartphone 4. Then, the registration processing section 41 registers the user information INF1 supplied from the smartphone 4 in the database 43, in association with the account of the user U.

In a case where the server 40 receives the high-resolution image PIC2 from the imaging apparatus 50, the notification section 42 notifies the smartphone 4 that a person other than the registered user U has approached the vehicle 9, and supplies the high-resolution image PIC2 to the smartphone 4.

The database 43 stores the user information INF1, the high-resolution image PIC2, and history of the notification, in association with the account of the user U.

Here, the vehicle monitoring system 2 corresponds to a specific example of a "vehicle monitoring system" in the present disclosure. The server 40 corresponds to a specific example of a "first apparatus" in the present disclosure.

FIG. 27 illustrates an operation example of the vehicle monitoring system 2 when the user U stops the vehicle 9 in a parking lot.

First, the vehicle 9 stops the engine on the basis of an operation of the user U (step S211).

Next, the operation mode setting section 33 sets the operation mode M of the imaging unit 21 to the operation mode M1 (step S212). This allows the imaging unit 21 to start acquiring the low-resolution image PIC1. Then, the moving object detection section 31 performs moving object detection on the basis of the low-resolution image PIC1 (step S213).

Next, the moving object detection section 31 checks whether or not a moving object is detected (step S214). In a case where no moving object is detected ("N" in step S214), the flow returns to step S213, and these steps S213 and S214 are repeated until an moving object is detected.

In a case where a moving object is detected in step S214 ("Y" in step S214), the operation mode setting section 33 sets the operation mode M of the imaging unit 21 to the operation mode M2 (step S215). This allows the imaging unit 21 to acquire the high-resolution image PIC2. Then, the authentication processing section 32 performs authentication processing by utilizing the authentication information INF2 stored in the storage unit 53 on the basis of the high-resolution image PIC2 (step S216).

Next, the authentication processing section 32 checks whether or not the authentication processing is successful (step S217). In a case where the authentication processing is successful ("Y" in step S217), the flow returns to step S212, and the operation mode setting section 33 sets the operation mode M to the operation mode M1. That is, in this case, for example, the user U who owns the vehicle 9 has approached the vehicle 9, thus there is no need to notify the user U, and therefore the operation mode setting section 33 returns the operation mode M to the operation mode M1.

In a case where the authentication processing has failed in step S217 ("N" in step S217), the communication unit 22 supplies the high-resolution image PIC2 to the server 40 on the basis of an instruction from the control unit 60 (step S218). That is, in this case, for example, a person other than the user U who owns the vehicle 9 has approached the vehicle 9, and thus the imaging apparatus 50 supplies the high-resolution image PIC2 to the server 40 in order to notify the user U to that effect.

Then, the notification section 42 of the server 40 notifies the smartphone 4 that a person other than the registered user U has approached the vehicle 9, and supplies the high-resolution image PIC2 to the smartphone 4 (step S219).

This completes the flow.

As described above, in the vehicle monitoring system 2, the authentication processing is performed on the basis of a captured image (the high-resolution image PIC2), and the captured image is supplied to the smartphone 4 when the authentication processing has failed, thus making it possible to enhance convenience of the user U. That is, for example, in a case where the imaging apparatus is mounted on a vehicle and a captured image is stored in the imaging apparatus, the user U is unable to know that a person other than the registered user U is approaching the vehicle in a timely manner. Further, in this case, when the vehicle is stolen, a captured image stored in the imaging apparatus is stolen as well, thus making the user U unable to confirm the captured image. Meanwhile, in the vehicle monitoring system 2, the authentication processing is performed on the basis of a captured image, and the captured image is supplied to the smartphone 4 when the authentication processing has failed. This enables the user U to know in a timely manner that a person other than the registered user U is approaching the vehicle and to confirm the captured image, thus making it possible to enhance convenience of the user. As a result, it is possible to reduce a possibility that the vehicle 9 may be stolen.

As described above, in the present embodiment, the authentication processing is performed on the basis of a captured image, and the captured image is supplied to the smartphone when the authentication processing has failed, thus making it possible to enhance convenience of the user U and to reduce a possibility that the vehicle may be stolen. Other effects are similar to those of the case of the foregoing first embodiment.

Modification Example 2-1

In the above embodiment, the imaging apparatus 50 performs the authentication processing, but this is not limitative; alternatively, for example, the server may perform the authentication processing similarly to the case of Modification Example 1-1 of the foregoing first embodiment. Hereinafter, a vehicle monitoring system 2A according to the present modification example is described in detail.

FIG. 28 illustrates a configuration example of the vehicle monitoring system 2A. The vehicle monitoring system 2A includes a vehicle 9A and a server 40A.

FIG. 29 illustrates a configuration example of an imaging apparatus 50A mounted on the vehicle 9A. The imaging apparatus 50A includes a control unit 60A. The control unit 60A includes the moving object detection section 31 and the operation mode setting section 33. That is, the control unit 60A omits the authentication information generation section 61 and the authentication processing section 32 from the control unit 60 according to the foregoing second embodiment. Further, the control unit 60A supplies a facial image of the user U captured by the imaging unit 21 to the server 40A using the communication unit 22 prior to utilization of the vehicle monitoring system 2A by the user U. Further, the control unit 60A also has a function of supplying, to the server 40A using the communication unit 22, the high-resolution image PIC2 acquired by the imaging unit 21 when the operation mode M of the imaging unit 21 is set to the operation mode M2.

The server 40A includes an authentication information generation section 44A, an authentication processing section 45A, and a database 43A.

The authentication information generation section 44A generates the authentication information INF2 including various feature amounts relating to a facial image of the user U on the basis of the facial image of the user U captured by the imaging unit 21 prior to the utilization of the vehicle monitoring system 2A by the user U. Then, the authentication information generation section 44A registers the authentication information INF2 in the database 43A, in association with the account of the user U.

The authentication processing section 45A performs the authentication processing by using the authentication information INF2 stored in the database 43A on the basis of the high-resolution image PIC2 supplied from the imaging apparatus 50A of the vehicle 9A.

The database 43A stores the user information INF1, the authentication information INF2, the high-resolution image PIC2, and history of the notification, in association with the account of the user U.

Here, the server 40A corresponds to a specific example of a "third apparatus" in the present disclosure.

FIG. 30 illustrates an operation example of the vehicle monitoring system 2A when the user U stops the vehicle 9A in a parking lot.

Similarly to the case of the foregoing second embodiment (FIG. 27), first, the vehicle 9A stops the engine on the basis of an operation of the user U (step S211), and the operation mode setting section 33 sets the operation mode M of the imaging unit 21 to the operation mode M1 (step S212). This allows the imaging unit 21 to start acquiring the low-resolution image PIC1. Then, the moving object detection section 31 performs moving object detection on the basis of the low-resolution image PIC1 (step S213). Next, the moving object detection section 31 checks whether or not a moving object is detected (step S214). In a case where no moving object is detected ("N" in step S214), the flow returns to step S213. In a case where a moving object is detected in step S214 ("Y" in step S214), the operation mode setting section 33 sets the operation mode M of the imaging unit 21 to the operation mode M2 (step S215). This allows the imaging unit 21 to acquire the high-resolution image PIC2.

Next, the communication unit 22 of the imaging apparatus 50A supplies the high-resolution image PIC2 to the server 40A (step S221).

Next, the authentication processing section 45A of the server 40A performs authentication processing by utilizing the authentication information INF2 stored in the database 43A on the basis of the high-resolution image PIC2 supplied from the imaging apparatus 50A (step S222).

Next, the authentication processing section 45A checks whether or not the authentication processing is successful (step S223). In a case where the authentication processing is successful ("Y" in step S223), the server 40A notifies the imaging apparatus 20A that the authentication processing is successful (step S224). The communication unit 22 of the imaging apparatus 50A receives this notification. Then, the flow returns to step S212.

In a case where the authentication processing has failed in step S223 ("N" in step S223), the notification section 42 of the server 40A notifications the smartphone 4 that a person other than the registered user U has approached the vehicle 9A, and supplies the high-resolution image PIC2 to the smartphone 4 (step S219). This completes the flow.

Modification Example 2-2

Although one imaging unit 21 is provided in the above embodiment, this is not limitative; alternatively, for example, a plurality of imaging units may be provided similarly to Modification Example 1-2 (FIG. 8) of the foregoing first embodiment. In particular, as illustrated in (C) of FIG. 8, in a case where five imaging units are provided, it is possible to detect a person other than the registered user U from whichever direction the person approaches the vehicle.

Modification Example 2-3

In the above embodiment, the imaging unit 21 operates all of the plurality of imaging pixels included in the imaging unit 21 in the operation mode M2 that acquires the high-resolution image PIC2, but this is not limitative. Alternatively, for example, similarly to the case of Modification Example 1-3 of the foregoing first embodiment, a portion of the plurality of imaging pixels included in the imaging unit 21 may be operated. Hereinafter, a vehicle monitoring system 2C according to the present modification example is described in detail. The vehicle monitoring system 2C includes a vehicle 9C. The vehicle 9C includes an imaging apparatus 50C. The imaging apparatus 50C includes the imaging unit 21C and a control unit 60C.

Similarly to the case of Modification Example 1-3 of the foregoing first embodiment, the imaging unit 21C is configured to be able to perform an imaging operation using the regions 101 as a unit, as illustrated in FIG. 9. The imaging unit 21C has the two operation modes M (the operation modes M1 and M3). The operation mode M3 allows for acquisition of an image having high resolution (the high-resolution image PIC3), and is a mode in which an imaging operation is performed using the regions 101 as a unit.

The control unit 60C includes the operation mode setting section 33C. The operation mode setting section 33C sets the operation mode M of the imaging unit 21C. When the operation mode M of the imaging unit 21C is set to the operation mode M3, the operation mode setting section 33C selectively operates one or a plurality of regions 101, of the imaging region 100, where a moving object has been detected in the moving object detection.

FIG. 31 illustrates an operation example of the vehicle monitoring system 2C when the user U stops the vehicle 9C in a parking lot.

Similarly to the case of the foregoing second embodiment (FIG. 27), first, the vehicle 9C stops the engine on the basis of an operation of the user U (step S211), and the operation mode setting section 33C sets the operation mode M of the imaging unit 21C to the operation mode M1 (step S212). This allows the imaging unit 21C to start acquiring the low-resolution image PIC1. Then, the moving object detection section 31 performs moving object detection on the basis of the low-resolution image PIC1 (step S213). Next, the moving object detection section 31 checks whether or not a moving object is detected (step S214). In a case where no moving object is detected ("N" in step S214), the flow returns to step S213.

In a case where a moving object is detected in step S214 ("Y" in step S214), the operation mode setting section 33C sets the operation mode M of the imaging unit 21C to the operation mode M3, and sets regions 101 to be operated, out of the imaging region 100 (step S235). At this time, the operation mode setting section 33C sets, as the regions 101 to be operated, one or a plurality of regions 101 where a moving object has been detected in the moving object detection, out of the imaging region 100. This allows the imaging unit 21C to acquire the high-resolution image PIC3.

Next, the authentication processing section 32 performs authentication processing by utilizing the authentication information INF2 stored in the storage unit 53 on the basis of the high-resolution image PIC3 (step S236).

Next, the authentication processing section 32 checks whether or not the authentication processing is successful (step S237). In a case where the authentication processing is successful ("Y" in step S237), the flow returns to step S212. In a case where the authentication processing has failed ("N" in step S237), the communication unit 22 supplies the high-resolution image PIC3 to the server 40 on the basis of an instruction from the control unit 60C (step S238).

Then, the notification section 42 of the server 40 notifies the smartphone 4 that a person other than the registered user U has approached the vehicle 9C, and supplies the high-resolution image PIC3 to the smartphone 4 (step S239). This completes the flow.

As described above, in the vehicle monitoring system 2C, in the operation mode M3 that acquires the high-resolution image PIC3, one or a plurality of regions 101, of the imaging region 100, where a moving object has been detected in the moving object detection is operated, thus making it possible to effectively reduce the power consumption.

In this example, the imaging unit 21C has the two operation modes M1 and M3, but this is not limitative; for example, the operation mode M2 may be further included. In this case, for example, after an operation is performed in the operation mode M3, an operation may be performed in the operation mode M2 as necessary. Specifically, for example, the imaging apparatus may operate one or a plurality of regions 101 of the imaging region 100 in the operation mode M3, and may set the operation mode M to the operation mode M2 to operate all of the regions 101 in a case where the authentication processing has failed. That is, in this case, a person other than the registered user U is approaching the vehicle 9C, and thus the operation mode M may be set to the operation mode M2 in order to capture an image of a surrounding circumstance of the vehicle 9C.

Modification Example 2-4

In the above embodiment, the imaging unit 21 sets the operation mode M to the operation mode M2 in a case where a moving object is detected in the imaging region 100 of the imaging unit 21, but this is not limitative. Alternatively, for example, similarly to the case of Modification Example 1-4 of the foregoing first embodiment, the operation mode M may be set to the operation mode M2 in a case where a moving object is detected in a predetermined region of the imaging region 100 of the imaging unit 21. Hereinafter, a vehicle monitoring system 2D according to the present modification example is described in detail. The vehicle monitoring system 2D includes a vehicle 9D. The vehicle 9D includes an imaging apparatus 50D.

FIG. 32 illustrates a configuration example of the imaging apparatus 50D. The imaging apparatus 50D includes the non-detection region setting unit 24D, the non-detection region storage unit 25D, and a control unit 60D.

Similarly to the case of Modification Example 1-4 of the foregoing first embodiment, the non-detection region setting unit 24D sets the non-detection region 102 on the basis of an operation of the user U, for example. The non-detection region storage unit 25D stores the non-detection region 102 set by the non-detection region setting unit 24D.

The control unit 60D includes the moving object detection section 31D. The moving object detection section 31D performs moving object detection on the basis of the low-resolution image PIC1. The moving object detection section 31D has a function of checking whether or not a moving object is detected in a region other than the non-detection region 102, similarly to the case of Modification Example 1-4 of the foregoing first embodiment.

FIG. 33 illustrates an operation example of the vehicle monitoring system 2D when the user U stops the vehicle 9D in a parking lot.

Similarly to the case of the foregoing second embodiment (FIG. 27), first, the vehicle 9D stops the engine on the basis of an operation of the user U (step S211), and the operation mode setting section 33 sets the operation mode M of the imaging unit 21 to the operation mode M1 (step S212). This allows the imaging unit 21 to start acquiring the low-resolution image PIC1. Then, the moving object detection section 31D performs moving object detection on the basis of the low-resolution image PIC1 (step S213). Next, the moving object detection section 31D checks whether or not a moving object is detected (step S214). In a case where no moving object is detected ("N" in step S214), the flow returns to step S213.

In a case where a moving object is detected in step S214 ("Y" in step S214), the moving object detection section 31D checks whether or not the moving object is detected in a region other than the non-detection region 102 (step S244). In a case where no moving object is detected in the region other than the non-detection region 102 ("N" in step S244), the flow returns to step S213.

In step S244, in a case where a moving object is detected in the region other than the non-detection region 102 ("Y" in step S244), the operation mode setting section 33 sets the operation mode M of the imaging unit 21 to the operation mode M2 (step S215). This allows the imaging unit 21 to acquire the high-resolution image PIC2. Then, the authentication processing section 32 performs authentication processing by utilizing the authentication information INF2 stored in the storage unit 53 on the basis of the high-resolution image PIC2 (step S216).

Next, the authentication processing section 32 checks whether or not the authentication processing is successful (step S217). In a case where the authentication processing is successful ("Y" in step S217), the flow returns to step S212. In a case where the authentication processing has failed ("N" in step S217), the communication unit 22 supplies the high-resolution image PIC2 to the server 40 on the basis of an instruction from the control unit 60D (step S218).

Then, the notification section 42 of the server 40 notifies the smartphone 4 that a person other than the registered user U has approached the vehicle 9D, and supplies the high-resolution image PIC2 to the smartphone 4 (step S219). This completes the flow.

As described above, in the vehicle monitoring system 2D, the operation mode M is set to the operation mode M2 in a case where a moving object is detected in a region other than the non-detection region 102. This makes it possible to reduce a possibility that the operation mode M may be set to the operation mode M2 each time a vehicle or a person passes through a road near the vehicle 9D, for example, thus making it possible to effectively reduce the power consumption. Further, it is possible for the vehicle monitoring system 2D to reduce a possibility of notifying the user U each time a vehicle or a person passes through a road near the vehicle 9D.

The non-detection region setting unit 24D is able to set the non-detection region 102, for example, on the basis of an operation of the user U. Specifically, for example, the user U is able to set the non-detection region 102 while confirming a captured image taken by the imaging unit 21 when the vehicle 9D is parked in a parking lot of the user U's home. For example, in a case where the vehicle 9D is parked at a location other than the parking lot of the user U's home, the user U is able to set the non-detection region 102 again in a similar manner.

Further, for example, as in an imaging apparatus 50E illustrated in FIG. 34, a plurality of non-detection regions 102 may be set in advance, and one of the plurality of non-detection regions 102 may be selected. The imaging apparatus 50E includes the non-detection region setting unit 24E, the non-detection region storage unit 25E, the position detection unit 26E, and a control unit 60E. Similarly to the case of Modification Example 1-4 of the foregoing first embodiment, the non-detection region setting unit 24E is able to set the plurality of non-detection regions 102. The non-detection region storage unit 25E stores the plurality of non-detection regions 102 set by the non-detection region setting unit 24E. The position detection unit 26E detects a position and an orientation of a vehicle 9E mounted with the imaging apparatus 50E, and is configured by using, for example, a GPS receiver, a geomagnetic sensor, or the like. The control unit 60E includes the moving object detection section 31E. The moving object detection section 31E selects one of the plurality of non-detection regions 102 stored in the non-detection region storage unit 25E on the basis of a result of the detection of the position detection unit 26E, and performs moving object detection on the basis of the low-resolution image PIC1 using the selected non-detection region 102. Accordingly, for example, in a case where there is a plurality of locations where the vehicle 9D is frequently parked, it is possible to select non-detection regions 102 in accordance with the locations.

In the example of FIG. 32, the non-detection region setting unit 24D sets the non-detection region 102 on the basis of the operation of the user U, but this is not limitative. Alternatively, for example, the non-detection region setting unit may automatically set the non-detection region 102 similarly to the case of Modification Example 1-4 of the foregoing first embodiment.

Modification Example 2-5

In the above embodiment, the imaging unit 21 sets the operation mode M to the operation mode M2 in a case where a moving object is detected in the imaging region 100 of the imaging unit 21, but this is not limitative. Alternatively, for example, the operation mode M may be set to the operation mode M2 on the basis of a size of an image of a moving object detected by the moving object detection or time for which the detection is continued. Hereinafter, the present modification example is described in detail with reference to several examples.

A vehicle monitoring system 2G according to the present modification example includes a vehicle 9G. The vehicle 9G includes an imaging apparatus 50G. The imaging apparatus 50G includes a control unit 60G. The control unit 60G includes the moving object detection section 31G. Similarly to the case of Modification Example 1-5 of the foregoing first embodiment, the moving object detection section 31G performs moving object detection on the basis of the low-resolution image PIC1. In addition, the moving object detection section 31G also has functions of determining a size of an image of a moving object detected by the moving object detection and of judging whether or not the size is larger than a predetermined size.

FIG. 35 illustrates an operation example of the vehicle monitoring system 2G when the user U stops the vehicle 9G in a parking lot.

Similarly to the case of the foregoing second embodiment (FIG. 27), first, the vehicle 9G stops the engine on the basis of an operation of the user U (step S211), and the operation mode setting section 33 sets the operation mode M of the imaging unit 21 to the operation mode M1 (step S212). This allows the imaging unit 21 to start acquiring the low-resolution image PIC1. Then, the moving object detection section 31G performs moving object detection on the basis of the low-resolution image PIC1 (step S213). Next, the moving object detection section 31G checks whether or not a moving object is detected (step S214). In a case where no moving object is detected ("N" in step S214), the flow returns to step S213.

In a case where a moving object is detected in step S214 ("Y" in step S214), the moving object detection section 31G checks whether or not a size of an image of the detected moving object is larger than a predetermined size (step S254). In a case where the size of the image of the detected moving object is not larger than the predetermined size ("N" in step S254), the flow returns to step S213.

In a case where the size of the image of the detected moving object is larger than the predetermined size in step S254 ("Y" in step S254), the operation mode setting section 33 sets the operation mode M of the imaging unit 21 to the operation mode M2 (step S215). This allows the imaging unit 21 to acquire the high-resolution image PIC2. Then, the authentication processing section 32 performs authentication processing by utilizing the authentication information INF2 stored in the storage unit 53 on the basis of the high-resolution image PIC2 (step S216).

Next, the authentication processing section 32 checks whether or not the authentication processing is successful (step S217). In a case where the authentication processing is successful ("Y" in step S217), the flow returns to step S212. In a case where the authentication processing has failed ("N" in step S217), the communication unit 22 supplies the high-resolution image PIC2 to the server 40 on the basis of an instruction from the control unit 60G (step S218).

Then, the notification section 42 of the server 40 notifies the smartphone 4 that a person other than the registered user U has approached the vehicle 9G, and supplies the high-resolution image PIC2 to the smartphone 4 (step S219). This completes the flow.

As described above, in the vehicle monitoring system 2G, the operation mode M is set to the operation mode M2 in a case where the size of the image of the moving object detected by the moving object detection section 31G is larger than the predetermined size. Accordingly, for example, an image of a person or an animal that happens to be close to the vehicle 9G is small in size, and thus the operation mode M is not changed. As a result, it is possible to reduce a possibility that the operation mode M may be set to the operation mode M2 each time a person or an animal passes near the vehicle 9G, thus making it possible to effectively reduce the power consumption. Further, it is possible for the vehicle monitoring system 2G to reduce a possibility of notifying the user U each time a person or an animal passes near the vehicle 9G.

Next, description is given of another vehicle monitoring system 2H according to the present modification example. The vehicle monitoring system 2H includes a vehicle 9H. The vehicle 9H includes an imaging apparatus 50H. The imaging apparatus 50H includes a control unit 60H. The control unit 60H includes a moving object detection section 62H. The moving object detection section 62H performs moving object detection on the basis of the low-resolution image PIC1. In addition, the moving object detection section 62H also has a function of judging whether or not a moving object has been continuously detected for a predetermined period of time or longer. This enables the imaging apparatus 50H to detect, for example, a person who travels back and forth around the vehicle 9H.

FIG. 36 illustrates an operation example of the vehicle monitoring system 2H when the user U stops the vehicle 9H in a parking lot. In this flowchart, step S254 in the flowchart (FIG. 35) of the vehicle monitoring system 2G is replaced with step S264.

In a case where a moving object is detected in step S214 ("Y" in step S214), the moving object detection section 62H checks whether or not the moving object has been continuously detected for a predetermined period of time or longer (step S264). In a case where the moving object has not been continuously detected for a predetermined period of time or longer ("N" in step S264), the flow returns to step S213.

In a case where the moving object has been continuously detected for a predetermined period of time or longer in step S264 ("Y" in step S264), the operation mode setting section 33 sets the operation mode M of the imaging unit 21 to the operation mode M2 (step S215).

As described above, in the vehicle monitoring system 2H, in a case where the moving object detection section 62H has continuously detected a moving object for a predetermined period of time or longer, the operation mode M is set to the operation mode M2. This makes it possible to reduce a possibility that the operation mode M may be set to the operation mode M2 each time a person or an animal passes near the vehicle 9H, thus making it possible to effectively reduce the power consumption. Further, in the vehicle monitoring system 2H, it is possible to reduce a possibility of notifying the user U each time a person or an animal passes near the vehicle 9H.

Further, these vehicle monitoring systems 2G and 2H may be combined. Specifically, as in a vehicle monitoring system 2J illustrated in FIG. 37, in a case where a size of an image of a moving object detected by the moving object detection is larger than a predetermined size and where such a moving object has been continuously detected for a predetermined period of time or longer (steps S254 and S264), the operation mode M may be set to the operation mode M2. Also in this case, it is possible to effectively reduce the power consumption and to reduce a possibility of notifying the user U each time a person or an animal passes near the vehicle 9J.

Modification Example 2-6

In the above embodiment, the user U causes the imaging unit 21 to capture an own image of the user U prior to utilization of the vehicle monitoring system 2, and the authentication information generation section 61 generates the authentication information INF2 on the basis of the facial image of the user U captured in this manner; however, this is not limitative. Alternatively, as in the case of the foregoing first embodiment, for example, upon user registration, the user U may enter the user information INF1 such as an address and a name and may register a facial image of the user U, and the smartphone 4 may supply the user information INF1 and the facial image of the user U to the server 40. In this case, the server 40 may generate the authentication information INF2 on the basis of the facial image of the user U and may supply the authentication information INF2 to the imaging apparatus 50; alternatively, the server 40 may supply the facial image of the user U to the imaging apparatus 50, and the imaging apparatus 50 may generate the authentication information INF2 on the basis of the facial image of the user U supplied from the server 40.

Modification Example 2-7

In the above embodiment, the moving object detection is performed on the basis of the low-resolution image PIC1 acquired by the imaging unit 21, but this is not limitative. Alternatively, for example, a pyroelectric sensor may be provided similarly to the case of Modification Example 1-7 of the foregoing first embodiment. Hereinafter, a vehicle monitoring system 2L according to the present modification example is described in detail. The vehicle monitoring system 2L includes a vehicle 9L. The vehicle 9L includes an imaging apparatus SOL.

FIG. 38 illustrates a configuration example of the imaging apparatus SOL. The imaging apparatus SOL includes the imaging unit 21L, the pyroelectric sensor 27L, and a control unit 60L. Similarly to the case of Modification Example 1-7 of the foregoing first embodiment, the imaging unit 21L has the two operation modes M (the operation modes M0 and M2). The operation mode M0 is a mode that stops the imaging operation. The pyroelectric sensor 27L is, for example, an infrared sensor, and detects a moving object (e.g., the user U). The control unit 60L includes the operation mode setting section 33L. The operation mode setting section 33L sets the operation mode M of the imaging unit 21L.

FIG. 39 illustrates an operation example of the vehicle monitoring system 2L when the user U stops the vehicle 9L in a parking lot.

First, the vehicle 9L stops the engine on the basis of an operation of the user U (step S211), and the operation mode setting section 33L sets the operation mode M of the imaging unit 21L to the operation mode M0 (step S272). This causes the imaging unit 21L to stop the imaging operation. Then, the pyroelectric sensor 27L performs moving object detection (step S273).

Next, the control unit 60L checks whether or not the pyroelectric sensor 27L has detected a moving object (step S274). In a case where no moving object is detected ("N" in step S274), the flow returns to step S273.

In a case where a moving object is detected in step S274 ("Y" in step S274), the operation mode setting section 33L sets the operation mode M of the imaging unit 21L to the operation mode M2 (step S215). This allows the imaging unit 21L to acquire the high-resolution image PIC2. Then, the authentication processing section 32 performs authentication processing by utilizing the authentication information INF2 stored in the storage unit 53 on the basis of the high-resolution image PIC2 (step S216).

Next, the authentication processing section 32 checks whether or not the authentication processing is successful (step S217). In a case where the authentication processing is successful ("Y" in step S217), the flow returns to step S272. In a case where the authentication processing has failed ("N" in step S217), the communication unit 22 supplies the high-resolution image PIC2 to the server 40 on the basis of an instruction from the control unit 60L (step S218).

Then, the notification section 42 of the server 40 notifies the smartphone 4 that a person other than the registered user U has approached the vehicle 9L, and supplies the high-resolution image PIC2 to the smartphone 4 (step S219). This completes the flow.

As described above, in the vehicle monitoring system 2L, the imaging apparatus 20 is configured by using the imaging unit 21L having the operation mode M0 that stops the imaging operation and the operation mode M2 that acquires the high-resolution image PIC2, and the operation mode M is set to the operation mode M2 when the pyroelectric sensor 27L detects a moving object, thus making it possible to reduce the power consumption.

Modification Example 2-8

In the above embodiment, the operation mode M of the imaging unit 21 is set to the operation mode M1 after the engine is stopped, but this is not limitative. Alternatively, for example, as in a vehicle monitoring system 2M illustrated in FIG. 40, it may be checked, after the engine is stopped, whether or not the user U has left the vehicle 9M on the basis of a captured image of the imaging unit 21 (step S281); in a case where the user U has left the vehicle 9M, the operation mode M of the imaging unit 21 may be set to the operation mode M1.

Modification Example 2-9

In the above embodiment, the imaging unit 21 is provided that captures an image of the outside of the vehicle 9, but this is not limitative: in addition, for example, an imaging unit 21N may be further provided that captures an image of the inside of the vehicle 9. The imaging unit 21N may capture, for example, a color image or a monochrome image. In addition, the imaging unit 21N may be a near-infrared camera. The imaging unit 21N may be so disposed as to capture an image of a driver of the vehicle 9, for example. An imaging apparatus 50N including the imaging unit 21N may capture an image of the driver of the vehicle 9 in a case where, for example, a person other than the registered user U has opened a door of the vehicle 9. Further, in a case where a person other than the registered user U has started the engine of the vehicle 9, the imaging apparatus 50N may capture an image of a driver of the vehicle 9. In addition, in a case where a person other than the registered user U has moved the vehicle 9, the imaging apparatus 50N may capture an image of a driver of the vehicle 9. Further, the imaging apparatus 50N may supply the captured image taken in this manner to the server 40, for example.

Modification Example 2-9

In the above embodiment, the high-resolution image PIC2 is supplied to the server 40 managed by a business operator who operates the vehicle monitoring system 2. In this way, the business operator may provide security service for causing security staff to rush to a location where the vehicle 9 is parked. In particular, in the present technology, the authentication processing is performed on the basis of the high-resolution image PIC2. In addition, using the techniques described in Modification Examples 2-4 and 2-5 makes it possible to reduce a possibility of notifying the server 40 each time a person or an animal passes near the vehicle 9. As a result, it is possible to reduce cost of the security service. In addition, for example, a person in charge of this business operator judges whether or not there is any suspicious person on the basis of the high-resolution image PIC2; in a case where it is judged that there is a suspicious person, causing the security staff to rush to the location where the vehicle 9 is parked makes it possible to further reduce the cost of the security service.

Further, in a case where the imaging apparatus 50 is mounted on the vehicle 9, an insurance premium rate of automobile insurance may be lowered.

Other Modification Examples

Further, two or more of these configuration examples may be combined.

Although the present technology has been described with reference to several embodiments and modification examples, the present technology is not limited to these embodiments, etc., and may be modified in a variety of ways.

For example, in the foregoing second embodiment, the imaging apparatus 50 once supplies the high-resolution image PIC2 to the server 40, but this is not limitative; alternatively, for example, the imaging apparatus 50 may directly supply the high-resolution image PIC2 to the smartphone 4.

It is to be noted that the effects described herein are merely illustrative and non-limiting, and other effects may be included.

It is to be noted that the present technology may have the following configurations.

(1)

An imaging apparatus including:

an imaging unit having a plurality of operation modes including a first operation mode configured to reduce power consumption and a second operation mode that generates a captured image; and an operation mode setting section that selects one of the plurality of operation modes.

(2)

The imaging apparatus according to (1), further including a detection processing section that performs moving object detection processing, in which the first operation mode includes an operation mode that generates a low-resolution image, the detection processing section performs the moving object detection processing on a basis of the low-resolution image, and the operation mode setting section selects the second operation mode on a basis of a processing result of the moving object detection processing.

(3)

The imaging apparatus according to (2), in which the second operation mode includes an operation mode configured to change a first region where an imaging operation is performed, out of an imaging region of the imaging unit, and the detection processing section further sets the first region on a basis of the processing result of the moving object detection processing.

(4)

The imaging apparatus according to (3), in which the detection processing section sets the first region in accordance with a position of a moving object detected by the detection processing section.

(5)

The imaging apparatus according to any one of (2) to (4), in which the operation mode setting section selects the second operation mode in a case where the detection processing section detects the moving object in a region other than a second region, out of an imaging region of the imaging unit.

(6)

The imaging apparatus according to any one of (2) to (4), in which the operation mode setting section selects the second operation mode in a case where a size of an image of the moving object detected by the detection processing section is larger than a predetermined size.

(7)

The imaging apparatus according to any one of (2) to (4), in which the operation mode setting section selects the second operation mode in a case where an image of the moving object detected by the detection processing section is in contact with an edge of the low-resolution image.

(8)

The imaging apparatus according to any one of (2) to (4), in which the operation mode setting section selects the second operation mode in a case where the detection processing section continuously detects the moving object for a predetermined period of time or longer.

(9)

The imaging apparatus according to (1), further including a sensor that performs moving object detection, in which the first operation mode includes an operation mode that stops an imaging operation, and the operation mode setting section selects the second operation mode on a basis of a result of the detection performed by the sensor.

(10)

The imaging apparatus according to (1), further including a switch that accepts an operation of a user, in which the operation mode setting section selects the second operation mode on a basis of an instruction from the switch.

(11)

The imaging apparatus according to any one of (1) to (10), further including an authentication section, in which the captured image includes a facial image, and the authentication section performs authentication processing on a basis of the captured image.

(12)

The imaging apparatus according to (11), further including a communication unit that supplies the captured image to a first apparatus in a case where the authentication processing fails.

(13)

The imaging apparatus according to (11) or (12), further including an authentication information generation section that generates authentication information to be used when the authentication section performs the authentication processing.

(14)
The imaging apparatus according to (13), in which the authentication information generation section generates the authentication information on a basis of an image captured by the imaging unit.
(15)
The imaging apparatus according to (11) or (12), further including a communication unit that receives authentication information supplied from a second apparatus, in which
the authentication section performs the authentication processing on a basis of the captured image using the authentication information.
(16)
The imaging apparatus according to any one of (1) to (10), further including the communication unit that supplies the captured image to a third apparatus that performs authentication processing on a basis of the captured image, in which
the captured image includes the facial image.
(17)
The imaging apparatus according to (16), in which the communication unit further receives a processing result of the authentication processing supplied from the third apparatus.
(18)
A vehicle utilization system including:
a vehicle including an imaging apparatus; and
a server,
the imaging apparatus including
an imaging unit having a plurality of operation modes including a first operation mode configured to reduce power consumption and a second operation mode that generates a captured image,
an operation mode setting section that selects one of the plurality of operation modes,
and a communication unit that receives information on a reservation for utilization of the vehicle from the server.
(19)
The vehicle utilization system according to (18), in which
the imaging apparatus further includes an authentication section,
the captured image includes a facial image,
the vehicle further includes doors and an unlocking control unit that controls unlocking of the doors,
the authentication section performs authentication processing on a basis of the captured image, and
the unlocking control unit unlocks the doors on a basis of a processing result of the authentication processing.
(20)
The vehicle utilization system according to (18), in which
the vehicle further includes doors and an unlocking control unit that controls unlocking of the doors,
the captured image includes a facial image,
the server performs authentication processing on a basis of the captured image,
the communication unit supplies the captured image to the server and receives a processing result of the authentication processing, and
the unlocking control unit unlocks the doors on a basis of the processing result of the authentication processing.
(21)
A vehicle monitoring system including:
a vehicle including an imaging apparatus; and
a server,
the imaging apparatus including
an imaging unit having a plurality of operation modes including a first operation mode configured to reduce power consumption and a second operation mode that generates a captured image,
an operation mode setting section that selects one of the plurality of operation modes, and
a communication unit configured to supply the captured image to the server.
(22)
The vehicle monitoring system according to (21), in which
the imaging apparatus further includes an authentication section,
the captured image includes a facial image,
the authentication section performs authentication processing on a basis of the captured image, and
the communication unit supplies the captured image to the server in a case where the authentication processing fails.
(23)
The vehicle monitoring system according to (21), in which
the captured image includes a facial image,
the server performs authentication processing on a basis of the captured image, and
the communication unit supplies the captured image to the server and receives a processing result of the authentication processing.
(24)
The vehicle monitoring system according to (22) or (23), further including a mobile terminal, in which
the server supplies the captured image to the mobile terminal in a case where the authentication processing fails.

This application claims the benefit of Japanese Priority Patent Application JP2017-124837 filed with the Japan Patent Office on Jun. 27, 2017, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:
1. An imaging apparatus comprising:
imaging circuitry having a plurality of operation modes including a first operation mode configured to reduce power consumption and a second operation mode that generates a captured image;
operation mode setting circuitry that selects one of the plurality of operation modes;
authentication circuitry that performs authentication processing on a basis of the captured image; and
communication circuitry that supplies the captured image to a first apparatus in a case where the authentication processing fails.
2. The imaging apparatus according to claim 1, further comprising detection processing circuitry that performs moving object detection processing, wherein
the first operation mode comprises an operation mode that generates a low-resolution image,
the detection processing circuitry performs the moving object detection processing on a basis of the low-resolution image, and
the operation mode setting circuitry selects the second operation mode on a basis of a processing result of the moving object detection processing.

3. The imaging apparatus according to claim 2, wherein
the second operation mode comprises an operation mode configured to change a first region where an imaging operation is performed, out of an imaging region of the imaging circuitry, and
the detection processing circuitry further sets the first region on a basis of the processing result of the moving object detection processing.

4. The imaging apparatus according to claim 3, wherein the detection processing circuitry sets the first region in accordance with a position of a moving object detected by the detection processing circuitry.

5. The imaging apparatus according to claim 2, wherein the operation mode setting circuitry selects the second operation mode in a case where the detection processing circuitry detects a moving object in a region other than a second region, out of an imaging region of the imaging circuitry.

6. The imaging apparatus according to claim 2, wherein the operation mode setting circuitry selects the second operation mode in a case where a size of an image of a moving object detected by the detection processing circuitry is larger than a predetermined size.

7. The imaging apparatus according to claim 2, wherein the operation mode setting circuitry selects the second operation mode in a case where an image of a moving object detected by the detection processing circuitry is in contact with an edge of the low-resolution image.

8. The imaging apparatus according to claim 2, wherein the operation mode setting circuitry selects the second operation mode in a case where the detection processing circuitry continuously detects a moving object for a predetermined period of time or longer.

9. The imaging apparatus according to claim 1, further comprising a sensor that performs moving object detection, wherein
the first operation mode comprises an operation mode that stops an imaging operation, and
the operation mode setting circuitry selects the second operation mode on a basis of a result of the detection performed by the sensor.

10. The imaging apparatus according to claim 1, further comprising a switch that accepts an operation of a user, wherein
the operation mode setting circuitry selects the second operation mode on a basis of an instruction from the switch.

11. The imaging apparatus according to claim 1, wherein the captured image includes a facial image.

12. The imaging apparatus according to claim 11, further comprising authentication information generation circuitry that generates authentication information to be used when the authentication circuitry performs the authentication processing.

13. The imaging apparatus according to claim 12, wherein the authentication information generation circuitry generates the authentication information on a basis of an image captured by the imaging circuitry.

14. The imaging apparatus according to claim 11, further comprising communication circuitry that receives authentication information supplied from a second apparatus, wherein
the authentication circuitry performs the authentication processing on a basis of the captured image using the authentication information.

15. The imaging apparatus according to claim 1, further comprising communication circuitry that supplies the captured image to a third apparatus that performs authentication processing on a basis of the captured image, wherein
the captured image includes a facial image.

16. The imaging apparatus according to claim 15, wherein the communication circuitry further receives a processing result of the authentication processing supplied from the third apparatus.

17. A vehicle monitoring system comprising:
a vehicle including an imaging apparatus; and
a server,
the imaging apparatus including
imaging circuitry having a plurality of operation modes including a first operation mode configured to reduce power consumption and a second operation mode that generates a captured image,
operation mode setting circuitry that selects one of the plurality of operation modes, and
communication circuitry configured to supply the captured image to the server,
wherein
the imaging apparatus further includes an authentication circuitry,
the captured image includes a facial image,
the authentication circuitry performs authentication processing on a basis of the captured image, and
the communication circuitry supplies the captured image to the server in a case where the authentication processing fails.

18. The vehicle monitoring system according to claim 17, wherein
the captured image includes a facial image,
the server performs authentication processing on a basis of the captured image, and
the communication circuitry supplies the captured image to the server and receives a processing result of the authentication processing.

19. The vehicle monitoring system according to claim 17, further comprising a mobile terminal, wherein
the server supplies the captured image to the mobile terminal in a case where the authentication processing fails.

* * * * *